US012189196B2

(12) United States Patent
Venkatesan et al.

(10) Patent No.: US 12,189,196 B2
(45) Date of Patent: Jan. 7, 2025

(54) FIBER BLOCK ALIGNMENT STRUCTURE

(71) Applicant: POET Technologies, Inc., Allentown, PA (US)

(72) Inventors: Suresh Venkatesan, San Jose, CA (US); Jing Yang, Singapore (SG); Lucas Soldano, San Jose, CA (US)

(73) Assignee: POET Technologies, Inc., Allentown, PA (US)

( * ) Notice: Subject to any disclaimer, the term of this patent is extended or adjusted under 35 U.S.C. 154(b) by 41 days.

(21) Appl. No.: 17/962,541

(22) Filed: Oct. 9, 2022

(65) Prior Publication Data

US 2023/0176303 A1 Jun. 8, 2023

Related U.S. Application Data

(60) Provisional application No. 63/254,067, filed on Oct. 9, 2021.

(51) Int. Cl.
*H04B 10/00* (2013.01)
*G02B 6/42* (2006.01)

(52) U.S. Cl.
CPC ......... *G02B 6/4243* (2013.01); *G02B 6/4222* (2013.01); *G02B 6/4239* (2013.01)

(58) Field of Classification Search
CPC .. G02B 6/4243; G02B 6/4222; G02B 6/4239; G02B 6/124; G02B 6/30; G02B 6/4227; G02B 6/4214; G02B 6/4225; G02B 6/423; G02B 6/4249
See application file for complete search history.

(56) References Cited

U.S. PATENT DOCUMENTS 7,050,678 B1 * 5/2006 Isono .................. G02B 6/4255 385/39
11,686,906 B1 * 6/2023 Venkatesan .......... G02B 6/4238 385/93
2019/0384007 A1 * 12/2019 Matiss ................. G02B 6/1225
2022/0057583 A1 * 2/2022 Lee ........................ G02B 6/423
2023/0176303 A1 * 6/2023 Venkatesan .......... G02B 6/4225 385/88
2023/0236369 A1 * 7/2023 Pan ...................... G02B 6/4221 385/49

* cited by examiner

*Primary Examiner* — Agustin Bello
(74) *Attorney, Agent, or Firm* — Tue Nguyen

(57) ABSTRACT

Embodiments of alignment structures are disclosed that enable the alignment of a fiber attach unit (FAU) and the optical fibers contained therein to optical components on optical interposers or substrates on which photonic integrated circuits (PICs) are formed. Alignment of the optical fibers is enabled without the requirement for powering of the active optoelectrical devices in the PIC, but rather use an external testing apparatus to provide one or more optical signals to facilitate alignment. Methods for alignment using embodiments of the alignment structure is also disclosed.

20 Claims, 37 Drawing Sheets

Section A-A' (through alignment structure 103)

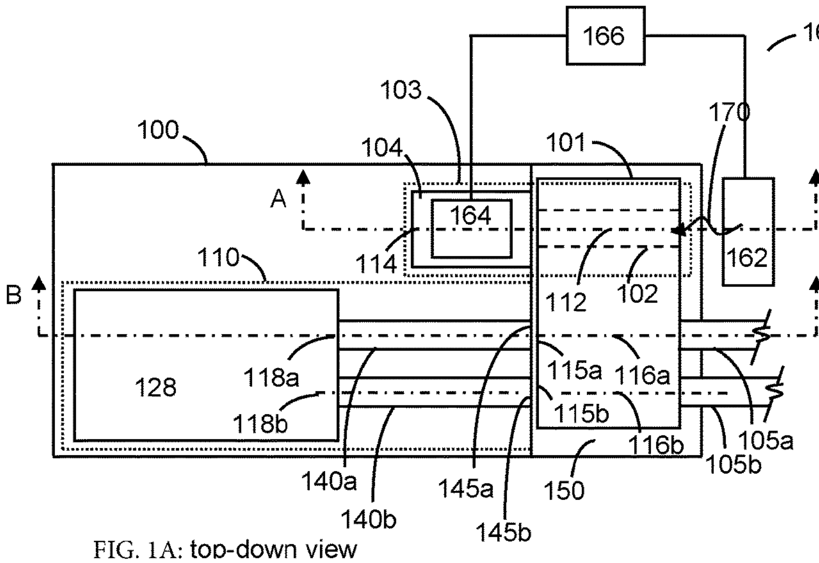
FIG. 1A: top-down view
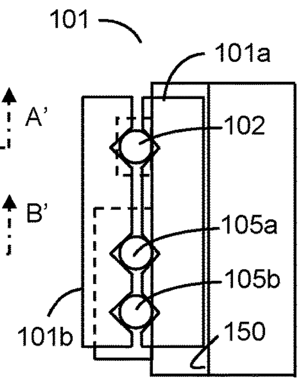
FIG. 1B: Right end view from FIG. 1A
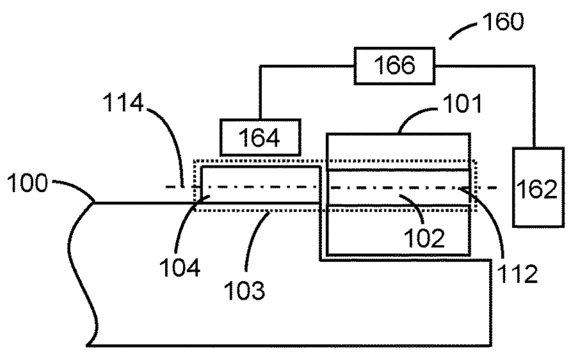
FIG. 1C: Section A-A' (through alignment structure 103)
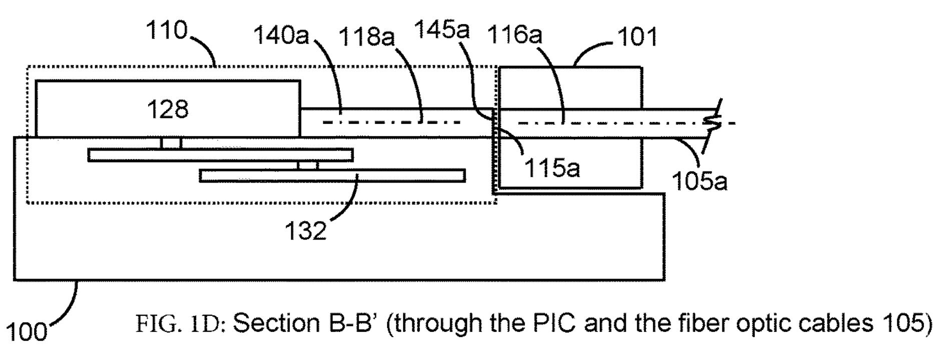
FIG. 1D: Section B-B' (through the PIC and the fiber optic cables 105)

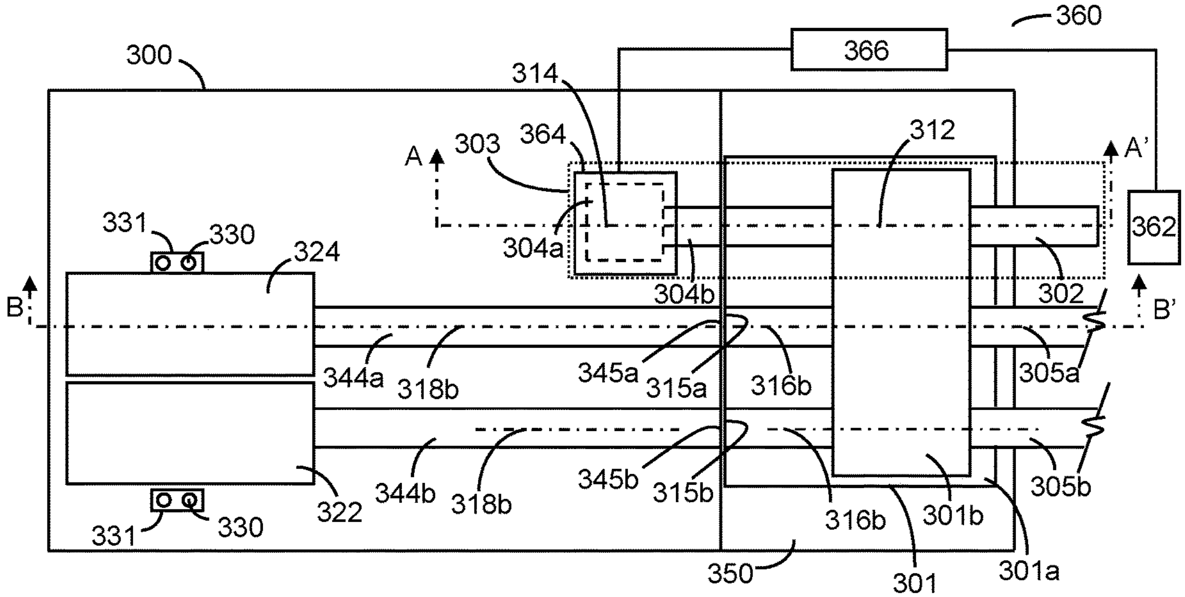
FIG. 3A: Top-down view
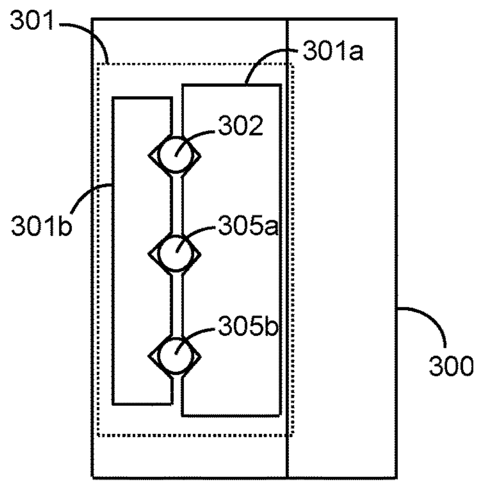
FIG. 3B: Right end view from (a)

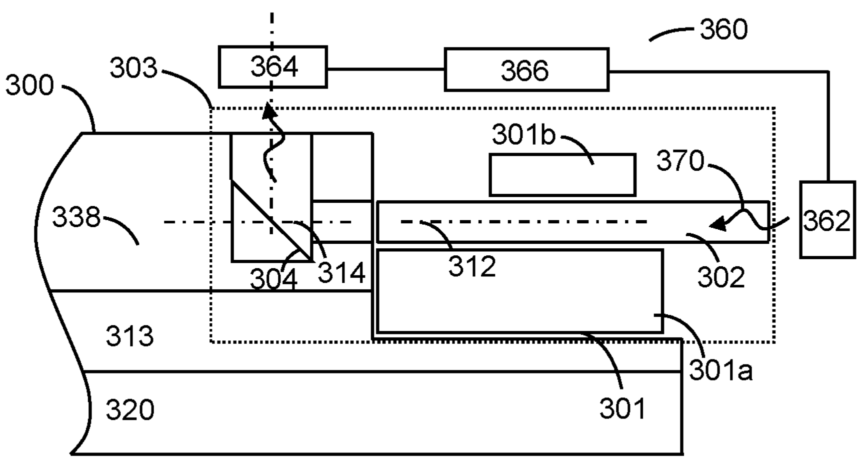
FIG. 3C: Section A-A' with alignment structure 303
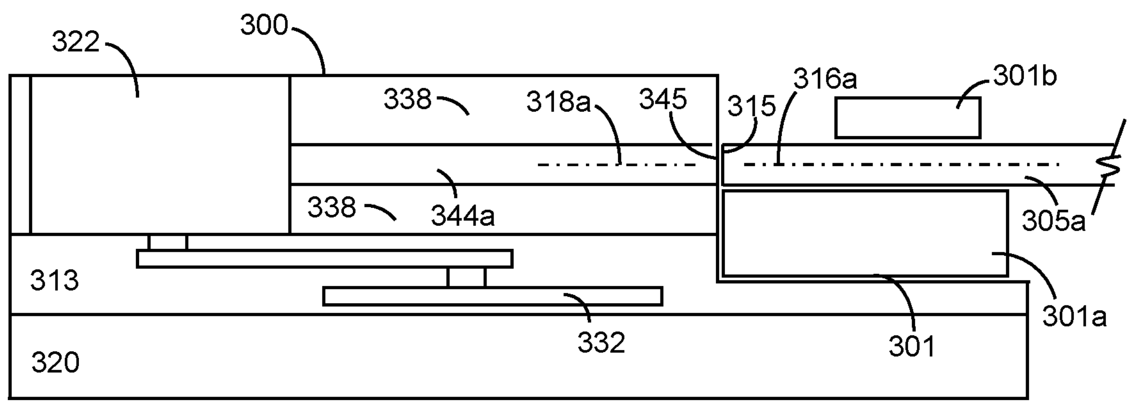
FIG. 3D: Section B-B' (includes PIC Interposer 100 and fibers 305)

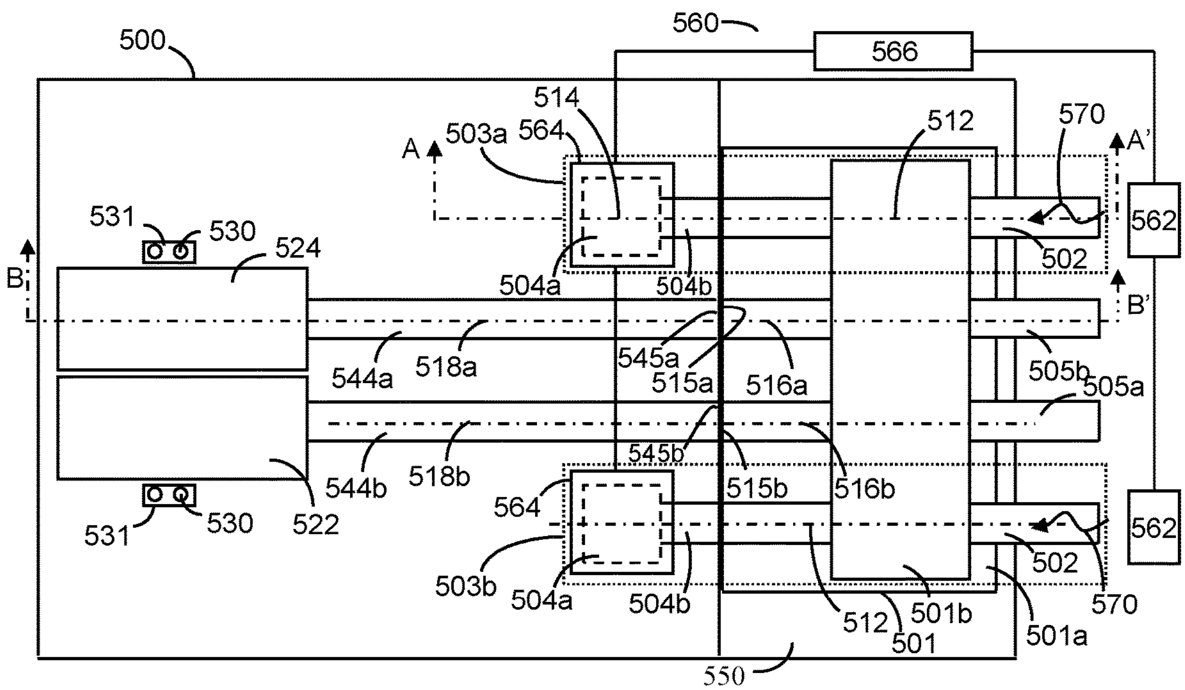
FIG. 5A Top-down view
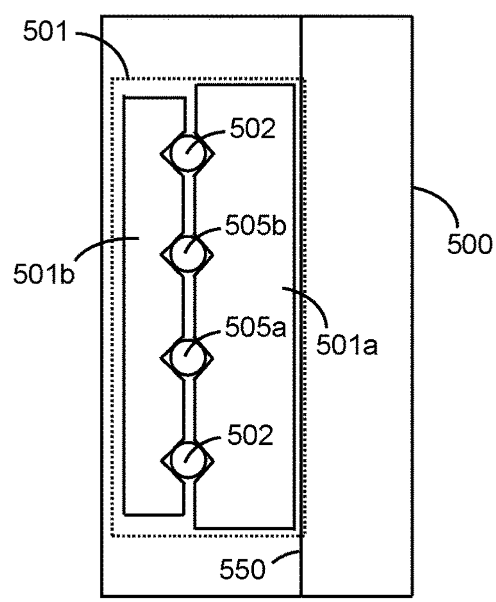
FIG. 5B: Right end view of FIG. 5A

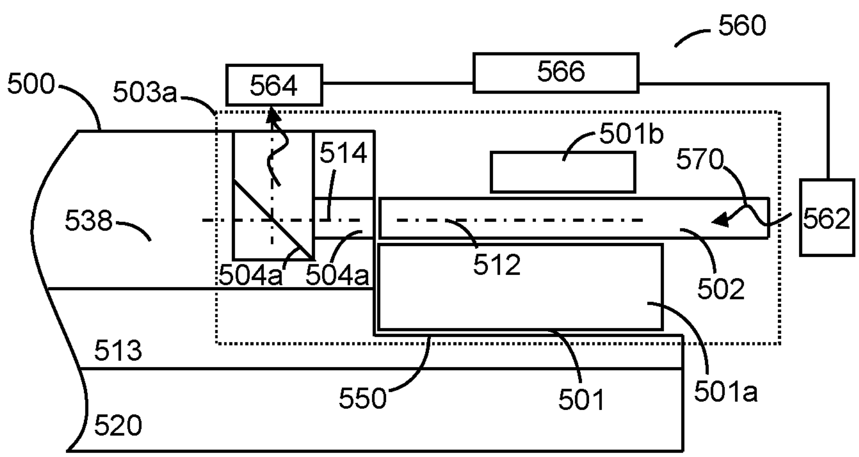
FIG. 5C: Section A-A’ through the alignment structure 503
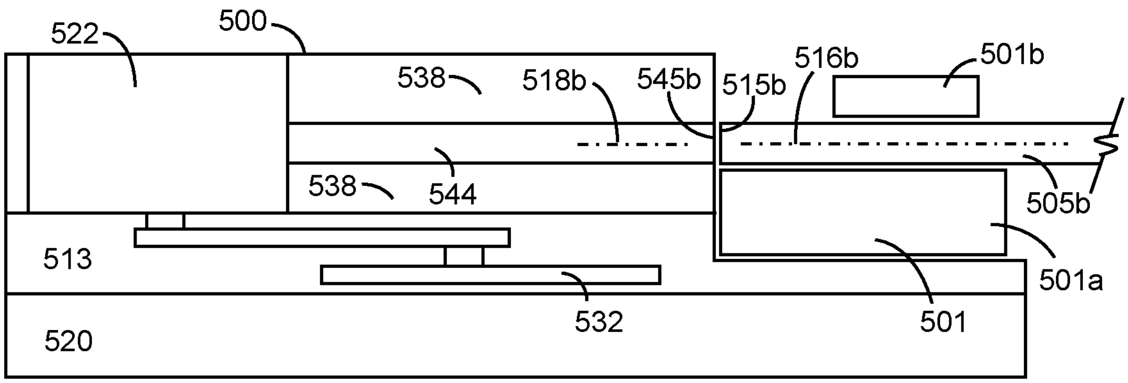
FIG. 5D: Section B-B’ through optical fibers 503 and waveguides 544

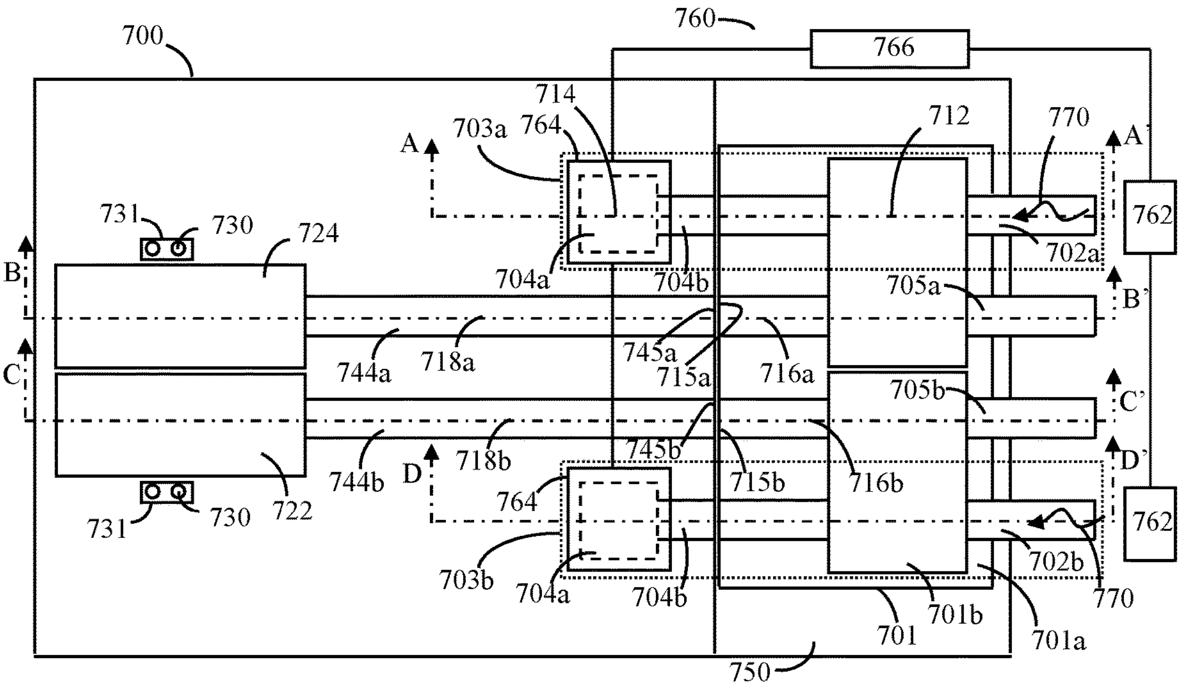
FIG. 7A: Top-down view
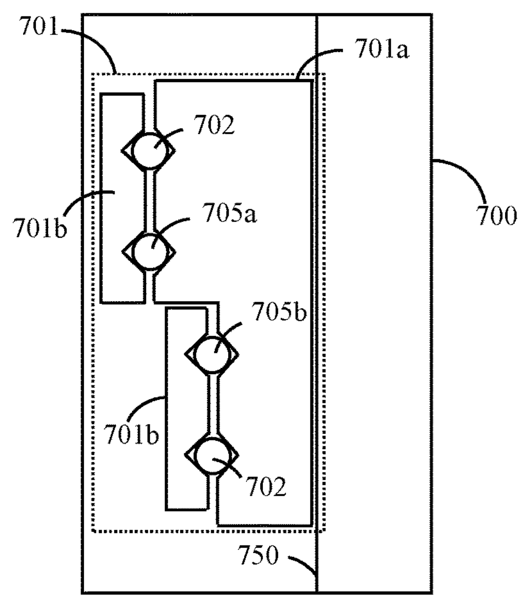
FIG. 7B: Right end view of FIG. 7A
FIG. 7

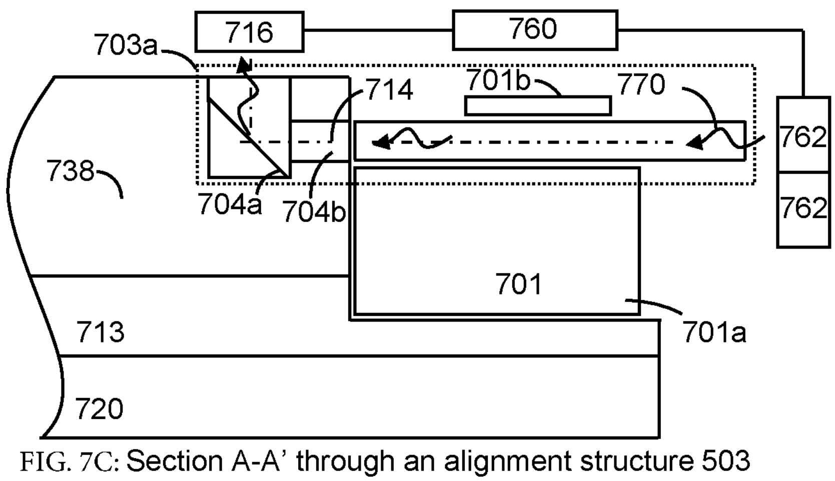
FIG. 7C: Section A-A' through an alignment structure 503
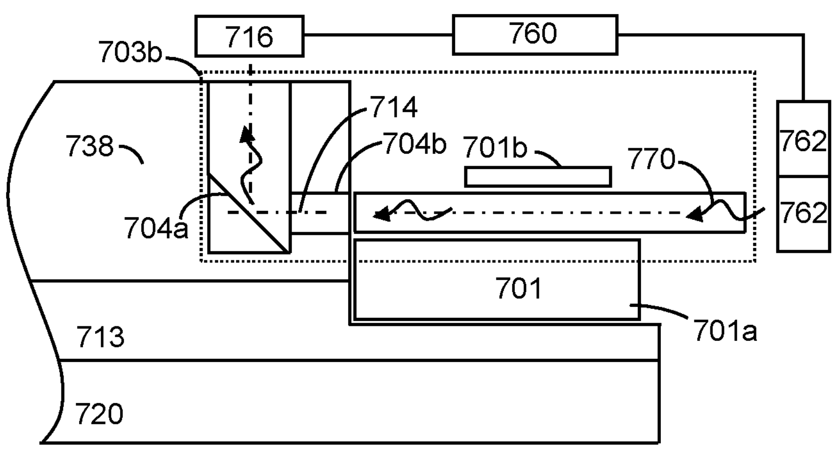
FIG. 7D: Section D-D' through an alignment structure 503

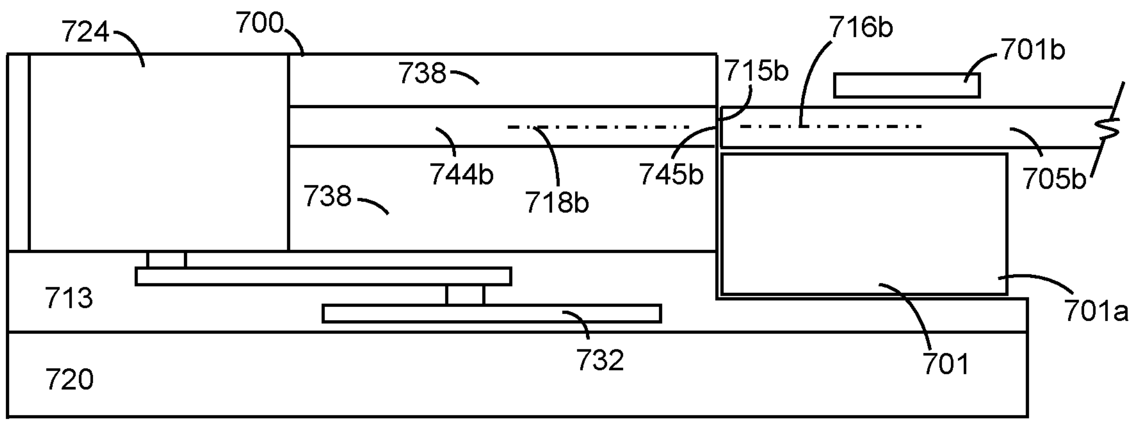
FIG. 7E: Section B-B' through optical fibers 705 and optical component 744b
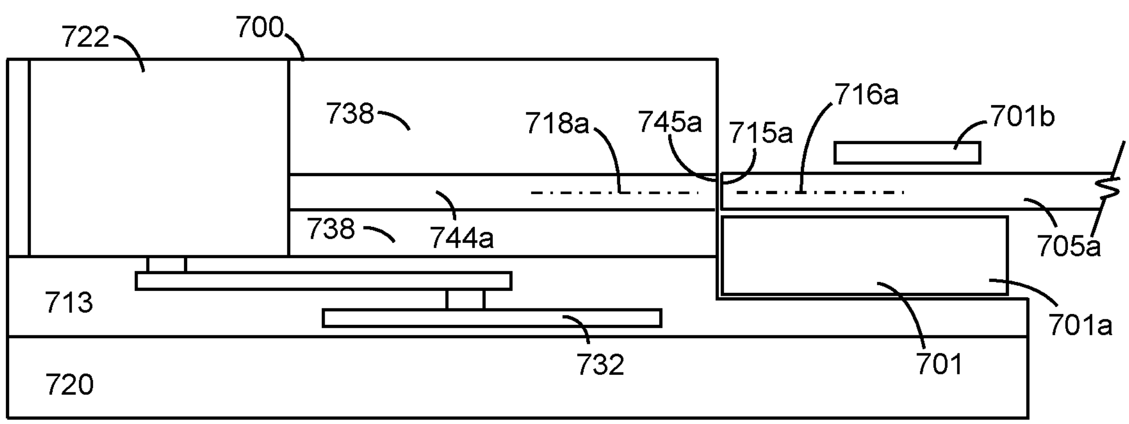
FIG. 7F: Section C-C' through optical fibers 705 and optical component 744a Some embodiments of First Optical Components 102 of Alignment Structure 103

Some embodiments of Second Optical Components 104 of Alignment Structure 103

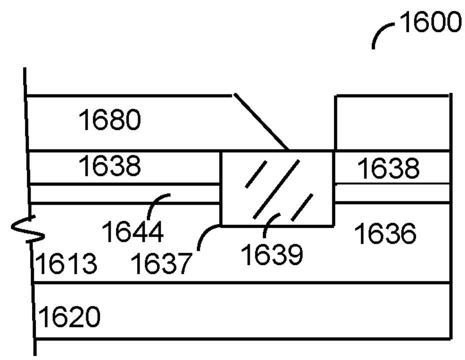
FIG. 16A: pre-etch
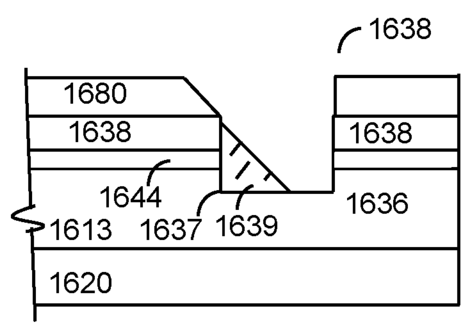
FIG. 16B: After etch to form reflector base
Formation of reflector base using a tapered mask

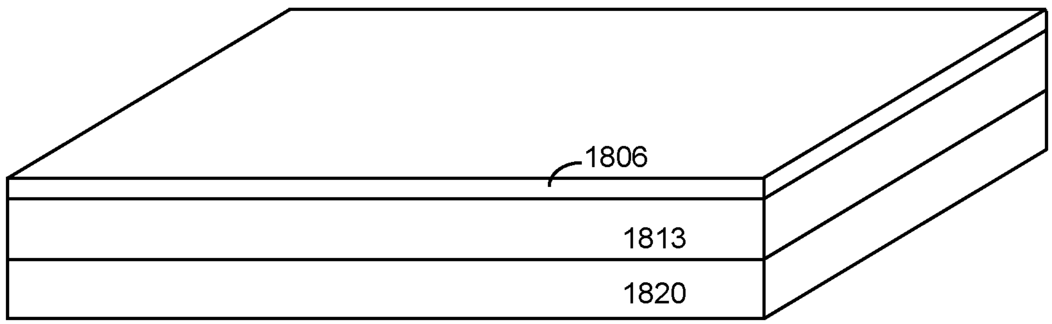
FIG. 18A: Form an interposer substrate
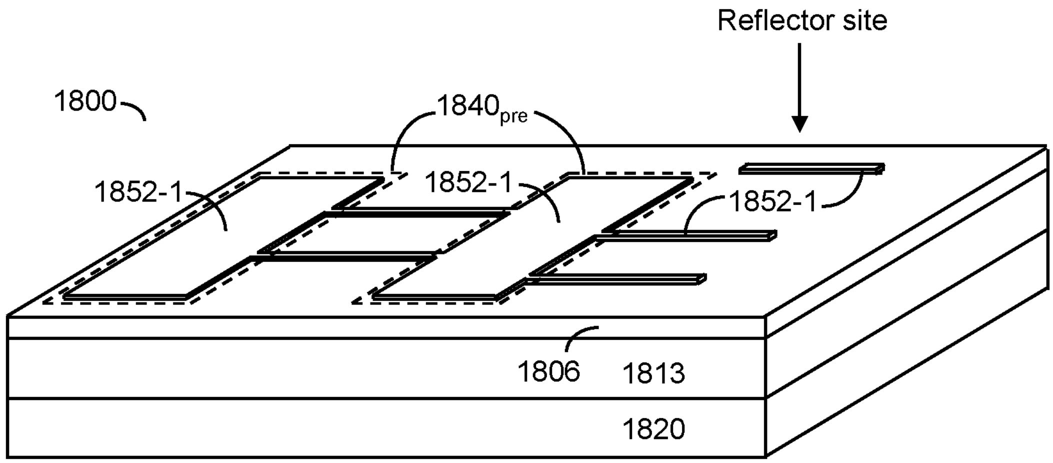
FIG. 18B: Form a Patterned hard mask
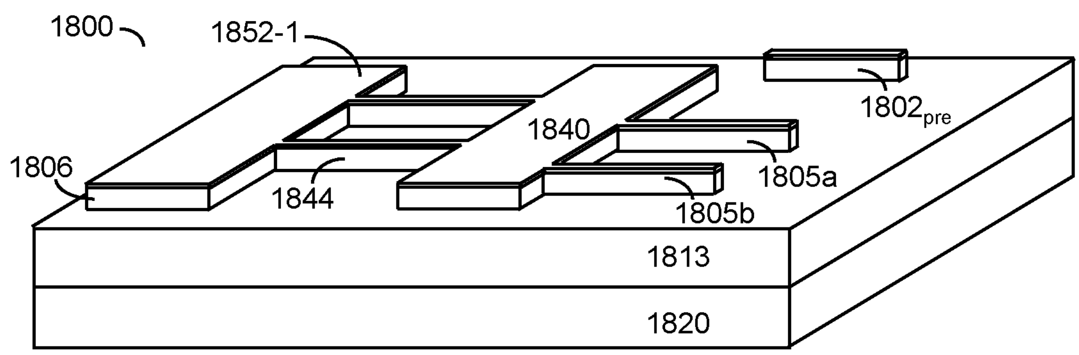
FIG. 18C: Form a Patterned planar waveguide layer

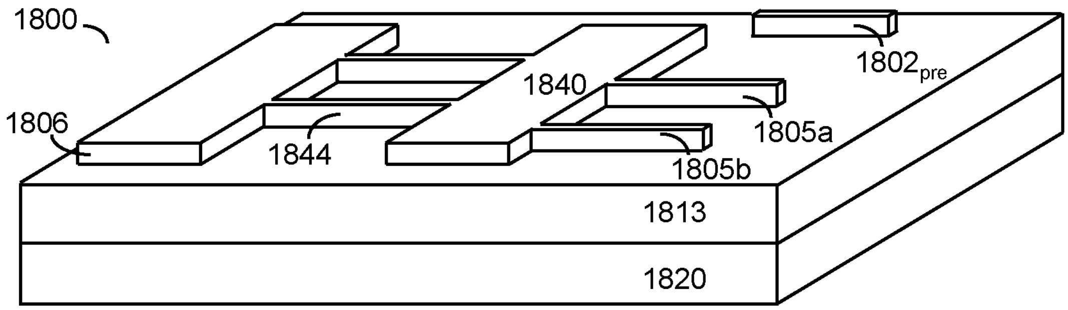
FIG. 18D: Remove the hard mask
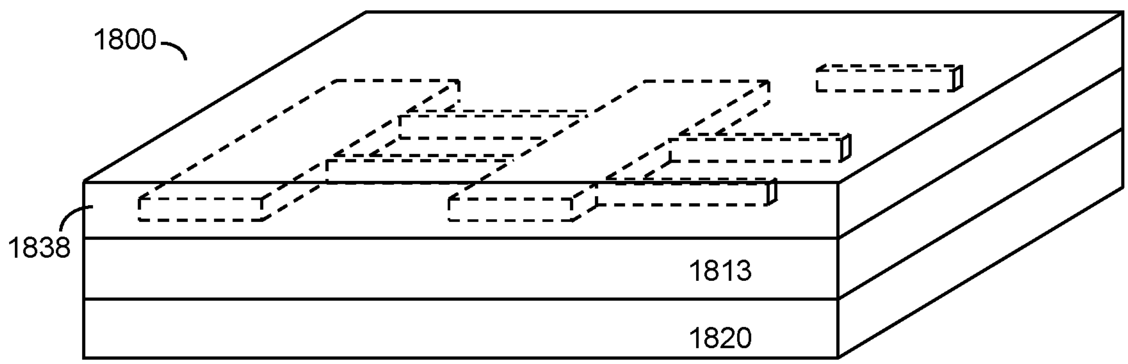
FIG. 18E: Form Dielectric layer
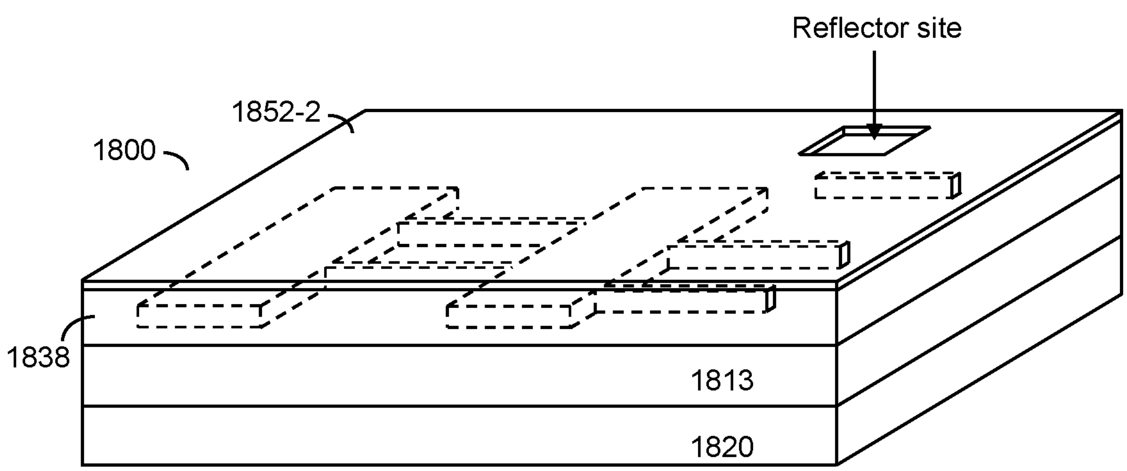
FIG. 18F: Form a Second Patterned hard mask

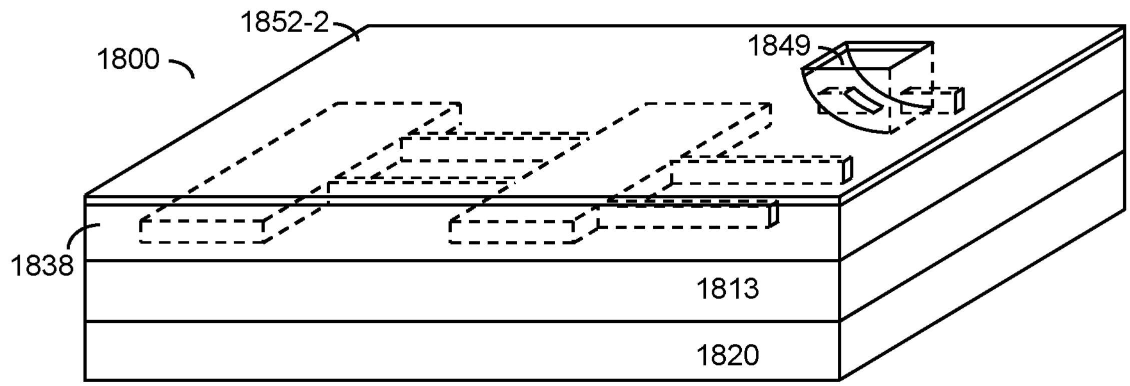
FIG. 18G: Form a reflector cavity and base
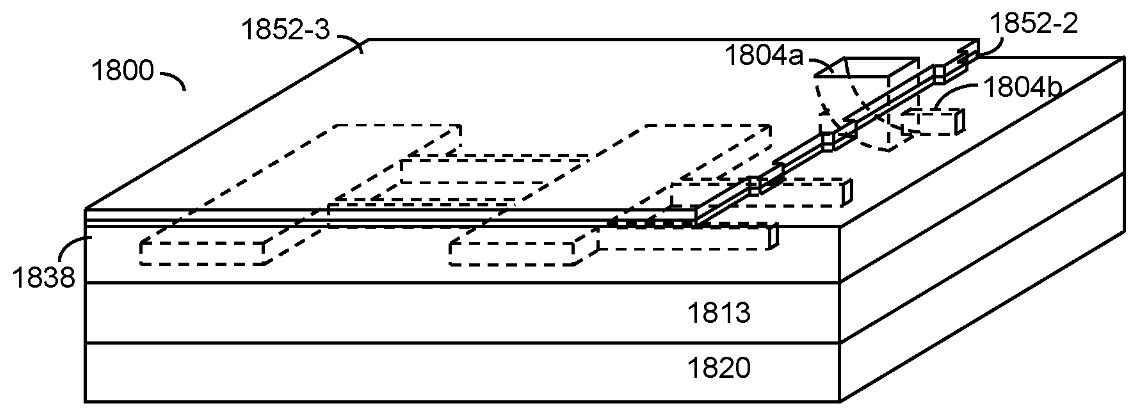
FIG. 18H: Form a third patterned hard mask (for FAU site)
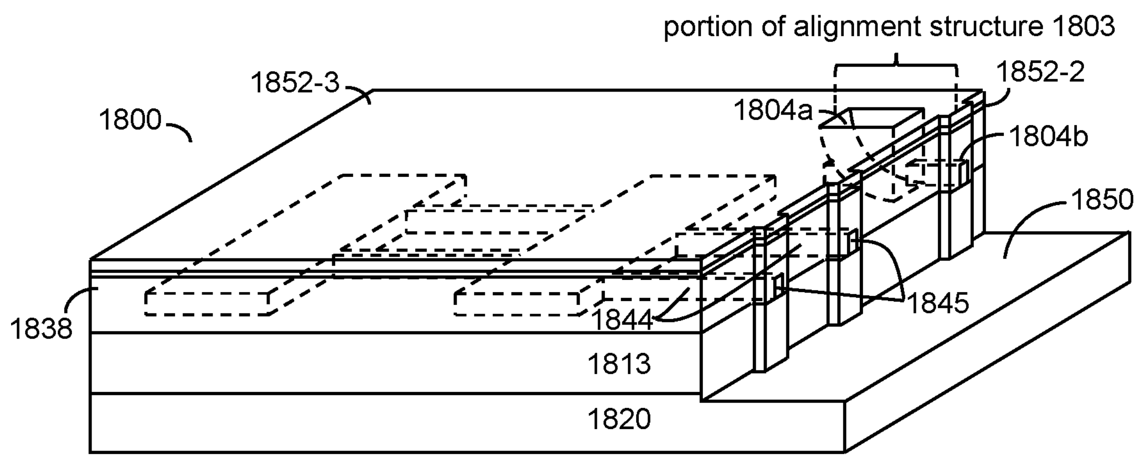
FIG. 18I Form FAU site

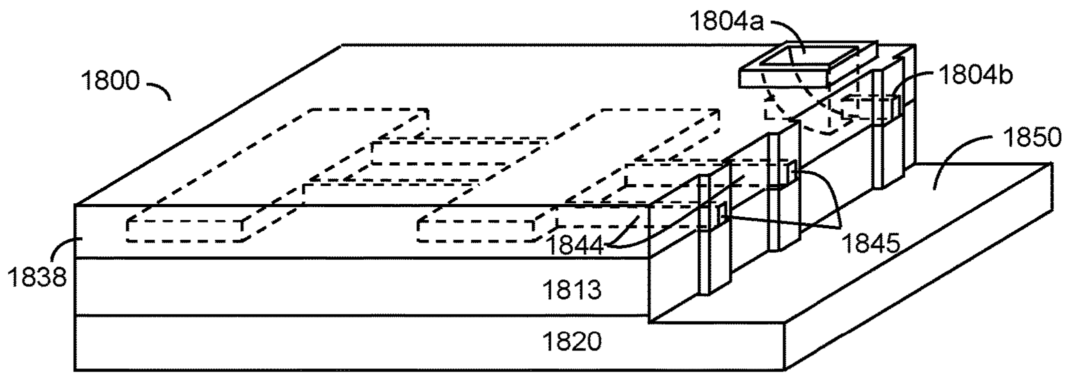
FIG. 18J: Remove all or a portion of the patterned masks
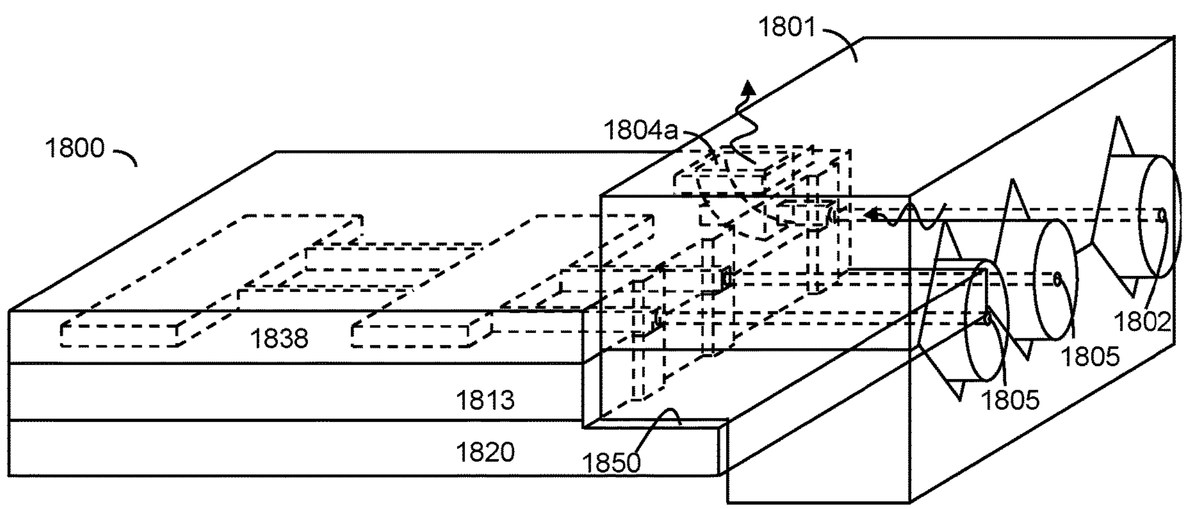
FIG. 18K: mount FAU having alignment structure to PIC having alignment structure

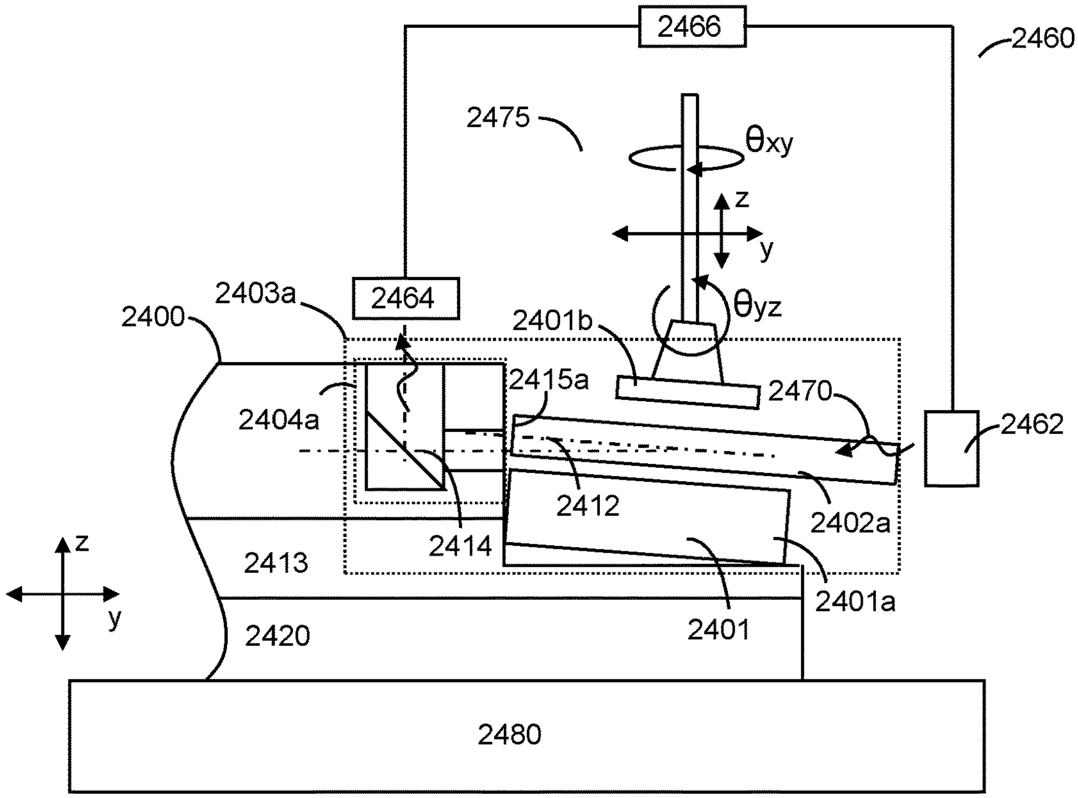
(a) Section A-A' from (b)
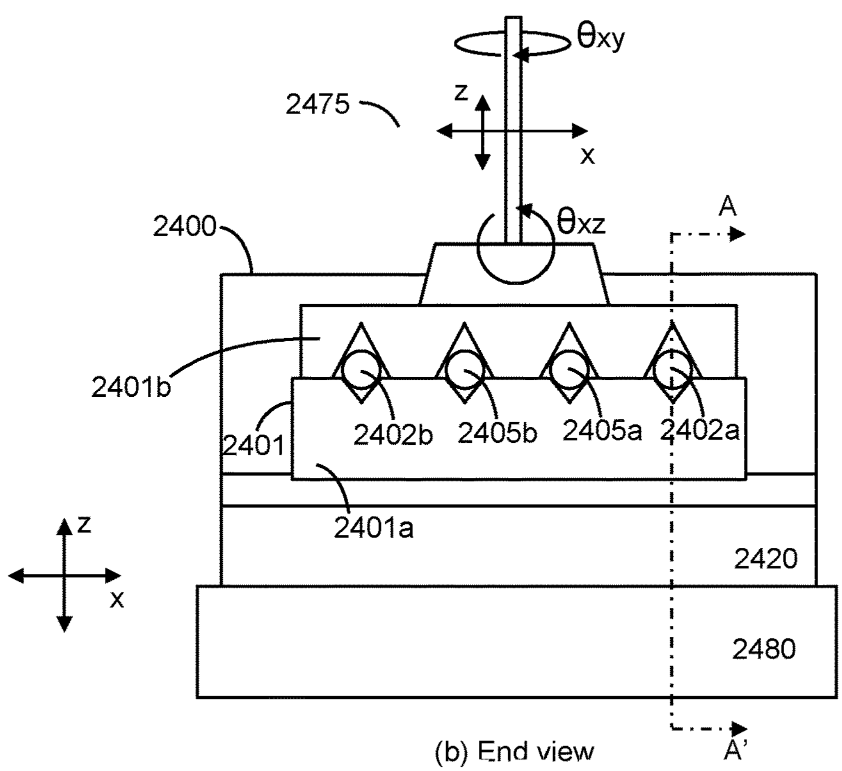
(b) End view
FIG. 24A

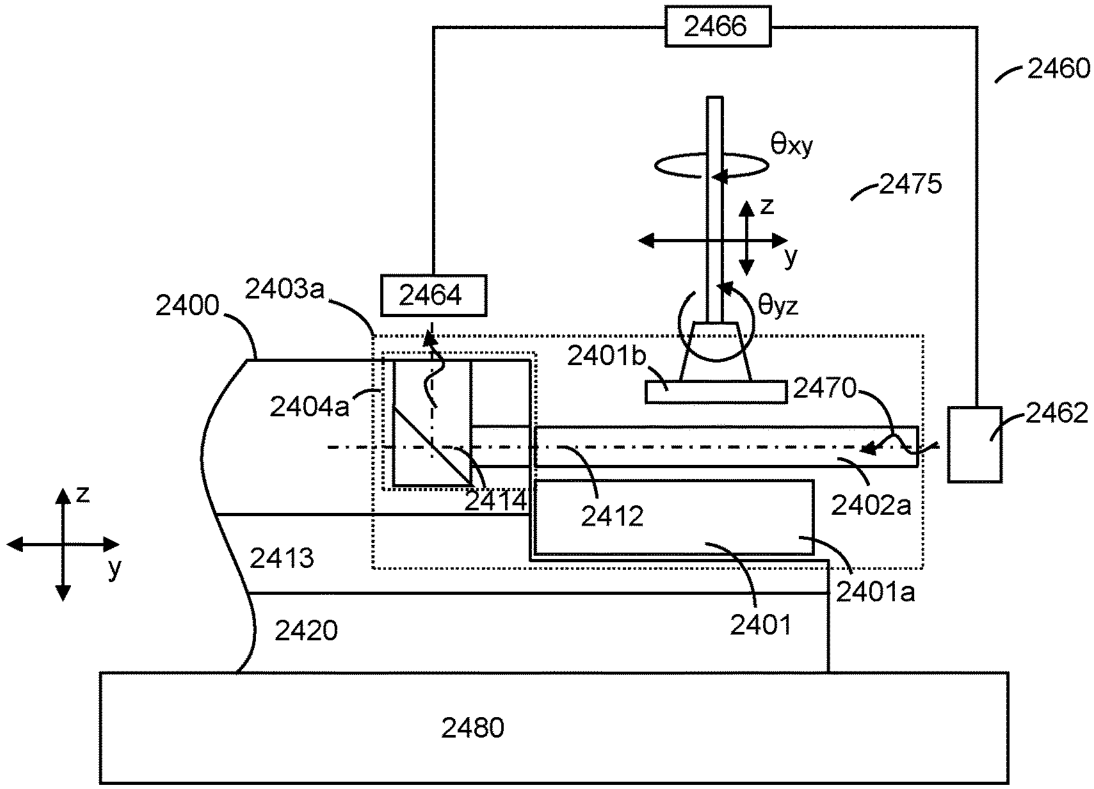
(a) Section A-A' from (b)
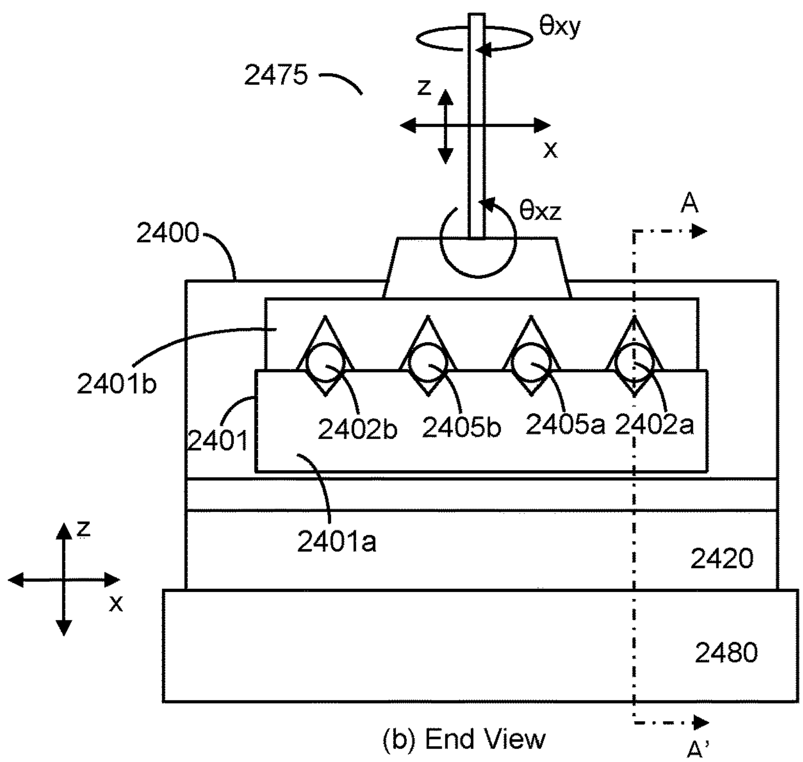
(b) End View
FIG. 24B

FIBER BLOCK ALIGNMENT STRUCTURE

The present patent application claims priority from U.S. Provisional Patent Applicant Ser. No. 63/254,067, filed on Oct. 9, 2021, entitled "Fiber Block Alignment with Upturned Mirror", of the same inventors, hereby incorporated by reference in its entirety.

The present application relates to patent application Ser. No. 17/242,686, filed on Apr. 28, 2021, entitled "Structure and Method for testing of PIC with an Upturned mirror." patent application Ser. No. 17/242,701, filed on Apr. 28, 2021, entitled, "Structure and Method for testing of PIC with an Upturned mirror," patent application Ser. No. 17/499,323, filed on Oct. 12, 2021, entitled "Self-Aligned Structure and Method on Interposer-based PIC," patent application Ser. No. 17/499,337, filed on Oct. 12, 2021, entitled "Self-Aligned Structure and Method on Interposer-based PIC," and patent application Ser. No. 63/357,775, filed on Jul. 1, 2022, entitled "Reflector Structure Having Three-Dimensional Curvature," all hereby incorporated by reference.

BACKGROUND

Photonic integrated circuits (PICs) often require the attachment of optical fiber cables to the interposers or substrates upon which the PICs are formed to provide for the transfer of optical signals to and from the optical or opto-electrical network within which the PICs are utilized.

Fiber optic cables can be attached to PIC interposers and other forms of PIC substrates using fiber attach units (FAUs) within which one or more fiber optic cables can be simultaneously mounted to the PIC.

Active alignment processes utilized in the alignment of optical fibers in FAUs with optical components on the PIC to which the FAUs are mounted can require powering of the electrical and optoelectrical devices in the PIC to ensure alignment, but active alignment processes can be cumbersome, and costly to implement. Thus, there is a need in the art for structures and methods that enable efficient alignment of the one or more fiber optic cables configured on FAUs with optical components in the PIC, and that do not require the use of the optoelectrical devices in the PIC circuit in the alignment processes.

SUMMARY

Embodiments disclosed herein describe an alignment structure and method that enables alignment of the optical fibers in an optical fiber mounting block with waveguides and other optical features in a photonic integrated circuit (PIC) without the need to power optoelectrical devices on the PIC substrate.

The alignment structure includes a first and second optical component, the alignment of which can be measured using an external testing apparatus independently of the optoelectrical devices on the PIC. A first optical component of the alignment structure resides on the fiber mounting block and the second optical component of the alignment structure resides on the PIC to which the fiber mounting block is to be attached. An external testing apparatus sends an optical signal to one or more of the first or second optical component and detects the optical signal from the other of the first and second optical components in the alignment structure to assess the quality of the alignment between the first and second optical components. In alignment, for example, minimal power loss in the optical signal is anticipated at one or more detectors of the external testing apparatus.

In some embodiments, the first optical component in the alignment structure can be an optical fiber cable affixed to a fiber mounting block and the second optical component can be an upturned mirror on the PIC. An optical signal from an external testing apparatus is provided, for example, to the optical fiber cable mounted in the optical fiber mounting block to the upturned mirror on the PIC. As the optical fiber cable on the fiber optic mounting block is brought into alignment with the upturned mirror, the optical signal transmitted through the optical fiber and reflected by the upturned mirror yields, for example, a maximum signal intensity to indicate alignment.

The first optical component in the alignment structure, namely the fiber optic cable, is affixed in the fiber mounting block with other fiber optic cables that are required for interoperability between the PIC and the optical network to which the PIC is connected. As the first optical component of the alignment structure is brought into alignment with the second optical component residing on the PIC, so too are the other fiber optic cables in the fiber optic mounting block brought into alignment with mating features on the PIC. The alignment of these optical fibers in the fiber mounting block with the mating features on the PIC, such as waveguides and other optical devices, is accomplished without the requirement for powering the optoelectrical devices on the PIC to assess the quality of the alignment.

In some embodiments, two alignment fibers are included in the fiber optic mounting block for the purpose of aligning fiber optic cables within the fiber mounting block with waveguides or other devices formed on a PIC substrate or interposer to which the fiber mounting block is to be attached. The two fiber optic cables included for alignment, in this embodiment, are provided in addition to the fiber optic cables that are provided for the transfer of optical signals between the PIC and attached fiber optic cables. In an example embodiment, the two fiber optic cables for alignment are positioned at the distal ends of the fiber mounting block, with one or more fiber optic cables, for optical signal communication between the PIC and the optical fiber network, positioned within the spacing between the two alignment fiber optic cables. An upturned mirror for each of the alignment fiber optic cables is provided on the PIC substrate or interposer to receive the optical alignment signal from the alignment fiber optic cable in the fiber mounting block and directing the optical signal to an optical detector positioned above the mirror. In an embodiment with two alignment fiber optic cables in the fiber mounting block, two upturned mirrors are provided on the PIC substrate or interposer. As the fiber optic mounting block is moved into position for attachment to the PIC substrate or interposer, optical signals are routed through each of the alignment fiber optic cables in the fiber mounting block to the upturned mirrors, are reflected by the upturned mirrors, and are detected by the optical detectors coupled to each of the upturned mirrors. The optical signal strength, for example, is monitored at the optical detectors and the position of the fiber mounting block is varied until the position that yields the maximum signal strength is identified in each of the detectors to indicate an optimal alignment position. More information pertaining to the quality of the alignment is available with more than one optical alignment channel in the alignment structure in comparison to configurations with a single optical component in the mounting block and PIC. After alignment, the aligned fiber and mounting block are secured into the aligned position using, for example, an epoxy or other form of adhesive or bonding material.

BRIEF DESCRIPTION OF THE FIGURES

FIG. 1A shows a top-down schematic view of a PIC interposer that includes the first and second optical components of an embodiment of the alignment structure; FIG. 1B shows a right end view from FIG. 1A; FIG. 1C shows Section A-A' from FIG. 1, a cross sectional schematic view of an embodiment of the first and second optical components of an alignment structure; and FIG. 1D shows Section B-B' from FIG. 1A. A cross-sectional schematic view of a portion of a PIC that illustrates the alignment of the optical axes of a fiber optic cable in a FAU with the optical axis of an optical component of a PIC.

FIG. 3 shows an alignment structure on a PIC interposer that includes first optical component that is a waveguide and second optical component that includes an upturned mirror in another embodiment of the alignment structure: FIG. 3A shows a top-down schematic view of an embodiment that includes first and second optical components; FIG. 3B shows a right end view from FIG. 3A; FIG. 3C shows Section A-A' from FIG. 3A, cross sectional schematic view of the first and second optical components of the embodiment of the alignment structure; and FIG. 3D shows Section B-B' from (a), a cross sectional schematic view of a portion of a PIC that illustrates the alignment of the optical axes of a fiber optic cable in a FAU with the optical axis of an optical component of the PIC.

FIG. 5 shows an embodiment that includes two alignment structures: FIG. 5A shows a top-down schematic view; FIG. 5B shows a right end view from FIG. 5A; FIG. 5C shows Section A-A' from FIG. 5A, a cross sectional schematic view of the first and second optical components of the embodiment of the alignment structure; and FIG. 5D shows Section B-B' from FIG. 5A, a cross sectional schematic view of a portion of a PIC that illustrates the alignment of the optical axes of a fiber optic cable in a FAU with the optical axis of an optical component of the PIC.

FIG. 7 shows an embodiment that includes two alignment structures configured for a dual waveguide structure: FIG. 7A shows a top-down schematic view of an embodiment that includes two planar waveguide layers in the PIC and two alignment structures; FIG. 7B shows a right end view from FIG. 7A; FIG. 7C shows Section A-A' from FIG. 7A, a cross sectional schematic view of the first and second optical components of an embodiment of an alignment structure that is coupled to optical components formed from an upper planar waveguide layer of a PIC waveguide structure having an upper and a lower waveguide layer; FIG. 7D shows Section B-B' from (a), a cross sectional schematic view of the first and second optical components of an embodiment of an alignment structure that is coupled to optical components formed from a lower planar waveguide layer of a PIC waveguide structure having an upper and a lower waveguide layer; FIG. 7E shows Section C-C' from FIG. 7A, a cross sectional schematic view of a portion of a PIC and further shows the alignment of the optical axes of a fiber optic cable in a FAU with the optical axis of an optical component formed from, or formed in alignment with, an upper waveguide layer of the PIC waveguide structure; and FIG. 7F shows Section D-D' from FIG. 7A, a cross sectional schematic view of a portion of a PIC and further showing the alignment of the optical axes of a fiber optic cable in a FAU with the optical axis of an optical component formed from, or formed in alignment with, an upper waveguide layer of the PIC waveguide structure.

FIG. 9 shows embodiments having single or multicore optical fibers or waveguides in the first optical component of the alignment structure.

FIG. 11 shows embodiments having a lens and a single or multicore waveguide or fiber optic cable in the first optical component of the alignment structure.

FIG. 12 shows embodiments having an upturned mirror or reflector structure in the first optical component of the alignment structure.

FIG. 13 shows embodiments having a grating structure and a waveguide in the first optical component of the alignment structure.

FIG. 16A-16B shows another example of process steps used in the formation of a mirror structure on an interposer-based PIC.

FIG. 17 shows another example of process steps used in the formation of a mirror structure on an interposer-based PIC for a reflector structure having three-dimensional curvature.

FIG. 18A-18K show example process steps used in the formation of patterned planar waveguides on an interposer-based PIC and an embodiment of an alignment structure that includes a reflector structure and a patterned planar waveguide.

FIG. 24A shows an embodiment of an FAU on an interposer-based PIC prior to alignment: (a) cross-sectional schematic drawing of an example placement of an FAU on the FAU mounting site of the interposer, and (b) end view schematic drawings from (a).

FIG. 24B shows an embodiment of an FAU on an interposer-based PIC after alignment: (a) cross sectional schematic drawing after alignment, and (b) end view schematic drawings from (a).

DETAILED DESCRIPTION

Figure 2:
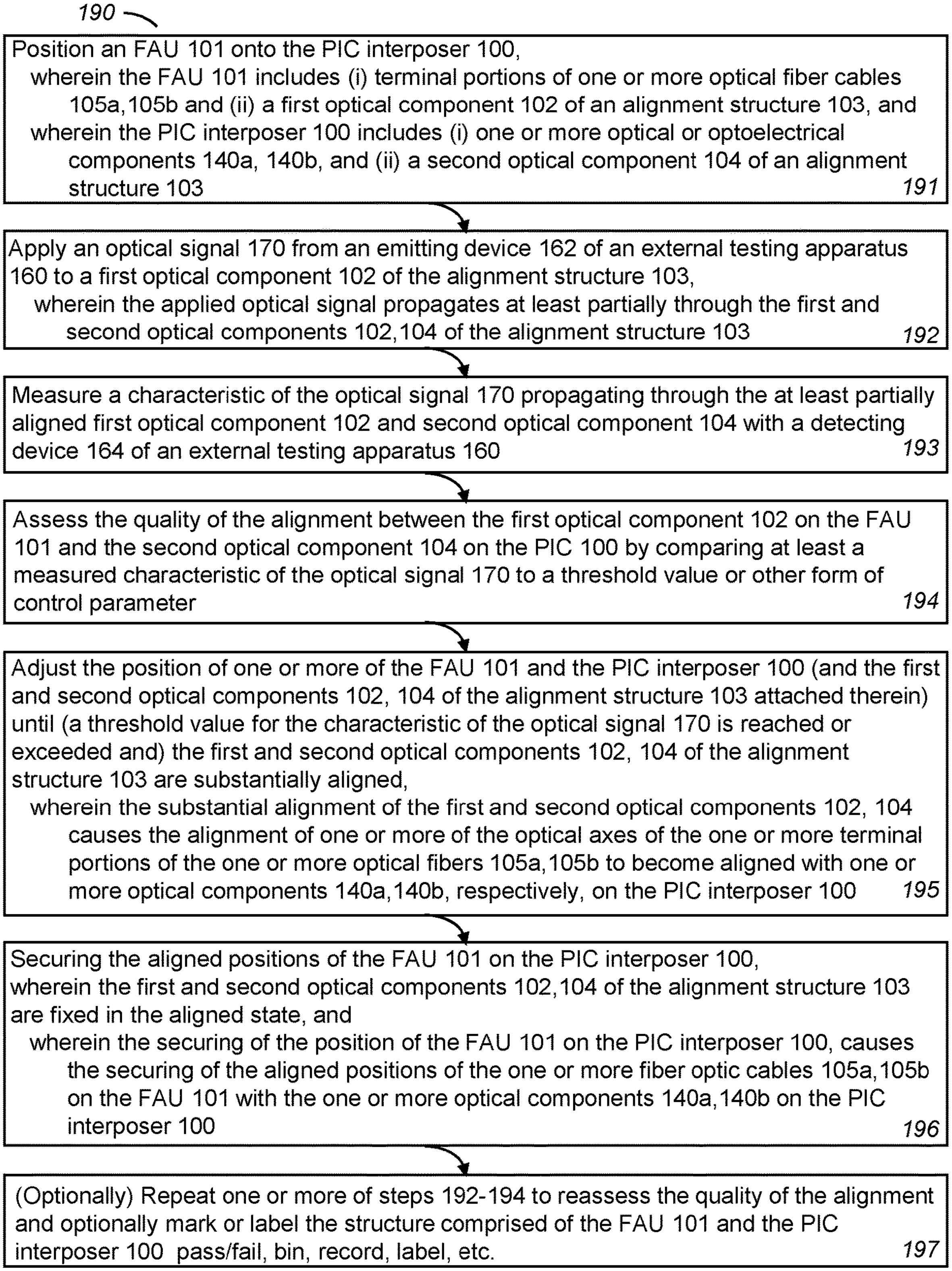
FIG. 2 shows an embodiment of a method of alignment using an embodiment of the alignment structure shown in FIG. 1.

FIG. 1 shows an embodiment of an alignment structure 103 that includes a first optical component 102 and a second optical component 104. First optical component 102 of the alignment structure 103 is formed in fiber attach unit (FAU) 101. FAU 101 is a mounting structure to which one or more end portions of optical fiber cables 105 are attached and that allow for simultaneous mounting and alignment of one or more of the end facets 115 of fiber cables 105 to one or more optical devices 140 on the PIC interposer 100. PIC interposer 100, as described herein, can be a substrate, interposer, or submount, or other form of structure upon which PIC 110 can be formed. PIC interposer 100 includes PIC 110, a photonic integrated circuit comprised of one or more optical or optoelectrical components such as lasers, photodetectors, waveguides, among others. PIC interposer 100 includes a substrate, an optional electrical interconnect layer with electrical interconnects 132, and a planar waveguide layer, as further described herein.

In the schematic drawings in the top-down view of FIG. 1A and Section A-A' of FIG. 1C, the optical axis 112 of the first optical component 102 of the alignment structure 103 is shown in substantial alignment with the optical axis 114 of the second optical component 104 of the alignment structure 103. Optical axes 112, 114 are the centers, or approximate centers of the optical feature of the first and second optical components 102, 104, respectively. Correspondingly, in the top-down view of FIG. 1A and Section B-B' of FIG. 1D, the optical axis 116*a* of fiber optic cable 105*a* on the FAU 101 are shown to be in substantial alignment with the optical axes of an optical component 140*a* on the PIC 110. Optical component 140*a* can be a waveguide, for example, a lens, a spot size converter, or any of a number of optical devices for facilitating the sending and receiving of optical signals from fiber optic cable 105*a*. Similarly, the optical component 140*b* can be the same or a different waveguide, for example, or the same or different lens, a spot size converter, or any of a number of optical devices for facilitating the sending and receiving of optical signals from fiber optic cable 105*b*. In FIG. 1A, the terminal ends of two optical fibers 105*a*, 105*b* are shown in FAU 101. In other embodiments, more than two optical fibers may be provided to the FAU 101. In yet other embodiments, one optical fiber may be attached to the FAU 101. In some embodiments, the fiber optic cables 105*a*, 105*b* can be single mode optical fibers, and in yet other embodiments, the fiber optic cables can be multi-mode fibers. A right end view of the FAU 101 with a first optical component of the alignment structure 103 and with fiber cables 105*a*, 105*b* is shown in FIG. 1B. The end view shows base portion 101*a* and cap portion 101*b* of the FAU 101. The base portion 101*a* is shown in contact with the FAU landing site 150 on the interposer 100. An adhesive material may be placed between the landing site 150 and the FAU base portion 101*a* in this and other embodiments described herein. In embodiments, the adhesive material may be, for example, a liquid material that cures after allowance for alignment of the FAU 101. Curing of the adhesive material may be accelerated in some embodiments using one or more of UV light, heat, or other means commonly used in the art for bonding FAUs to PIC substrates.

Alignment of the optical axes 112, 114 of the first and second optical components 102, 104, respectively, and the corresponding alignment of the optical axes 116*a*, 116*b* of the fiber optic cables 105*a*, 105*b* with the one or more optical components 140*a*, 140*b* of the PIC 110, respectively, can result in the alignment of the end facets 115*a*, 115*b* of the fiber optic cables 105*a*, 105*b*, respectively, with the end facets 145*a*, 145*b* of optical devices 140*a*, 140*b*, respectively, on the PIC 110 as shown in FIGS. 1A and 1*n* Section B-B' in 1D. The end facets 115*a*,115*b* of the fiber optic cables 105*a*, 105*b*, respectively, are shown to be in substantial alignment with the end facets 145*a*,145*b* of optical components 140*a*,140*b*, respectively, to allow for the coupling of optical signals between these optical components 140*a*, 140*b* and the connected fiber optic cables 105*a*, 105*b*, respectively, so that optical signals propagating through the fiber optic cables 105*a*, 105*b*, for example, can be coupled to optical or optoelectrical device 128 of PIC 110, and optical signals from the device 128, for example, on the PIC 110 can be delivered to the attached fiber optic cables 105*a*, 105*b*. The effectiveness of the coupling and transfer of the optical signals between the attached fiber optic cables 105*a*, 105*b* and the optical components 140*a*, 140*b* of the PIC 110 benefits from the quality of the alignment between the one or more of the optical axes 116 and the end facets 115*a*, 115*b* of the fiber optic cables 105*a*, 105*b* on the FAU 101, and the one or more of the optical axes 118 and the end facets 145*a*, 145*b* of the optical components 140*a*, 140*b*, respectively, of the PIC 110 on the PIC interposer 100. In some embodiments, the optical components 140*a*, 140*b* can be the same to facilitate incoming and outgoing optical signals. In other embodiments, the optical components 140*a*, 140*b* can differ for example, to facilitate the requirements for incoming and outgoing optical signals.

Effective alignment of the fiber optic cables 105*a*, 105*b* on the FAU 101 with optical components 140*a*, 140*b* of the PIC 110, is simplified with the use of the alignment structure 103 and external testing apparatus 160, in that the alignment of the first and second optical components 102, 104 can be performed without the need to power or otherwise access the devices contained within the PIC 110.

External testing apparatus 160, in the embodiment shown in FIGS. 1A and 1C, is comprised of electrical or optoelectrical measurement device 166, optical emitting device 162, and optical detecting device 164. In the embodiment shown, optical emitting device 162 is shown to be optically coupled to the first optical component 102 of the alignment structure 103, and the optical detecting device 164 is shown to be optically coupled to the second optical component 104 of the alignment structure 103.

In other embodiments, the optical emitting device 162 can be optically coupled to the second optical component 104 of the alignment structure 103, and the optical detecting device 164 can be optically coupled to the first optical component 102 of the alignment structure 103. And in yet other embodiments, an optical emitting device 162 can be optically coupled to both the first optical component 102 and the second optical component 104 of the alignment structure 103, and an optical detecting device 164 can be optically coupled to the first optical component 102 and the second optical component 104 of the alignment structure 103. And in yet other embodiments, multiple optical emitting devices 162 can be optically coupled to both the first optical component 102 and the second optical component 104 of the alignment structure 103, and multiple optical detecting devices 164 can be optically coupled to the first optical component 102 and the second optical component 104 of the alignment structure 103.

Details of the alignment structure 103, as shown in FIG. 1, are further described in conjunction with the method of alignment shown in FIG. 2. FIG. 2 shows an embodiment for a method of alignment 190 using the alignment structure 103 that includes a first optical component 102 on an FAU 101, and a second optical component 104 on a PIC interposer 100 to which the FAU 101 is to be aligned and mounted.

Step 191, of alignment method 190, is a positioning step within which an FAU 101 is positioned onto a PIC interposer 100. FAU 101 includes the terminal portions of one or more fiber optic cables 105*a*, 105*b* and also includes the first optical component 102 of an alignment structure 103. In the embodiment shown in FIG. 1, two fiber optic cables 105*a*, 105*b* are shown. In other embodiments, one fiber optic cable or more than two fiber optic cables can be included in the FAU 101. PIC Interposer 100 includes one or more optical components 140*a*, 140*b* of PIC 110 to be aligned with the fiber optic cables 105*a*, 105*b* of the FAU 101, and also includes second optical component 104 of the alignment structure 103.

In some embodiments, the placement of the FAU 101 in the positioning step 191 onto the PIC interposer 101 can be facilitated with alignment marks on one or more of the FAU 101 and the PIC interposer 100, and further facilitated using automated placement apparatus with pattern recognition software. Alignment marks on one or more of the FAU 101 and the PIC interposer 100 will facilitate close positioning of the FAU 101 but the positioning can be further improved and validated using the alignment structure 103 as further described herein.

In embodiments in which the positioning of the FAU 101 onto the PIC 100 results in a partial alignment of the optical axis 112 of the first optical component 102 with the optical axis 114 of the second optical component 104, a portion of an optical signal propagating through the alignment structure 103 can be detected with optical detector 164 of the external testing apparatus 160.

Step 192 of alignment method 190 is an applying step within which an optical signal is applied from the emitting device 162 of external testing apparatus 160 to the first optical component 102 of the alignment structure 103, wherein the applied optical signal from the emitting device 162 propagates at least partially through the at least partially aligned first and second optical components 102, 104, respectively. In embodiments in which the positioning of the FAU 101 onto the PIC interposer 100 does not result in a partial alignment of the optical axis 112 of the first optical component 102 with the optical axis of the second optical component, such that no portion of the signal can be detected by the detector 164 of the external testing apparatus 160, further mechanical alignment by way of alignment marks may be required until a portion of an optical signal propagating through the alignment structure can be detected by the detector 164 of the external testing apparatus.

Step 193 of alignment method 190 is a measuring step within which one or more characteristics of the at least partial optical signal propagating through the at least partially aligned first optical component 102 and second optical component 104 of the alignment structure 103 is detected and measured with detecting device 164 of external testing apparatus 160.

Step 194 of alignment method 190 is an assessing step within which a measured characteristic of the optical signal 170, such as intensity or other characteristic, for example, is assessed to compare the quality of the alignment between the first optical component 102 and the second optical component 104 of the alignment structure 103 to a target value or set of target values. A target value, can be, for example, a threshold value, a control value, expected value, a range of values, or other value that when compared to the measured value can be used to assess the quality of alignment between the first and second optical components 102, 104, and therefore to the quality of the alignment between the fiber optic cables 105*a*, 105*b* of the FAU 101 and the optical components 140*a*, 140*b* of the PIC 110 on the PIC interposer 100. In some embodiments, the target value or set of target values can include a measure of uniformity or other spatially dependent information. In an embodiment, for example, a multimode fiber is used for optical component 102, and multiple signals from one or more modes of the multimode fiber are detected. In this embodiment, the target value or set of target values can include spatially dependent information from one or more of the modes. In a simple embodiment, a target value is obtained in the detector 164 from the center mode of the multimode fiber 102 and a second target value is obtained from an edge mode of the multimode fiber 102. A measure of the spatial uniformity, and hence the quality of the alignment, can be obtained by comparing the center and edge signals. In other embodiments, multiple signals can be detected and compared from the edge modes of the signals from the edge modes of the multimode fiber to provide additional target values that can lead to improved assessments of the quality of the alignment between the first and second optical components 102, 104 of the alignment structure 103.

Step 195 of the alignment method 190 is an adjusting step, within which the position of the one or more of the FAU 101 and the PIC interposer 100 is adjusted, and with the adjustment in position of the one or more of the FAU 101 and the PIC interposer 100, the positions of one or more of the first optical component 102 and the second optical component 104 that are formed on the FAU 101 and the PIC 100, respectively, are also adjusted. Adjustments in the adjusting step 195 enable improvements in the quality of the alignment between the first optical component 102 and the second optical component 104 of the alignment structure 103, and therefore in the alignment between the terminal portions of the fiber optic cables 105*a*, 105*b* in the FAU 101 and the optical devices 140*a*, 140*b* on the PIC interposer 100. In a preferred embodiment, a characteristic of the optical signal 170 is continuously monitored while adjusting the position of the FAU 101 while the PIC interposer 100 is fixed in position. The characteristic of the optical signal 170 is continuously monitored in this preferred embodiment to assess improvements in the alignment of the first component 102 and the second component 104 of the alignment structure 103 that result from the adjustments in the positions of the FAU 101. Adjustments to the positions of the FAU 101 on the PIC interposer 100 continue until the measured value from the detector 164 for a characteristic of the optical signal propagating through the first optical component 102 on the FAU 101 and the second optical component 104 on the PIC 100 is in accordance with a target value, or set of target values.

In another embodiment, a characteristic of the optical signal 170 is not continuously monitored, but rather a characteristic of the optical signal 170 is detected, measured, and the monitoring is suspended until an adjustment is made to one or more of the positions of the FAU 101 and the PIC interposer 100, and then monitored again after the adjustment is made, to assess the quality of the alignment between the first optical component 102 and the second optical component 104 of the alignment structure 103.

In other embodiments, other combinations of continuous and non-continuous monitoring can be used in the sequence of detecting, measuring, and adjusting to assess and improve the quality of the alignment between the first optical component 102 and the second optical component 104 of the alignment structure 103, and therefore, between the fiber optic cables 105*a*, 105*b* on the FAU 101 and the optical components 140*a*, 140*b* on the PIC interposer 100 to which the fiber optic cables 105*a*, 105*b*, respectively, are to be aligned.

Step 196 of alignment method 190 is a securing step, within which the FAU 101 is secured into an aligned position on the PIC interposer 100. Having aligned the first optical component 102 and the second optical component 104 of the alignment structure 103, and thereby causing the alignment of the one or more optical fiber cables 105*a*, 105*b* on the FAU 101 to be aligned with the one or more optical devices 140*a*, 140*b*, respectively, on the PIC interposer 100, the securing of the FAU 101 into the aligned position on the PIC interposer 100 ensures that the alignment is maintained upon removal of the apparatus used for mechanical positioning of the FAU 101 and the PIC interposer 100. The FAU 101 can be secured, for example, using an epoxy of other form of adhesive or bonding material to secure the FAU 101 into the aligned position on the PIC interposer 101.

Step 197 of alignment method 190 is an optional reassessing step, wherein the alignment of the first optical component 102 and the second optical component 104 is reassessed after the securing step. In Step 197, one or more of the step 192, step 193, and step 194 of method 190 can be repeated to assess the quality of the alignment between the first optical component 102 and the second optical component 104 after completion of the securing step. Step 197 may also include a marking process in which the measured device structure is marked with the assessed value, or a marking related to the assessed value. Identification of the assessed value is useful for grouping or binning of the completed devices for quality control and other purposes. Some examples of markings can include the actual value of the characteristic measured, a value derived from the measured characteristic value, a pass or fail marking, among others.

Alignment method 190 describes an embodiment of a method for aligning an FAU 101 to a PIC interposer 100. The method of alignment using the alignment structure 103 is applicable to the mounting of an FAU 101, in general, after singulation of the individual PIC chips from a wafer level fabrication process. Singulated PIC interposer chips are commonly mounted into packages that can be incorporated into optical and optoelectrical networks. Examples of packages for supporting optical and optoelectrical chip mounting with allowance for optical fiber coupling are the family of quad small form-factor pluggable (QSFP) packages. QSFP connectors, and the numerous packages derived from the basic QSFP connector, are well known in the art of pluggable photonics packaging. Use of the alignment structure 103 and the alignment method 190 are well suited for alignment of the FAUs 101 that interface with QSFP packages, among others. Other packages can also be used with these and other embodiments of the alignment structures and methods described herein.

FIG. 3 shows an embodiment of an alignment structure 303 that includes a first optical component 302 and a second optical component 304. In the embodiment shown in FIG. 3, first optical component 302 of the alignment structure 303 is a waveguide formed in fiber attach unit (FAU) 301. In an example embodiment, the waveguide is a fiber optic cable. In other embodiments, other forms of optical waveguide may be used. FAU 301 is a mounting structure to which one or more terminal portions of optical fiber cables 305*a*,305*b* are provided, and that allow for the simultaneous mounting of these one or more fiber cable terminations and the simultaneous alignment of the end facets 315*a*,315*b* of the fiber cables 305*a*,305*b*, respectively, to the one or more corresponding end facets 345*a*,345*b*, respectively, of the optical devices 344*a*,344*b*, respectively, on the PIC interposer 300. Optical devices 344*a*,344*b* can be, for example, a planar waveguide, a planar waveguide combined with a lens, a spot size converter, a planar waveguide coupled to a spot size converter, among other forms and combinations of optical devices. PIC interposer 300, as described herein, can be a substrate, interposer, or submount, or other structure upon which PIC 310 can be formed. PIC interposer 300 includes PIC 310, a photonic integrated circuit comprised of one or more optical or optoelectrical components such as lasers 322 and photodetectors 324, waveguides, and arrayed waveguides, among others. PIC interposer 300 includes a substrate 320, an optional electrical interconnect layer 313 with electrical interconnects 332, and a planar waveguide layer from which planar waveguides 344 are patterned. One or more dielectric layers 338 may be formed in some embodiments, below the planar waveguide layer, above the planar waveguide layer, and otherwise encompassing the planar waveguide layer. The dielectric layer may be one or more of a buffer layer, a spacer layer, a planarization layer, a cladding layer, among other forms of dielectric layers. Electrical interconnects 332 in optional electrical interconnect layer 313 may connect to one or more electrical or optoelectrical devices 322, 324 and may connect interfaces 331 having electrical contacts 330.

In the schematic drawings in the top-down view of FIG. 3A and Section A-A' of FIG. 3C, the optical axis 312 of the first optical component 302 of alignment structure 303 is shown in substantial alignment with the optical axis 314 of the second optical component 304 of the alignment structure 303. Second optical component 304 of the alignment structure 303 is shown as a combination of an upturned mirror or reflector 304*a* and a short length of optical waveguide 304*b*. Optical signal 370 is shown in Section A-A' of FIG. 3C emitted from emitter 362 of the external testing apparatus 360, and reflected from upturned mirror 304*a* to the detector 364 in this embodiment. The alignment of the optical components 302, 304 of the alignment structure 303 correspondingly results in the alignment between the optical axes 316*a*,316*b* of the fiber optic cables 305*a*,305*b* provided on the FAU 301 and the optical axes 318*a*,318*b* of optical components 344*a*, 344*b* on the PIC interposer 300, as shown in the top-down view of FIG. 3A and Section B-B' of FIG. 3D. Optical components 344*a*,344*b* can be a waveguide, for example, a lens, a spot size converter, among other optical devices for coupling optical signals from and to fiber optic cables 305*a*,305*b*. In FIGS. 3A, the terminal ends of two optical fibers 305*a*,305*b* are shown. In other embodiments, more than two optical fibers may be provided with the FAU 301. In yet other embodiments, one optical fiber may be attached to the FAU 301. In some embodiments, the fiber optic cables in the FAU 301 can be single mode optical fibers, and in yet other embodiments, the fiber optic cables can be multi-mode fibers. In some embodiments, the optical component 302 can be a multimode waveguide or a multimode optical fiber.

In the embodiment in FIGS. 3A-3D, FAU 301 is shown comprised of FAU base 301*a* and FAU cap 301*b*. Either or both of the FAU 301 may be grooved or slotted or otherwise formed to facilitate alignment of the mounted fibers within the FAU 301. The right end view of FAU 301 with a first optical component of the alignment structure 303 and having fiber cables 105*a*, 105*b* is shown in FIG. 3B. The end view shows base 301*a* and cap 301*b* of the FAU 301. The base portion 301*a* is shown in contact with the FAU landing site 350 on the interposer 300. An adhesive material may be placed between the landing site 350 and the FAU base portion 301*a* in this and other embodiments described herein.

Alignment of the optical axes 312, 314 of the first and second optical components 302, 304, respectively, and the corresponding alignment of the optical axes 316*a*, 316*b* of the fiber optic cables 305*a*,305*b* and the one or more optical components 344*a*,344*b*, respectively, of the PIC 310 can result in the alignment of the end facets 315*a*,315*b* of the fiber optic cables 305*a*,305*b* with the end facets 345*a*,345*b* of optical devices 344*a*,344*b*, respectively, on the PIC 310 as shown in FIGS. 3A and 3D. The end facets 315*a*,315*b* of the fiber optic cables 305*a*. 305*b*, respectively, are shown to be in substantial alignment with the end facets 345*a*,345*b*, respectively, of optical components 344*a*, 344*b*, respectively, to allow for the coupling and transfer of optical signals to and from the connected fiber optic cables 305*a*, 305*b*, respectively, so that optical signals propagating through the fiber optic cables 305*b*, for example, can be delivered to optical or optoelectrical devices such as optoelectrical receiving device 324 of PIC 310, and optical signals from optical or optoelectrical devices such as sending device 322 on the PIC 310 can be delivered to attached fiber optic cables 305*a*. Other optical and optoelectrical devices, such as arrayed waveguides and other forms of non-sending and non-receiving devices may also be coupled to the attached fiber optic cables in the FAU 301. The effectiveness of the coupling and transfer of the optical signals between the attached fiber optic cables 305*a*,305*b* and the optical components 344*a*, 344*b*, respectively, of the PIC 310 benefits from the quality of the alignment between the one or more of the optical axes 316*a*,316*b* and the end facets 315*a*,315*b* of the fiber optic cables 305*a*,305*b*, respectively, on the FAU 301, and the one or more of the optical axes 318*a*,318*b* and the end facets 345*a*,345*b* of the optical components 344*a*,344*b*, respectively, of the PIC 310 on the PIC interposer 300. In some embodiments, the optical components 344*a*, 344*b* can be similar optical components coupled to the optical fibers in the FAU 301 to facilitate incoming and outgoing optical signals. In other embodiments, the optical components 344*a*, 344*b* can be different optical components coupled to the optical fibers, for example, to facilitate the requirements for incoming and outgoing optical signals.

Effective alignment of the fiber optic cables 305*a*,305*b* on the FAU 301 with optical components 344*a*, 344*b* of the PIC 310, is simplified with the use of the alignment structure 303, in that the alignment of the first and second optical components 302, 304 can be performed without the need to power or otherwise access the devices contained within the PIC 310.

Also shown in FIG. 3 is external testing apparatus 360, comprised of electrical or optoelectrical measurement device 366, optical emitting device 362, and optical detecting device 364. In the embodiment shown, optical emitting device 362 is shown to be optically coupled to the first optical component 302 of the alignment structure 303, and the optical detecting device 364 is shown to be optically coupled to the second optical component 304 of the alignment structure 303. In other embodiments, the optical emitting device 362 can be optically coupled to the second optical component 304 of the alignment structure 303, and the optical detecting device 364 can be optically coupled to the first optical component 302 of the alignment structure 303. And in yet other embodiments, an optical emitting device 362 can be optically coupled to both the first optical component 302 and the second optical component 304 of the alignment structure 303, and an optical detecting device 364 can be optically coupled to the first optical component 302 and the second optical component 304 of the alignment structure 303. And in yet other embodiments, multiple optical emitting devices 362 can be optically coupled to both the first optical component 302 and the second optical component 304 of the alignment structure 303, and multiple optical detecting devices 364 can be optically coupled to the first optical component 302 and the second optical component 304 of the alignment structure 303.

Figure 4:
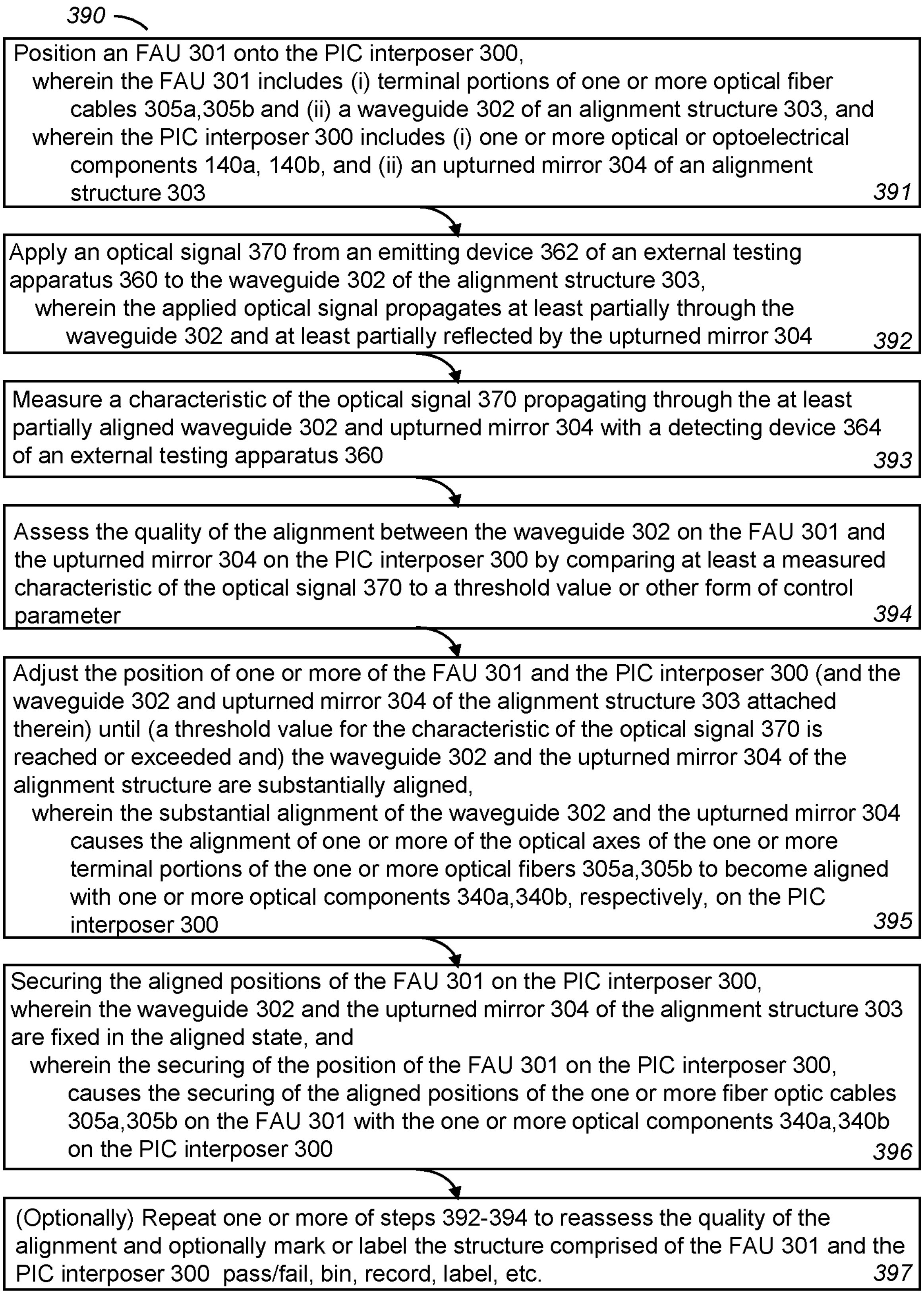
FIG. 4. An embodiment of a method of alignment using an embodiment of the alignment structure shown in FIG. 3.

Details of the alignment structure 303, as shown in FIG. 3, are further described in conjunction with the method of alignment shown in FIG. 4. FIG. 4 shows an embodiment for a method of alignment 390 using the alignment structure 303 that includes a first optical component 302 on an FAU 301, and a second optical component 304 on a PIC interposer 300 to which the FAU 301 is to be aligned and mounted. The first optical component 302 in the embodiment shown in FIG. 3, is a waveguide provided in the FAU 301 and the second optical component 304 is an upturned mirror.

Step 391, of alignment method 390, is a positioning step within which an FAU 301 is positioned onto a PIC interposer 300. FAU 301 includes the terminal portions of one or more fiber optic cables 305*a*,305*b* and also includes the first optical component 302 of an alignment structure 303. In the embodiment shown in FIG. 3, two fiber optic cables 305*a*,

305*b* are shown. In other embodiments, one fiber optic cable or more than two fiber optic cables can be included in the FAU 301. PIC interposer 300 includes one or more optical components 340*a*,340*b* of PIC 310 to be aligned with the fiber optic cables 305*a*,305*b* of the FAU 301, and also includes second optical component 304, an upturned mirror, of the alignment structure 303.

In some embodiments, the placement of the FAU 301 in the positioning step 391 onto the PIC interposer 301 can be facilitated with alignment marks on one or more of the FAU 301 and the PIC interposer 300, and further facilitated, for example, using automated placement apparatus with pattern recognition software. Alignment marks on one or more of the FAU 301 and the PIC interposer 300 will facilitate close positioning of the FAU 301 but the positioning can be further improved and validated using the alignment structure 303 as further described herein.

In embodiments in which the positioning of the FAU 301 onto the PIC 300 results in a partial alignment of the optical axis 312 of the first optical component 302 with the optical axis 314 of the second optical component 304, a portion of an optical signal propagating through the alignment structure 303 can be detected with optical detector 364 of the external testing apparatus 360.

Step 392 of alignment method 390 is an applying step within which an optical signal 370 is coupled from the emitting device 362 of external testing apparatus 360 to the waveguide 302 of the alignment structure 303, and wherein the coupled optical signal 370 from the emitting device 362 propagates at least partially through the at least partially aligned waveguide 302 and is at least partially reflected by the upturned mirror 304 to the detector 364. In embodiments in which the positioning of the FAU 301 onto the PIC interposer 300 does not result in a partial alignment of the optical axis 312 of the waveguide 302 with the optical axis of the upturned mirror, such that no portion of the signal can be detected by the detector 364 of the external testing apparatus 360, further mechanical alignment by way of alignment marks may be required until a portion of an optical signal propagating through the alignment structure can be detected by the detector 364 of the external testing apparatus.

Step 393 of alignment method 390 is a measuring step within which one or more characteristics of the at least partial optical signal propagating through the at least partially aligned waveguide 302 and the upturned mirror 304 of the alignment structure 303 is detected and measured with detecting device 364 of external testing apparatus 360.

Step 394 of alignment method 390 is an assessing step within which a measured characteristic of the optical signal 370, such as intensity, uniformity, symmetry, polarization, power, or other characteristic or combination of characteristics, for example, is assessed to compare the quality of the alignment between the waveguide 302 in the FAU 301 and the upturned mirror 304 of the alignment structure 303 to a target value or set of target values. A target value, can be, for example, a threshold value, a control value, expected value, a range of values, or other value that when compared to the measured value can be used to assess the quality of alignment between the waveguide 302 and the upturned mirror 304, and therefore to the quality of the alignment between the fiber optic cables 305*a*, 305*b* of the FAU 301 and the optical components 340*a*, 340*b* of the PIC 310 on the PIC interposer 300. In some embodiments, the target value or set of target values can include a measure of uniformity or other spatially dependent information. In an embodiment, for example, a multimode fiber is used for optical component 302, and multiple signals from one or more modes of the multimode fiber are detected. In this embodiment, the target value or set of target values can include spatially dependent information from one or more of the modes. In a simple embodiment, a target value is obtained in the detector 364 from the center mode of the multimode fiber 302 and a second target value is obtained from an edge mode of the multimode fiber 302. A measure of the spatial uniformity, and hence the quality of the alignment, can be obtained by comparing the center and edge signals. In other embodiments, multiple signals can be detected and compared from the edge modes of the signals from the edge modes of the multimode fiber to provide additional target values that can lead to improved assessments of the quality of the alignment between the first and second optical components 302, 304 of the alignment structure 303.

Step 395 of the alignment method 390 is an adjusting step, within which the position of the one or more of the FAU 301 and the PIC interposer 300 is adjusted, and with the adjustment in position of the one or more of the FAU 301 and the PIC interposer 300, the positions of one or more of the waveguide 302 on the FAU 301 and the upturned mirror 304 on the PIC 300 are also adjusted. Adjustments in the adjusting step 395 enable improvements in the quality of the alignment between the waveguide 302 and the upturned mirror 304 of the alignment structure 303, and therefore in the alignment between the terminal portions of the fiber optic cables 305*a*,305*b* in the FAU 301 and the optical devices 340*a*,340*b* on the PIC interposer 300. In a preferred embodiment, a characteristic of the optical signal 370 is continuously monitored with external testing apparatus 360, including detector 364, while adjusting the position of the FAU 301 while the PIC interposer 300 is fixed in position. The characteristic of the optical signal 370 is continuously monitored in this preferred embodiment to assess improvements in the alignment of the waveguide 302 and the upturned mirror 304 of the alignment structure 303 that result from the adjustments in the positions of the FAU 301. Adjustments to the positions of the FAU 301 on the PIC interposer 300 continue until the measured value from the detector 364 for a characteristic of the optical signal propagating through the waveguide 302 on the FAU 301 and the upturned mirror 304 on the PIC 300 is in accordance with a target value, or set of target values.

In another embodiment, a characteristic of the optical signal 370 is not continuously monitored, but rather a characteristic of the optical signal 370 is detected, measured, and the monitoring is suspended until an adjustment is made to one or more of the positions of the FAU 301 and the PIC interposer 300, and then monitored again after the adjustment is made, to assess the quality of the alignment between the waveguide 302 and the upturned mirror 304 of the alignment structure 303.

In other embodiments, other combinations of continuous and non-continuous monitoring can be used in the sequence of detecting, measuring, and adjusting to assess and improve the quality of the alignment between the waveguide 302 and the upturned mirror 304 of the alignment structure 303, and therefore, between the fiber optic cables 305*a*,305*b* on the FAU 301 and the optical components 340*a*,340*b* on the PIC interposer 300 to which the fiber optic cables 305*a*,305*b*, respectively, are to be aligned.

Step 396 of alignment method 390 is a securing step, within which the FAU 301 is secured into an aligned position on the PIC interposer 300. Having aligned the waveguide 302 and the upturned mirror 304 of the alignment structure 303, and thereby causing the alignment of the one or more optical fiber cables 305*a*,305*b* on the FAU 301 to be aligned with the one or more optical devices 340*a*,340*b*, respectively, on the PIC interposer 300, the securing of the FAU 301 into the aligned position on the PIC interposer 300 ensures that the alignment is maintained upon removal of the apparatus used for mechanical positioning of the FAU 301 and the PIC interposer 300. The FAU 301 can be secured, for example, using an epoxy of other form of adhesive or bonding material to secure the FAU 301 into the aligned position on the PIC interposer 301. The FAU 301, in some embodiments, can be secured in the aligned position using screws, bolts, or other connecting hardware.

Step 397 of alignment method 390 is an optional reassessing step, wherein the alignment of the first optical component 302 and the second optical component 304 is reassessed after the securing step. In Step 397, one or more of the step 392, step 393, and step 394 of method 390 can be repeated to assess the quality of the alignment between the waveguide 302 and the upturned mirror 304 after completion of the securing step. Step 397 may also include a marking process in which the measured device structure is marked with the assessed value, or a marking related to the assessed value. Identification of the assessed value is useful for grouping or binning of the completed devices for quality control and other purposes. Some examples of markings can include the actual value of the characteristic measured, a value derived from the measured characteristic value, a pass or fail marking, among others.

Alignment method 390 describes an embodiment of a method for aligning an FAU 301 to a PIC interposer 300. The method of alignment using the alignment structure 303 is applicable to the mounting of an FAU 301, in general, after singulation of the individual PIC chips from a wafer level fabrication process. Singulated PIC interposer chips are commonly mounted into packages that can be incorporated into optical and optoelectrical networks. Examples of packages for supporting optical and optoelectrical chip mounting with allowance for optical fiber coupling are the family of quad small form-factor pluggable (QSFP) packages. QSFP connectors, and the numerous packages derived from the basic QSFP connector, are well known in the art of pluggable photonics packaging. Use of the alignment structure 303 and the alignment method 390 are well suited for alignment of the FAUs 301 that interface with QSFP packages, among others. Other packages can also be used with these and other embodiments of the alignment structures and methods described herein. In some embodiment, packages can provide for the aligning and mounting of multiple PIC interposers 300.

FIG. 5 shows PIC 500 with two alignment structures 503*a*,503*b* that each include a first optical component 502 and a second optical component comprised of an upturned mirror 504*a* and a waveguide 504*b*. Use of multiple alignment structures 503*a*,503*b* enables additional alignment information such as rotational alignment information pertaining to the alignment between the optical components on the FAU 501 and the optical components on the PIC interposer 500. In the embodiment shown in FIG. 5, first optical components 502 of the alignment structures 503*a*, 503*b* are waveguides formed in fiber attach unit (FAU) 501. In an example embodiment, a waveguide 502 can be a length of fiber optic cable. In other embodiments, other lengths and forms of optical waveguide may be used. FAU 501 is a mounting structure to which one or more terminal portions of optical fiber cables 505*a*, 505*b*, for example, are attached, and that allow for the simultaneous mounting of these one or more fiber cable terminations and the simultaneous alignment of the end facets 515*a*, 515*b* of the fiber cables 505*a*, 505*b*, respectively, to the one or more corresponding end facets 545*a*, 545*b*, respectively, of the optical devices 544*a*, 544*b*, respectively, on the PIC interposer 500. Optical devices 544*a*,544*b* can be, for example, a planar waveguide, a planar waveguide combined with a lens, a planar waveguide coupled to a spot size converter, among other forms and combinations of optical devices. PIC interposer 500, as described herein, can be a substrate, interposer, or submount, or other structure upon which PIC 510 can be formed. PIC interposer 500 includes PIC 510, a photonic integrated circuit comprised of one or more optical or optoelectrical components such as lasers 522 and photodetectors 524, waveguides, and arrayed waveguides, among others. PIC interposer 500 includes a substrate 520, an optional electrical interconnect layer 513 with electrical interconnects 532, and a planar waveguide layer from which planar waveguides 544*a*, 544*b*, can be patterned. One or more dielectric layers 538 may be formed in some embodiments, below the planar waveguide layer, above the planar waveguide layer, and otherwise encompassing the planar waveguide layer. The dielectric layer may be one or more of a buffer layer, a spacer layer, a planarization layer, a cladding layer, among other forms of dielectric layers. Electrical interconnects 532 in optional electrical interconnect layer 513 may connect to one or more electrical interfaces 531 with electrical contacts 530.

In the schematic drawings in the top-down view of FIG. 5A and Section A-A' of FIG. 5C, the optical axes 512 of the waveguide 502 of the alignment structures 503*a*,503*b* are shown in substantial alignment with the optical axis 514 of the constituents of the second optical components 504*a*, 504*b* of the alignment structures 503*a*,503*b*. The second optical components of the alignment structures 503*a*, 503*b* in the embodiment shown are a combination of an upturned mirror 504*a* and an optical waveguide 504*b*. Example optical signals 570 are shown in Section A-A' of FIG. 5C emitted from emitters 562 of the external testing apparatus 560, and reflected from upturned mirrors 504*a* to the detectors 564 in this embodiment. The alignment of the optical components 502, 504*a*,504*b* of the alignment structures 503*a*,503*b* correspondingly results in the alignment between the optical axes 516*a*,516*b* of the fiber optic cables 505*a*, 505*b* provided on the FAU 501 and the optical axes 518*a*, 518*b* of optical components 544*a*, 544*b* on the PIC interposer 500, as shown in the top-down view of FIG. 5A and Section B-B' of FIG. 5D. Optical component 544*b* can be a waveguide, for example, a lens, a spot size converter, among other optical devices for coupling optical signals from fiber optic cables 505*a*, 505*b* to the PIC 510. In FIGS. 5A, the terminal ends of two optical fibers 505*a*,505*b* are shown. In other embodiments, more than two optical fibers may be attached to the FAU 501. In yet other embodiments, one optical fiber may be attached to the FAU 501. In some embodiments, the fiber optic cables 505*a*,505*b* can be single mode optical fibers, and in yet other embodiments, the fiber optic cables can be multi-mode fibers. In some embodiments, the first optical components 502 of the alignment structures 503*a*,503*b* in the FAU 501 can be multimode waveguides or multimode optical fibers. The first optical components 502, in embodiments that have more than one alignment structure can be the same first optical components 502 for each alignment structure or the first optical components can be different devices or device types. In an embodiment, for example, a single mode waveguide may be used for a first optical component 502 and a multimode waveguide may be used for another first optical component 502 of the alignment structure. Many other combinations of first optical components 502 may be used in embodiments in which multiple alignment structures 503*a*,503*b* are formed.

In the embodiment in FIGS. 5A-5D, FAU 501 is shown comprised of FAU base 501*a* and FAU cap 501*b*. Either or both of the FAU 501 may be grooved or slotted or otherwise formed to facilitate alignment of the mounted fibers within the FAU 501. A right end view of the FAU 501 with a first optical component of the alignment structure 503 and with fiber cables 505*a*, 505*b* is shown in FIG. 5B. The end view shows base 501*a* and cap 501*b* of the FAU 501. The base portion 501*a* is shown in contact with the FAU landing site 550 on the interposer 500. An adhesive material may be placed between the landing site 550 and the FAU base portion 501*a* in this and other embodiments described herein.

Alignment of the optical axes 512 of the first optical components 502 and the optical axes 514 of the second optical components 504*a*,504*b*, and the corresponding alignment of the optical axes 516*a*, 516*b* of the fiber optic cables 505*a*,505*b*, respectively, and the one or more optical components 544*a*, 544*b* of the PIC 510, respectively, can result in the alignment of the end facets 515*a*,515*b* of the fiber optic cables 505*a*,505*b* with the end facets 545*a*,545*b* of optical devices 544*a*,544*b*, respectively, on the PIC interposer 500 as shown in FIGS. 5A and 5D. The end facets 515*a*,515*b* of the fiber optic cables 505*a*,505*b*, respectively, are shown to be in substantial alignment with the end facets 545*a*,545*b* of optical components 544*a*,544*b*, respectively, to allow for the coupling and transfer of optical signals to and from the connected fiber optic cables 505*a*,505*b*, so that optical signals propagating through the fiber optic cables 505*a*, for example, can be delivered to optical or optoelectrical devices such as optoelectrical receiving device 524 of PIC 510, and optical signals from optical or optoelectrical devices such as sending device 522 on the PIC 510 can be delivered to attached fiber optic cables 505*b*. Other optical and optoelectrical devices, such as arrayed waveguides and other forms of non-sending and non-receiving devices may also be coupled to the attached fiber optic cables 505*a*,505*b* in the FAU 101. The effectiveness of the coupling and transfer of the optical signals between the attached fiber optic cables 505*a*,505*b* and the optical components 544*a*, 544*b* of the PIC 510 benefits from the quality of the alignment between the one or more of the optical axes 516*a*,516*b* and the end facets 515*a*,515*b* of the fiber optic cables 505*a*,505*b* on the FAU 501, and the one or more of the optical axes 518*a*,518*b* and the end facets 545*a*,545*b* of the optical components 544*a*,544*b* of the PIC 510 on the PIC interposer 500. In some embodiments, the optical components 544*a*, 544*b* can be similar optical components coupled to the optical fibers in the FAU 101 to facilitate incoming and outgoing optical signals. In other embodiments, the optical components 544*a*, 544*b* can be different optical components coupled to the optical fibers, for example, to facilitate the requirements for incoming and outgoing optical signals.

Effective alignment of the fiber optic cables 505*a*,505*b* on the FAU 501 with optical components 544*a*, 544*b* of the PIC 510, is simplified with the use of the alignment structures 503*a*,503*b*, in that the alignment of the first optical components 502 and second optical components 504*a*,504*b* can be performed without the need to power or otherwise access the devices contained within the PIC 510.

Shown in FIG. 5 is external testing apparatus 560, comprised of electrical or optoelectrical measurement device 566, optical emitting devices 562, and optical detecting devices 564. In the embodiment shown, optical emitting devices 562 are shown to be optically coupled to the first optical components 502 of the alignment structures 503*a*, 503*b*, and the optical detecting devices 564 are shown to be optically coupled to the waveguide 503*b* and the upturned mirror 504*a* of the second optical components of the alignment structures 503*a*, 503*b*. In other embodiments, optical emitting devices 562 can be optically coupled to the waveguide 504*b* and the upturned mirror 504*a* or other second optical component of the alignment structures 503*a*, 503*b*, and optical detecting devices 564 can be optically coupled to the first optical components 502 of the alignment structures 503*a*, 503*b*.

In another embodiment, a first optical emitting device 562 can be optically coupled to a first optical component 502 of a first alignment structure and second optical emitting device 562 can be optically coupled to a waveguide 504*b* and upturned mirror 504*a* or other second optical component of another alignment structure, and a first optical detecting device 564 can be optically coupled to the waveguide 504*b* and upturned mirror 504*a* or other second optical component of a first alignment structure, and a second optical detecting device 564 can be optically coupled to an other first optical component 502 of the second alignment structures 503*a*, 503*b*.

And in yet other embodiments, optical emitting devices 562 can be optically coupled to the first optical components 502 and the waveguide 504*b* and upturned mirror 504*a* or other second optical components of the alignment structures 503*a*, 503*b*, and optical detecting devices 564 can also be optically coupled to the first optical components 502 and the waveguide 504*b* and upturned mirror 504*a* or other second optical components of the alignment structures 503*a*,503*b*. And in yet other embodiments, multiple optical emitting devices 562 can be optically coupled to both the first optical components 502 and the waveguides 504*b* and upturned mirrors 504*a* or other second optical components of the alignment structures 503*a*,503*b*, and multiple optical detecting devices 564 can also be optically coupled to the first optical component 502 and the waveguide 504*b* and upturned mirror 504*a* or other second optical component of the alignment structures 503*a*,503*b*.

Figure 6:
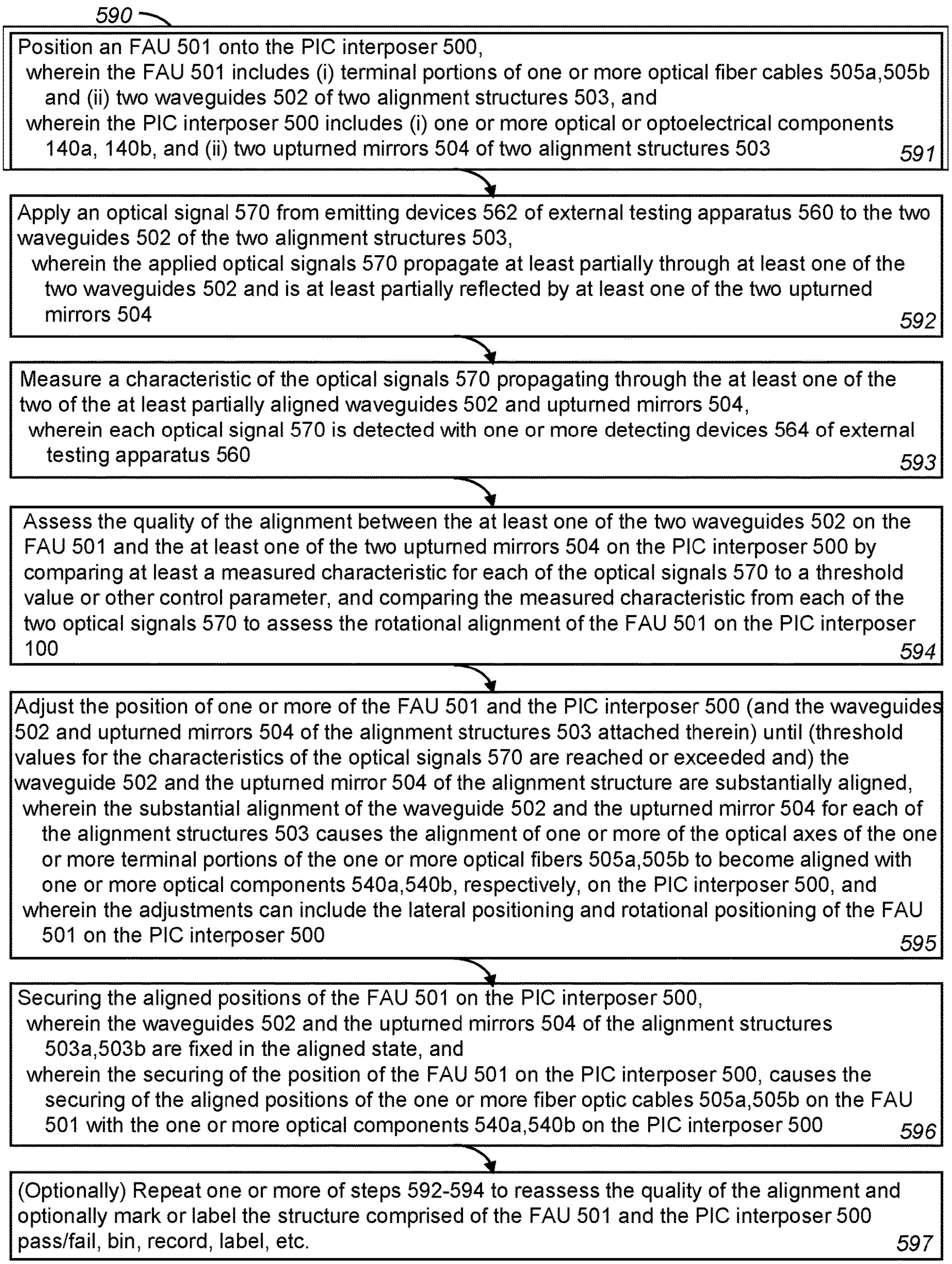
FIG. 6. An embodiment of a method of alignment using an embodiment of the alignment structure provided in FIG. 5.

Details of the alignment structures 503*a*,503*b*, as shown in FIG. 5, are further described in conjunction with the method of alignment shown in FIG. 6. FIG. 6 shows an embodiment for a method of alignment 590 using the alignment structures 503*a*,503*b* that includes a first optical component 502 on an FAU 501, and a second optical component comprised of an upturned mirror 504*a* and a waveguide 504*b* on a PIC interposer 500 to which the FAU 501 is to be aligned and mounted. The first optical component 502 in the embodiment shown in FIG. 5, is a waveguide provided in the FAU 501.

Step 591, of alignment method 590, is a positioning step within which an FAU 501 is positioned onto a PIC interposer 500. FAU 501 includes the terminal portions of one or more fiber optic cables 505*a*,505*b* and, in the embodiment shown in FIG. 5, also includes the first optical component 502 for two alignment structures 503*a*,503*b*. In this embodiment shown in FIG. 5, two fiber optic cables 505*a*,505*b* are shown in the FAU 501. In other embodiments, more than two fiber optic cables can be included in the FAU 501. PIC interposer 500 includes one or more optical components 544*a*,544*b* of PIC 510 to be aligned with the fiber optic cables 505*a*,505*b* of the FAU 501, and also includes second optical component comprised of an upturned mirror 504*a* and a waveguide 504*b*, of the alignment structures 503*a*,503*b*.

In some embodiments, the placement of the FAU 501 in the positioning step 591 onto the PIC interposer 501 can be facilitated with alignment marks on one or more of the FAU 501 and the PIC interposer 500, and further facilitated, for example, using automated placement apparatus with pattern recognition software. Alignment marks on one or more of the FAU 501 and the PIC interposer 500 will facilitate close positioning of the FAU 501. Positioning of the FAU 501 on the PIC interposer 500, however, can be further improved and validated using the alignment structures 503*a*,503*b* as further described herein.

In embodiments in which the positioning of the FAU 501 onto the PIC 500 results in a partial alignment of the optical axis 512 of the first optical component 502 with the optical axis 514 of the second optical component 504*a*,504*b*, a portion of an optical signals 570 propagating through each of the alignment structures 503*a*,503*b* can be detected with optical detector 564 of the external testing apparatus 560.

Step 592 of alignment method 590 is an applying step within which optical signals 570 are coupled from an emitting device 562 of an external testing apparatus 560 to each of the waveguides 502 of the alignment structures 503*a*, 503*b*, and wherein the coupled optical signals 570 from the emitting devices 562 propagate at least partially through at least one of the at least partially aligned waveguides 502 and are at least partially reflected by at least one of the upturned mirrors 504*b* to one or more of the detectors 564. In embodiments in which the positioning of the FAU 501 onto the PIC interposer 500 does not result in a partial alignment of the optical axis 512 of at least one of the waveguides 502 with the optical axis of at least one of the upturned mirrors 504*a*, such that no portion of the signal can be detected by the detector 564 of the external testing apparatus 560, further alignment by way of alignment marks may be required until a portion of an optical signal 570 propagating through the alignment structure can be detected by the detector 564 of the external testing apparatus 560.

Step 593 of alignment method 590 is a measuring step within which one or more characteristics of the at least partial optical signal propagating through at least one of the at least partially aligned waveguide 502 and the upturned mirror 504*b* of the alignment structures 503*a*,503*b* is detected and measured with detecting device 564 of external testing apparatus 560.

Step 594 of alignment method 590 is an assessing step within which a measured characteristic of at least one of the optical signals 570, such as intensity, uniformity, symmetry, polarization, power, or other characteristic or combination of characteristics, for example, is assessed to compare the quality of the alignment between the waveguide 502 in the FAU 501 and the upturned mirror 504*a* of the alignment structures 503*a*,503*b* to a target value or set of target values. A target value, can be, for example, a threshold value, a control value, expected value, a range of values, or other value that when compared to the measured value can be used to assess the quality of alignment between the waveguides 502 and the upturned mirrors 504*a*, and therefore to the quality of the alignment between the fiber optic cables 505*a*, 505*b* of the FAU 501 and the optical components 544*a*, 544*b* of the PIC 510 on the PIC interposer 500. In some embodiments, the target value or set of target values can include a measure of uniformity or other spatially dependent information. In an embodiment, for example, a multimode fiber is used for optical component 502, and multiple signals from one or more modes of the multimode fiber are detected. In this embodiment, the target value or set of target values can include spatially dependent information from one or more of the modes. In a simple embodiment, a target value is obtained in the detector 564 from the center mode of the multimode fiber 502 and a second target value is obtained from an edge mode of the multimode fiber 502. A measure of the spatial uniformity, and hence the quality of the alignment, can be obtained by comparing the center and edge signals. In other embodiments, multiple signals can be detected and compared from the edge modes of the signals from the edge modes of the multimode fiber to provide additional target values that can lead to improved assessments of the quality of the alignment between the first and second optical components of the alignment structures 503*a*, 503*b*.

In addition to the target value for a measure of the optical signals 570 from each of the alignment structures 503*a*, 503*b*, a measure of comparison may also be obtained for the two measured values to achieve a target level of alignment for the two alignment structures 503*a*, 503*b*. In an embodiment, for example, the intensity of an optical signal 570 propagating through one of the alignment structures 503*a*, may be added to, or subtracted from the intensity of an optical signal from another of the alignment structures 503*b* to provide a target value that takes a contribution from the optical signals 570 propagating through each of the alignment structures 503*a*, 503*b*. Taking a contribution from the optical signals 570 from each of the two alignment structures 503*a*, 503*b*, provides rotational information pertaining to the alignment that is not available in embodiments that use a single alignment structure (e.g. 303).

Step 595 of the alignment method 590 is an adjusting step, within which the position of the one or more of the FAU 501 and the PIC interposer 500 is adjusted, and with the adjustment in position of the one or more of the FAU 501 and the PIC interposer 500, the positions of one or more of the waveguides 502 on the FAU 501 and the upturned mirrors 504*a* on the PIC interposer 500 are also adjusted. Adjustments in the adjusting step 595 enable improvements in the quality of the alignment between the waveguides 502 and the upturned mirrors 504*a* of the alignment structures 503*a*, 503*b*, and therefore in the alignment between the terminal portions of the fiber optic cables 505*a*,505*b* in the FAU 501 and the optical devices 544*a*,544*b* on the PIC interposer 500. In a preferred embodiment, a characteristic of the optical signal 570 is continuously monitored with external testing apparatus 560, including detector 564, while adjusting the position of the FAU 501 while the PIC interposer 500 is fixed in position. The characteristic of the optical signal 570 is continuously monitored in this preferred embodiment to assess improvements in the alignment of the waveguides 502 and the upturned mirrors 504*b* of the alignment structures 503*a*,503*b* that result from the adjustments in the positions of the FAU 501. Adjustments to the positions of the FAU 501 on the PIC interposer 500 continue until the measured value from the detector 564 for characteristic of one or more optical signals 570 propagating through the waveguides 502 on the FAU 501 and the upturned mirrors 504*a* on the PIC interposer 500 is in accordance with a target value, or set of target values.

In another embodiment, a characteristic of one or more of the optical signals 570 is not continuously monitored, but rather a characteristic of the optical signals 570 is detected, measured, and the monitoring is suspended until an adjustment is made to one or more of the positions of the FAU 501 and the PIC interposer 500, and then monitored again after the adjustment is made, to assess the quality of the alignment between the waveguides 502 and the upturned mirrors 504*a* of the alignment structures 503*a*,503*b*.

In other embodiments, other combinations of continuous and non-continuous monitoring can be used in the sequence of detecting, measuring, and adjusting to assess and improve the quality of the alignment between the waveguides 502 and the upturned mirrors 504*a* of the alignment structures 503*a*,503*b*, and therefore, between the fiber optic cables 505*a*,505*b* on the FAU 501 and the optical components 544*a*,544*b* on the PIC interposer 500 to which the fiber optic cables 505*a*,505*b*, respectively, are to be aligned.

Step 596 of alignment method 590 is a securing step, within which the FAU 501 is secured into an aligned position on the PIC interposer 500. Having aligned the waveguides 502 and the upturned mirrors 504*a* of the alignment structures 503*a*,503*b*, and thereby causing the alignment of the one or more optical fiber cables 505*a*,505*b* on the FAU 501 to be aligned with the one or more optical devices 544*a*,544*b*, respectively, on the PIC interposer 500, the securing of the FAU 501 into the aligned position on the PIC interposer 500 ensures that the alignment is maintained upon removal of the apparatus used for mechanical positioning of the FAU 501 and the PIC interposer 500. The FAU 501 can be secured, for example, using an epoxy of other form of adhesive or bonding material to secure the FAU 501 into the aligned position on the PIC interposer 501. The FAU 501, in some embodiments, can be secured in the aligned position using screws, bolts, or other connecting hardware.

Step 597 of alignment method 590 is an optional reassessing step, wherein the alignment of the waveguide 502 and the upturned mirror 504*b* is reassessed after the securing step. In Step 597, one or more of the step 592, step 593, and step 594 of method 590 can be repeated to assess the quality of the alignment between the waveguides 502 and the upturned mirrors 504*a* after completion of the securing step. Step 597 may also include a marking process in which the measured device structure is marked with the assessed value, or a marking related to the assessed value. Identification of the assessed value is useful for grouping or binning of the completed devices for quality control and other purposes. Some examples of markings can include the actual value of the characteristic measured, a value derived from the measured characteristic value, a pass or fail marking, among others.

Alignment method 590 describes an embodiment of a method for aligning an FAU 501 to a PIC interposer 500. The method of alignment using the two alignment structures 503*a*,503*b* is applicable to the mounting of an FAU 501, in general, after singulation of the individual PIC chips from a wafer level fabrication process. Singulated PIC interposer chips are commonly mounted into packages that can be incorporated into optical and optoelectrical networks. Examples of packages for supporting optical and optoelectrical chip mounting with allowance for optical fiber coupling are the family of quad small form-factor pluggable (QSFP) packages. QSFP connectors, and the numerous packages derived from the basic QSFP connector, are well known in the art of pluggable photonics packaging. Use of the alignment structures 503*a*,503*b* and the alignment method 590 are well suited for alignment of the FAUs 501 that interface with QSFP packages, among others. Other packages can also be used with these and other embodiments of the alignment structures and methods described herein. In some embodiment, packages can provide for the aligning and mounting of multiple PIC interposers 500.

FIG. 7 shows PIC interposer 700 with two alignment structures 703*a*, 703*b* that each include a first optical component 702 and a second optical component comprised of an upturned mirror 704*a* and a waveguide 704*b*. In this embodiment, the alignment structure 703*a* is formed at a first vertical distance from the substrate 720 in the interposer film structure and the alignment structure 703*b* is formed at a second vertical distance from the substrate 720 in the interposer film structure. Additionally, optical component 744*a*, formed, for example, from, in alignment with, or from and in alignment with a first planar waveguide layer, is also at a different vertical distance from the substrate 720 in the interposer film structure than optical component 744*b*, formed for example from, in alignment with, or from and in alignment with, a second planar waveguide layer 744*b*.

Use of multiple alignment structures 703*a*, 703*b* enables additional alignment information such as rotational alignment information pertaining to the alignment between the optical components on the FAU 701 and the optical components on the PIC interposer 700.

In the embodiment shown in FIG. 7, first optical components 702 of the alignment structures 703*a*, 703*b* are waveguides formed in fiber attach unit (FAU) 701. In an example embodiment, a waveguide 702 can be a fiber optic cable. In other embodiments, other lengths and forms of optical waveguide may be used. FAU 701 is a mounting structure to which one or more terminal portions of optical fiber cables 705*a*, 705*b*, for example, are attached, and that allow for the simultaneous mounting of these one or more fiber cable terminations and the simultaneous alignment of the end facets 715*a*, 715*b* of the fiber cables 705*a*, 705*b*, respectively, to the one or more corresponding end facets 745*a*, 745*b*, respectively, of the optical devices 744*a*, 744*b*, respectively, on the PIC interposer 700. Optical devices 744*a*, 744*b* can be, for example, a planar waveguide, a planar waveguide combined with a lens, a planar waveguide coupled to a spot size converter, among other forms and combinations of optical devices. PIC interposer 700, as described herein, can be a substrate, interposer, or submount, or other structure upon which PIC 710 can be formed. PIC interposer 700 includes PIC 710, a photonic integrated circuit comprised of one or more optical or optoelectrical components such as lasers 722 and photodetectors 724, waveguides, and arrayed waveguides, among others. PIC interposer 700 includes a substrate 720, an optional electrical interconnect layer 713 with electrical interconnects 732, and two planar waveguide layers from which planar waveguides 744*a*, 744*b*, can be formed. One or more dielectric layers 738 may be formed in some embodiments, below the planar waveguide layer, above the planar waveguide layer, between the planar waveguide layers, and otherwise encompassing the planar waveguide layers. The dielectric layer may be one or more of a buffer layer, a spacer layer, a planarization layer, a cladding layer, among other forms of dielectric layers. Electrical interconnects 732 in optional electrical interconnect layer 713 may connect to one or more electrical interfaces 731 with electrical contacts 730.

In the schematic drawings in the top-down view of FIG. 7A, Section A-A' of FIG. 7C, and Section D-D' of FIG. 7D, the optical axes 712 of the waveguide 702 of the alignment structures 703*a*, 703*b* are shown in substantial alignment with the optical axis 714 of the constituents of the second optical components 704*a*,704*b* of the alignment structures 703*a*, 703*b*. The second optical components of the alignment structures 703*a*, 703*b* in the embodiment shown are a combination of an upturned mirror 704*a* and an optical waveguide 704*b*. Example optical signals 770 are shown in Section A-A' of FIG. 7C and Section D-D' of FIG. 7D emitted from emitters 762 of the external testing apparatus 760, and reflected from upturned mirrors 704*a* to the detectors 764 in this embodiment. The alignment of the optical components 702, 704*a*, 704*b* of the alignment structures 703*a*, 703*b* correspondingly results in the alignment between the optical axes 716*a*,716*b* of the fiber optic cables 705*a*, 705*b* provided on the FAU 701 and the optical axes 718*a*,718*b* of optical components 744*a*, 744*b* on the PIC interposer 700, as shown in the top-down view of FIG. 7A, Section B-B' of FIG. 7E, and Section C-C' of FIG. 7F. Optical component 744*b* can be a waveguide, for example, a lens, a spot size converter, among other optical devices for coupling optical signals from fiber optic cables 705*a*, 705*b* to the PIC 710. In FIGS. 7A, the terminal ends of two optical fibers 705*a*, 705*b* are shown. In other embodiments, more than two optical fibers may be attached to the FAU 701. In some embodiments, the fiber optic cables 705*a*, 705*b* can be single mode optical fibers, and in yet other embodiments, the fiber optic cables can be multi-mode fibers. In some embodiments, the first optical components 702 of the alignment structures 703*a*, 703*b* in the FAU 701 can be multimode waveguides or multimode optical fibers. The first optical components 702, in embodiments that have more than one alignment structure can be the same first optical components 702 for each alignment structure or the first optical components can be different devices or device types. In an embodiment, for example, a single mode waveguide may be used for a first optical component 702 and a multimode waveguide may be used for another first optical component 702 of the alignment structure. Many other combinations of first optical components 702 may be used in embodiments in which multiple alignment structures 703*a*,703*b* are formed.

In the embodiment in FIGS. 7A-7F, FAU 701 is shown comprised of FAU base 701*a* and FAU cap 701*b*. Either or both of the FAU 701 may be grooved or slotted or otherwise formed to facilitate alignment of the mounted fibers within the FAU 701. In some embodiments, multiple FAU's 701 can be used. A right end view of the FAU 701 with a first optical component of the alignment structure 703 and with fiber cables 705*a*, 705*b* is shown in FIG. 7B. The end view of the embodiment of the FAU 701 shows multi-level base 701*a* and two caps 701*b*, each holding a portion of the fibers 705*a*, 705*b*, respectively and first alignment components 702. The base portion 701*a* is shown in contact with the FAU landing site 750 on the interposer 700. An adhesive material may be placed between the landing site 750 and the FAU base portion 701*a* in this and other embodiments described herein.

Alignment of the optical axes 712 of the first optical components 702 and the optical axes 714 of the second optical components 704*a*,704*b*, and the corresponding alignment of the optical axes 716*a*, 716*b* of the fiber optic cables 705*a*, 705*b*, respectively, and the one or more optical components 744*a*, 744*b* of the PIC 710, respectively, can result in the alignment of the end facets 715*a*, 715*b* of the fiber optic cables 705*a*, 705*b* with the end facets 745*a*, 745*b* of optical devices 744*a*,744*b*, respectively, on the PIC interposer 700 as shown in FIGS. 7A. 7E, and 7F. The end facets 715*a*,715*b* of the fiber optic cables 705*a*, 705*b*, respectively, are shown to be in substantial alignment with the end facets 745*a*,745*b* of optical components 744*a*,744*b*, respectively, to allow for the coupling and transfer of optical signals to and from the connected fiber optic cables 705*a*, 705*b*, so that optical signals propagating through the fiber optic cables 705*a*, for example, can be delivered to optical or optoelectrical devices such as optoelectrical receiving device 724 of PIC 710, and optical signals from optical or optoelectrical devices such as sending device 722 on the PIC 710 can be delivered to attached fiber optic cables 705*b*. Other optical and optoelectrical devices, such as arrayed waveguides and other forms of non-sending and non-receiving devices may also be coupled to the attached fiber optic cables 705*a*, 705*b* in the FAU 101. The effectiveness of the coupling and transfer of the optical signals between the attached fiber optic cables 705*a*, 705*b* and the optical components 744*a*, 744*b* of the PIC 710 benefits from the quality of the alignment between the one or more of the optical axes 716*a*, 716*b* and the end facets 715*a*, 715*b* of the fiber optic cables 705*a*, 705*b* on the FAU 701, and the one or more of the optical axes 718*a*, 718*b* and the end facets 745*a*,745*b* of the optical components 744*a*,744*b* of the PIC 710 on the PIC interposer 700. In some embodiments, the optical components 744*a*, 744*b* can be similar optical components coupled to the optical fibers in the FAU 101 to facilitate incoming and outgoing optical signals. In other embodiments, the optical components 744*a*, 744*b* can be different optical components coupled to the optical fibers, for example, to facilitate the requirements for incoming and outgoing optical signals.

Effective alignment of the fiber optic cables 705*a*, 705*b* on the FAU 701 with optical components 744*a*, 744*b* of the PIC 710, is simplified with the use of the alignment structures 703*a*,703*b*, in that the alignment of the first optical components 702 and second optical components 704*a*,704*b* can be performed without the need to power or otherwise access the devices contained within the PIC 710.

Shown in FIGS. 7A-7F is external testing apparatus 760, comprised of electrical or optoelectrical measurement device 766, optical emitting devices 762, and optical detecting devices 764. In the embodiment shown, optical emitting devices 762 are shown to be optically coupled to the first optical components 702 of the alignment structures 703*a*, 703*b*, and the optical detecting devices 764 are shown to be optically coupled to the upturned mirror 704*a* of the second optical components of the alignment structures 703*a*, 703*b*. In other embodiments, optical emitting devices 762 can be optically coupled to the upturned mirror 704*a* or other second optical component of the alignment structures 703*a*, 703*b*, and optical detecting devices 764 can be optically coupled to the first optical components 702 of the alignment structures 703*a*, 703*b*.

In another embodiment, a first optical emitting device 762 can be optically coupled to a first optical component 702 of a first alignment structure and second optical emitting device 762 can be optically coupled to an upturned mirror 704*a* or other second optical component of another alignment structure, and a first optical detecting device 764 can be optically coupled to the upturned mirror 704*a* or other second optical component of a first alignment structure, and a second optical detecting device 764 can be optically coupled to an other first optical component 702 of the second alignment structures 703*a*, 703*b*.

And in yet other embodiments, optical emitting devices 762 can be optically coupled to the first optical components 702 and the upturned mirror 704*a* or other second optical components of the alignment structures 703*a*, 703*b*, and optical detecting devices 764 can also be optically coupled to the first optical components 702 and upturned mirror 704*a* or other second optical components of the alignment structures 703*a*,703*b*. And in yet other embodiments, multiple optical emitting devices 762 can be optically coupled to both the first optical components 702 and upturned mirrors 704*a* or other second optical components of the alignment structures 703*a*,703*b*, and multiple optical detecting devices 764 can also be optically coupled to the first optical component 702 and an upturned mirror 704*a* or other second optical component of the alignment structures 703*a*, 703*b*.

The method for alignment of the embodiment shown in FIG. 7 is similar to that of the multiple alignment structure embodiment shown in FIG. 5 and as further described herein.

Figure 8:
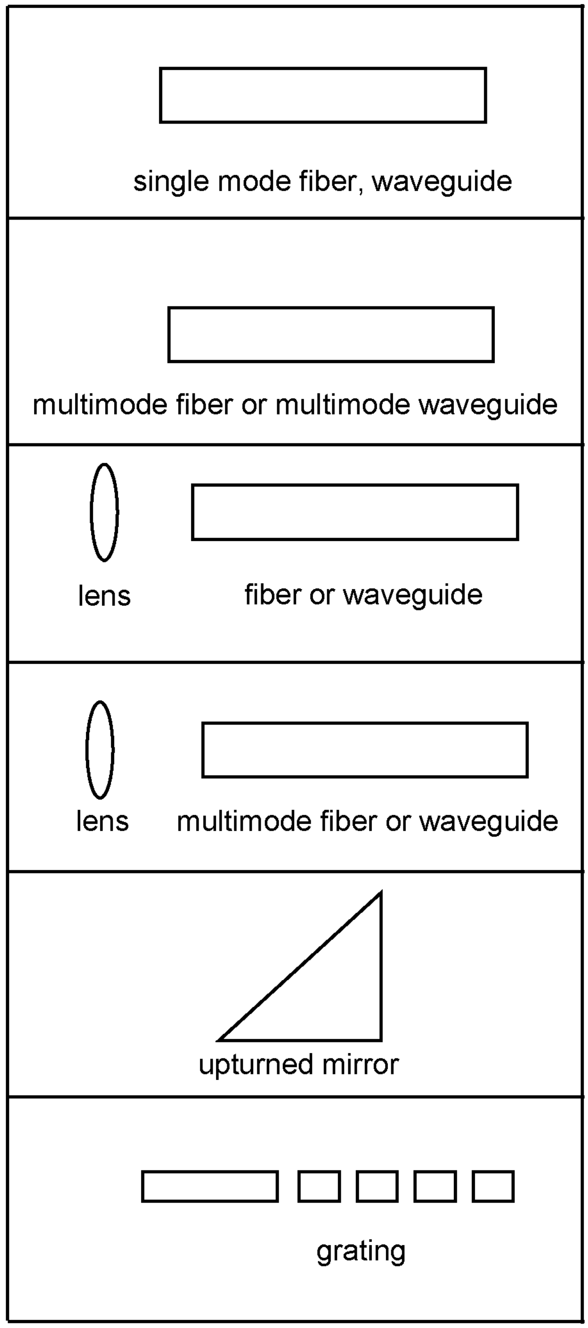
FIG. 8 shows some embodiments of first optical components of the alignment structure.

Referring to FIG. 8, some example configurations for embodiments of the first optical components 102, of alignment structure 103 are shown. In the embodiments, the "first optical components 102" refer to the optical components 102 of the alignment structure 103 that are provided on the FAU 101. In addition to the embodiments described in FIG. 1, the example configurations for the embodiments in FIG. 8 are applicable to the embodiments described in FIGS. 2-7.

In some embodiments, an optical signal 170 may be coupled from an emitting device into a terminal end of a first optical component of an embodiment of an alignment structure. Alignment of the optical axes of an emitting device used to provide the optical alignment signal with the optical axis of the fiber or other waveguide mounted in the FAU can provide the maximum signal from the emitting device. Use of flexible lengths of waveguides for the first optical components of the alignment structure allows for variability in the positioning of the emitting device and the terminal end of a flexible waveguide.

In the embodiment shown in FIG. 1, for example, the emitting device of the alignment apparatus 160 is shown at the terminal end of the first alignment component 102 of the alignment structure 103. In other embodiments, the emitting device 162 of the alignment apparatus 160 may be configured to accommodate the terminal end of the alignment component 102 particularly in embodiments in which a length of flexible waveguide is used for the first alignment component in the FAU 101.

Examples of first optical components that can receive optical signals from an emitting device mounted at the terminal end of a waveguide are shown in the first four rows of the table in FIG. 8. These rows include single mode fibers, single mode waveguides, multimode fibers, multimode waveguides, single mode fibers coupled to a lens, single mode waveguides coupled to a lens, multimode fibers coupled to a lens, and multimode waveguides coupled to a lens. Additionally, one or more of one or more multiple fibers, waveguides and lenses may be used.

Alternatively, coupling of an optical signal to the first optical component 102 of the alignment structure 103 may be provided from a position normal to the surface or from a position above the FAU 101 (when viewed in the perspective shown in the drawing in FIG. 1.) In configurations for which an optical signal is provided from above the FAU 101, first optical components 102 or combinations of first optical components that provide access to these signals generated from above the FAU surface are required. Upturned mirrors and grating structures are examples of first optical components that provide receptivity to the optical signals provided from above the FAU and that can redirect the optical signals into the alignment structures 104 on the PIC. Upturned mirrors, for example, can be used as a first alignment component 102 with or without being coupled to additional components to form a first alignment component in an FAU as described further herein. Similarly, grating structures can be used as a first alignment component 102 with or without coupling to additional components to form a first alignment component 102

FIG. 9 shows an embodiment for the first optical component 902 of an example configuration for the alignment structure 903. In particular, FIG. 9 shows an embodiment for a first optical component 902 that includes a single or multimode fiber or waveguide.

Figure 9A:
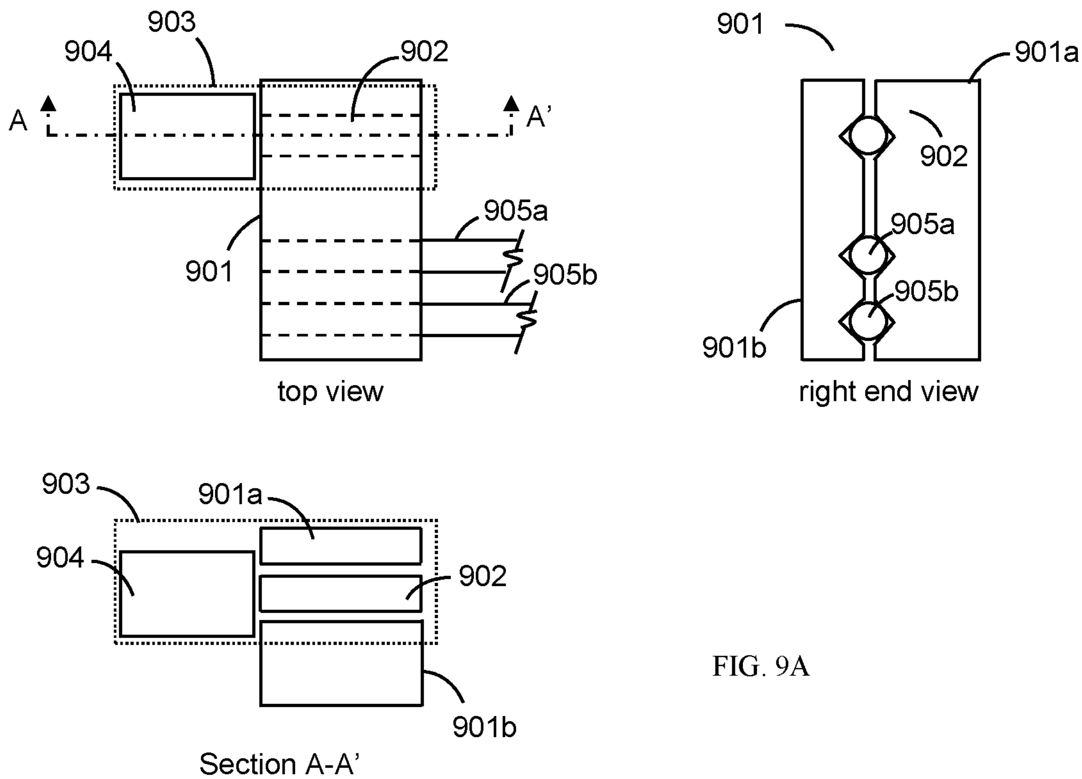
FIG. 9A shows top view, right end view, and Section A-A' schematic drawings of an embodiment of an alignment structure that includes a waveguide or fiber optic cable for the first optical component.

Waveguides 902 are shown in the top view, the right end view, and the Section A-A' view of FIG. 9A. Alignment of the optical axes of the first optical component 902 with the interposer-based second optical component 904 enables alignment of the optical axes of fiber optic cables **905*a*,905*b* with the optical axes of waveguides or other optical devices on the interposer from which the second optical component 904** is formed.

Figure 9B:
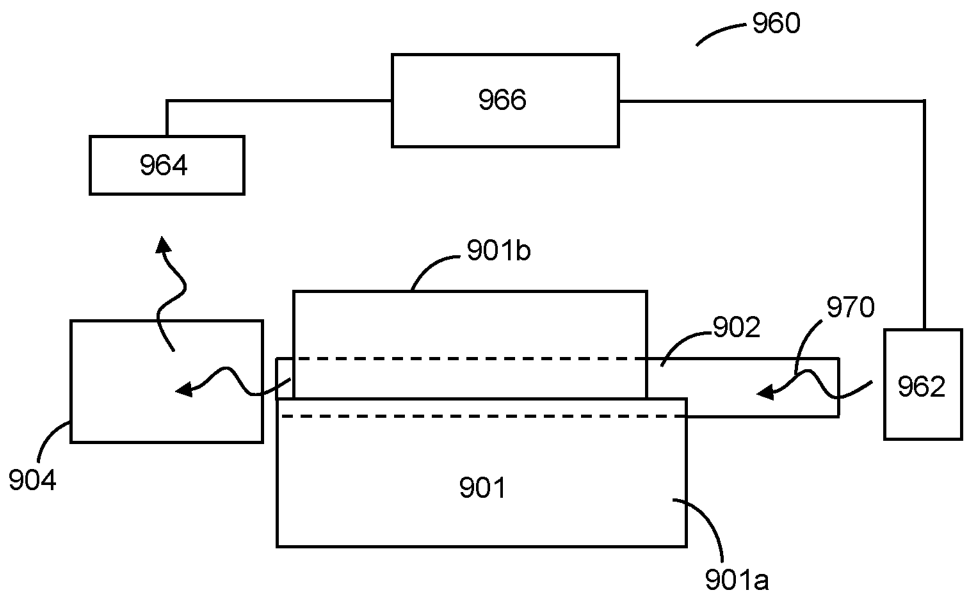
FIG. 9B shows a cross section of an embodiment that includes probe heads of an alignment apparatus in alignment with the first and second optical components of the alignment structure.

FIG. 9B shows a side view of another embodiment of a first optical component 902 that includes a single or multimode fiber or waveguide. The base **901*a* and cap 901*b* of the FAU 901 are shown. FIG. 9B shows the alignment structure configured to an embodiment of alignment apparatus 960 having an emitting device 962 providing optical signal 970 to the waveguide 902. When the optical axes of the waveguide 902 and the second optical component 904 are brought into alignment, a corresponding characteristic of the transmitted signal is detected at the receiving device 964 in the embodiment signaling the alignment. In the embodiment, the second optical component 904 may be a reflector that directs the optical signal perpendicular to the axis of propagation of the waveguide 902. After the optical axes of the first and second optical components are brought into alignment, the FAU 901** can be secured with epoxy of other form of adhesive or bonding technique.

Figure 10:
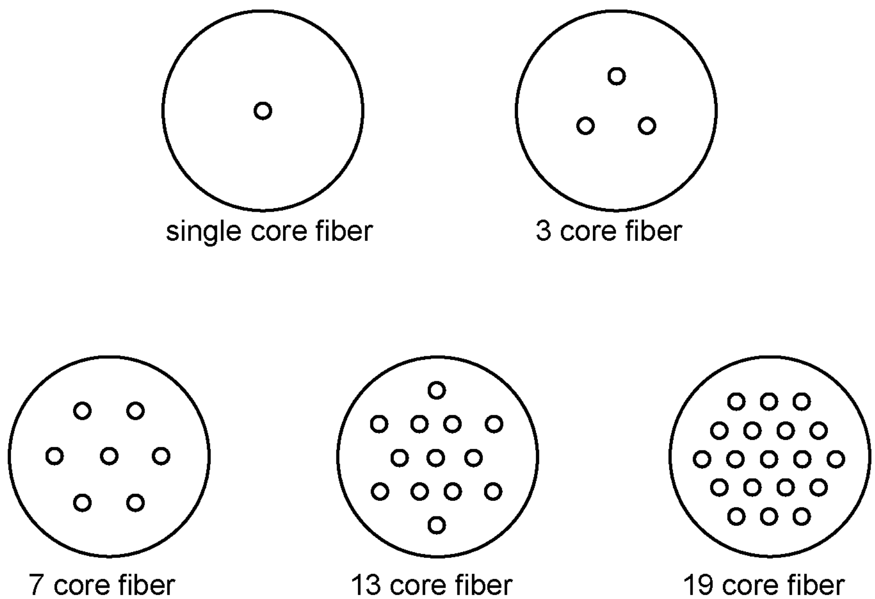
FIG. 10 shows examples of some commercially available single and multicore fiber configurations that can be used as an optical component or as part of an optical component, in the alignment structure.

Multimode fibers and waveguides can be used in embodiments of the alignment structure 903 and the use of multimode fibers can provide additional information pertaining to the alignment of the first and second optical components that may not be available with single mode fibers or waveguides. In an embodiment such as that shown in FIG. 9B, alignment structure 903 includes a multimode or multicore fiber for the first optical component 902 and an upturned mirror for the second component 904 of the alignment structure 903. In this embodiment, multiple optical signals can propagate through the multimode or multicore waveguide 902. Emitter 962 of the external testing apparatus 960 can be configured to provide multiple optical signals for each of the available channels in the multicore fiber. Example distributions of multiple optical channels or propagation pathways in commercially available multicore fiber cables are shown in FIG. 10. A single core optical fiber is also shown for comparison.

Figure 11A:
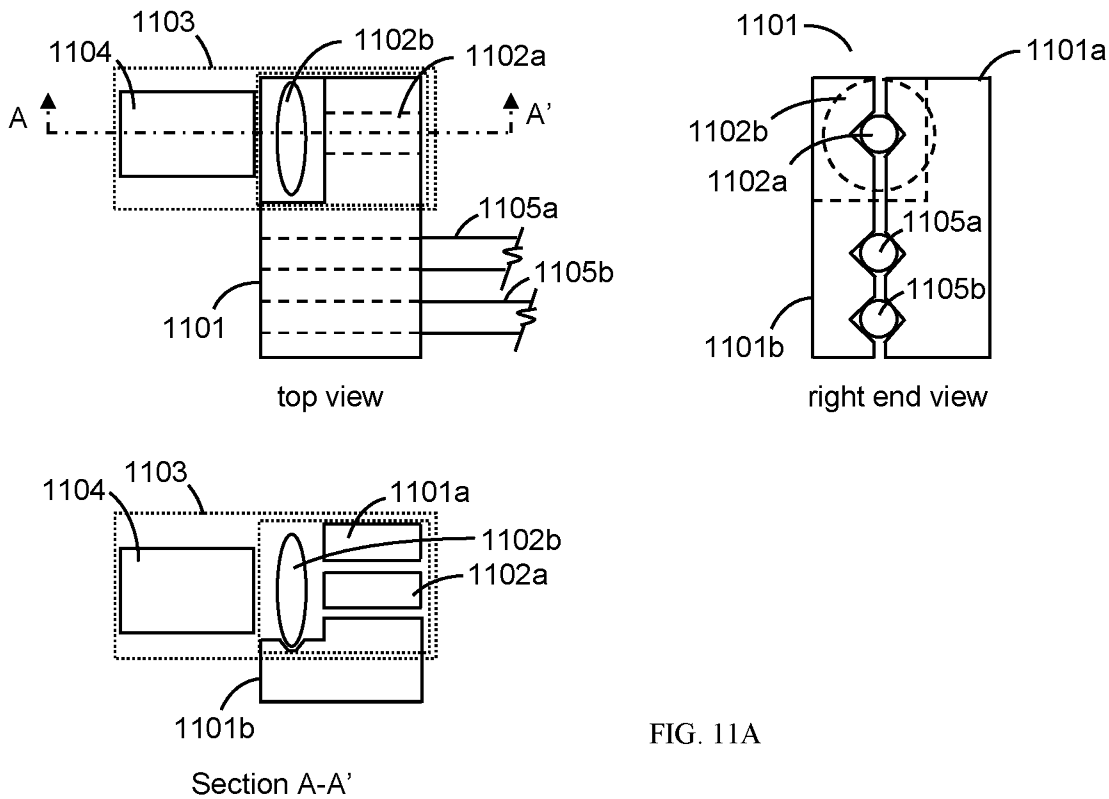
FIG. 11A shows top view, right end view, and Section A-A' schematic drawings of an embodiment of an alignment structure that includes a lens and a waveguide in the first optical component.

FIG. 11 shows an embodiment for the first optical component 1102 of an example configuration for the alignment structure 1103. In particular, FIG. 11 shows an embodiment for a first optical component 1102 that includes a single or multimode fiber or waveguide and a lens.

Waveguide **1102*a* is shown coupled to lens 1102*b* to form first optical component 1102 of the alignment structure 1103. First optical component 1102, comprised of subcomponents, namely a waveguide 1102*a* and lens 1102*b* are shown in the top view, the right end view, and the Section A-A' view of FIG. 11A. The lens 1102*b* coupled to the waveguide can be a focusing lens or a diffusing lens. In some embodiments, the lens 1102*b* is a ball lens. In other embodiments, the lens 1102*b* is a convex lens. And in yet other embodiments, the lens 1102*b* is a concave lens. In preferred embodiments, the lens 1102*b*** is a focusing lens, such as a ball lens or a convex lens.

Alignment of the optical axes of the first optical components **1102*a*, 1102*b* with the interposer-based second optical component 1104 enables alignment of the optical axes of fiber optic cables 1105*a*, 1105*b* with the optical axes of waveguides or other optical devices on the interposer from which the second optical component 1104** is formed.

Figure 11B:
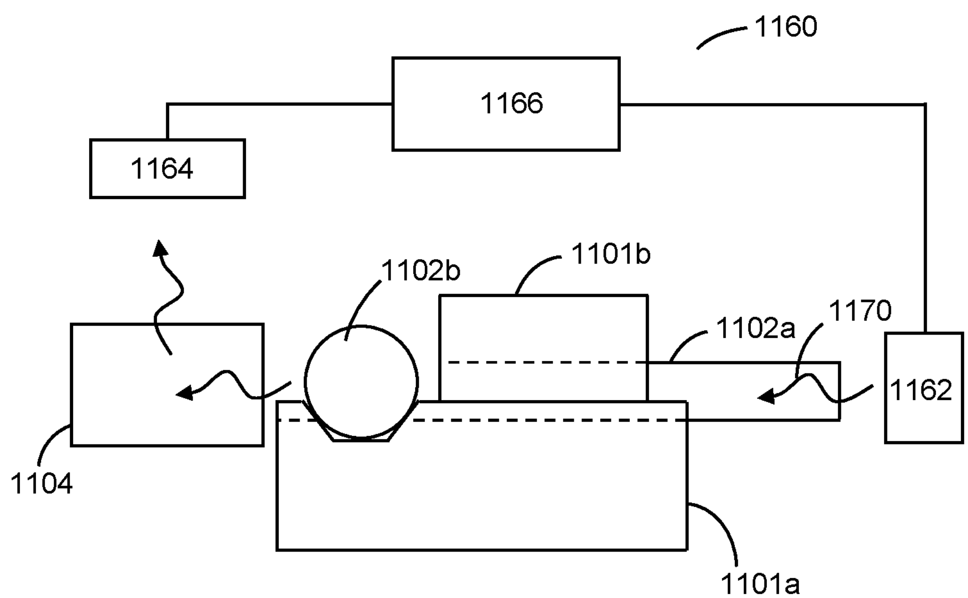
FIG. 11B shows a cross section of an embodiment that includes probe heads of an alignment apparatus in alignment with the first and second optical components of the alignment structure.

FIG. 11B shows a side view of another embodiment of a waveguide **1102*a* coupled to ball lens 1102*b* to form a first optical component in the FAU 1101. Waveguide 1102***a* may be a single or multicore fiber or waveguide. The base 1101*a* and cap 1101*b* of the FAU 1101 are shown. FIG. 11B shows the alignment structure configured to an embodiment of alignment apparatus 1160 having an emitting device 1162 providing optical signal 1170 to the waveguide 1102*a*. When the optical axes of the waveguide 1102*a*, the lens 1102*b*, and the second optical component 1104 are brought into alignment, a corresponding characteristic of the transmitted optical signal is detected at the receiving device 1164 in the embodiment signaling the alignment. In the embodiment, the second optical component 1104 may be a reflector that directs the optical signal perpendicular to the axis of propagation of the waveguide 1102*a* and lens 1102*b*. After the optical axes of the first and second optical components are brought into alignment, the FAU 1101 can be secured with epoxy of other form of adhesive or bonding technique.

Multimode fibers and waveguides can be used in embodiments of the alignment structure 1103 and the use of multimode fibers can provide additional information pertaining to the alignment of the first and second optical components that may not be available with single mode fibers or waveguides as further described herein.

Figure 12A:
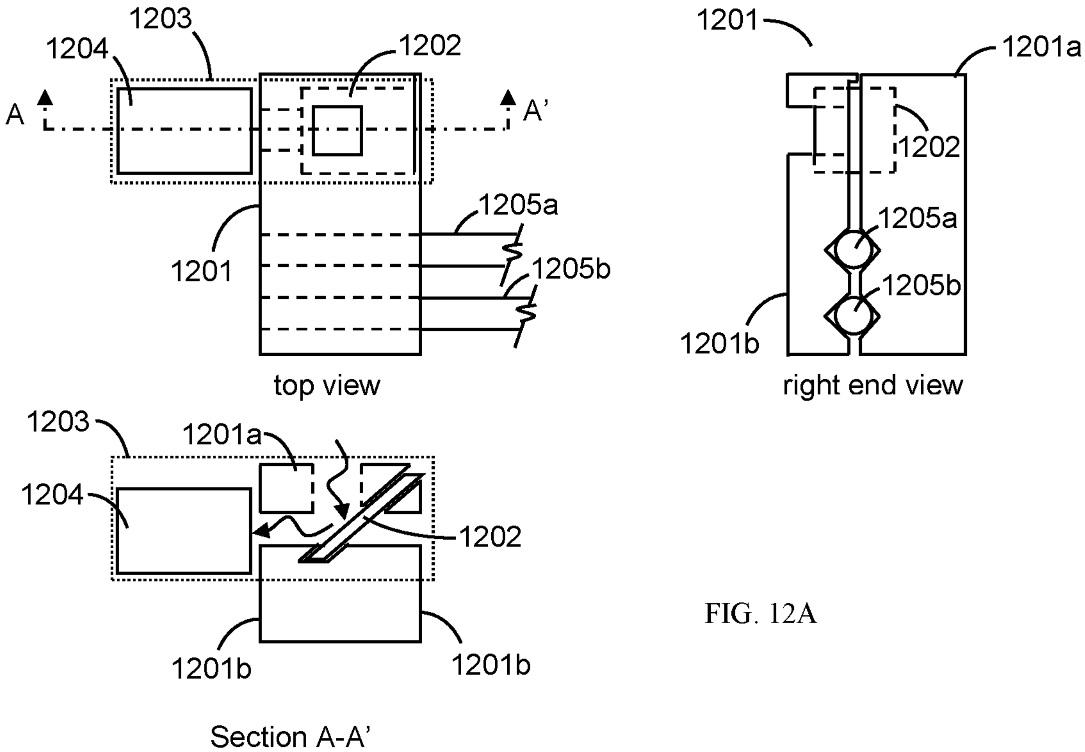
FIG. 12A shows top view, right end view, and Section A-A' schematic drawings of an embodiment of an alignment structure that includes an upturned mirror in the first optical component.

FIG. 12 shows an embodiment for the first optical component 1202 of an example configuration for the alignment structure 1203. In particular, FIG. 12 shows an embodiment for a first optical component 1202 that includes an upturned mirror or reflector structure.

Upturned mirror 1202 is shown to form first optical component 1202 of the alignment structure 1203. First optical component 1202 is shown in the top view, the right end view, and the Section A-A' view of FIG. 12A. The upturned mirror 1202 is formed in the FAU 1201 and, in the embodiment, is configured to receive an optical signal directed normal to the top surface of the FAU 1201 as shown in Section A-A' of FIG. 12A. The mirror may be formed, for example, by insertion of a reflective material into a slot formed in the FAU 1201. Other methods of forming the reflector structure in the FAU may also be used.

Alignment of the optical axes of the reflected signal from the reflector structure 1202 with the optical axes of the interposer-based second optical component 1204 enables alignment of the optical axes of fiber optic cables 1205*a*, 1205*b* with the optical axes of waveguides or other optical devices on the interposer from which the second optical component 1204 is formed. In embodiments having reflector structures, the optical axes do not follow a unidirectional path but rather the optical signal is diverted upon reflection from the reflector surfaces in the optical path between the emitting device 1262 and the receiving device 1264 of the alignment apparatus 1260 as shown in FIG. 12B.

Figure 12B:
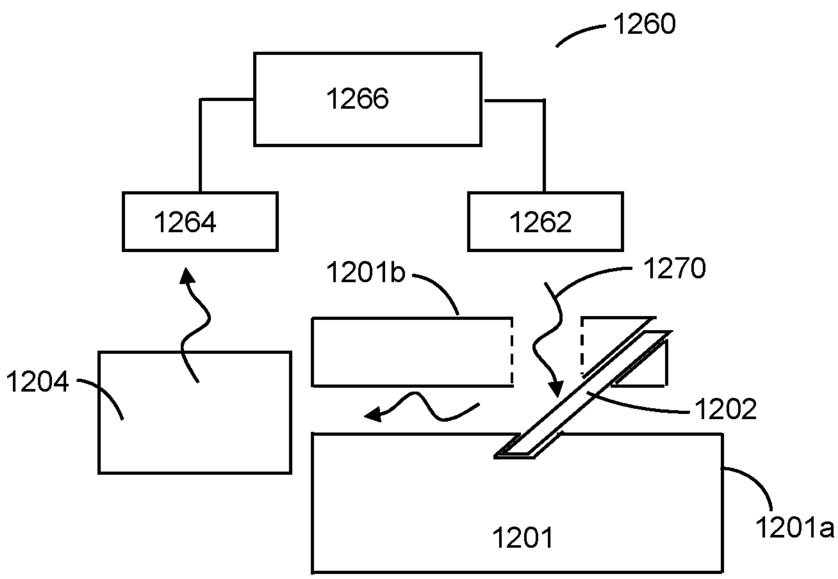
FIG. 12B shows a cross section of an embodiment that includes probe heads of an alignment apparatus in alignment with the first and second optical components of the alignment structure.

FIG. 12B shows a side view of another embodiment of a reflector structure 1202 that forms a first optical component 1202 in the FAU 1201. The base 1201*a* and cap 1201*b* of the FAU 1201 are shown. FIG. 12B shows the alignment structure configured to an embodiment of alignment apparatus 1260 having an emitting device 1262 providing optical signal 1270 to the reflector 1202. When the optical axes of the reflector 1202 and the second optical component 1204 are brought into alignment, a corresponding characteristic of the transmitted optical signal is detected at the receiving device 1264 in the embodiment signaling the alignment. In the embodiment, the second optical component 1204 may be a reflector that directs the optical signal perpendicular to the axis of propagation from the reflector 1202 of the FAU 1201. After the optical axes of the first and second optical components are brought into alignment, the FAU 1201 can be secured with epoxy of other form of adhesive or bonding technique.

Multimode fibers and waveguides can be used in embodiments of the alignment structure 1203 and the use of multimode fibers can provide additional information pertaining to the alignment of the first and second optical components that may not be available with single mode fibers or waveguides as further described herein.

Figure 13A:
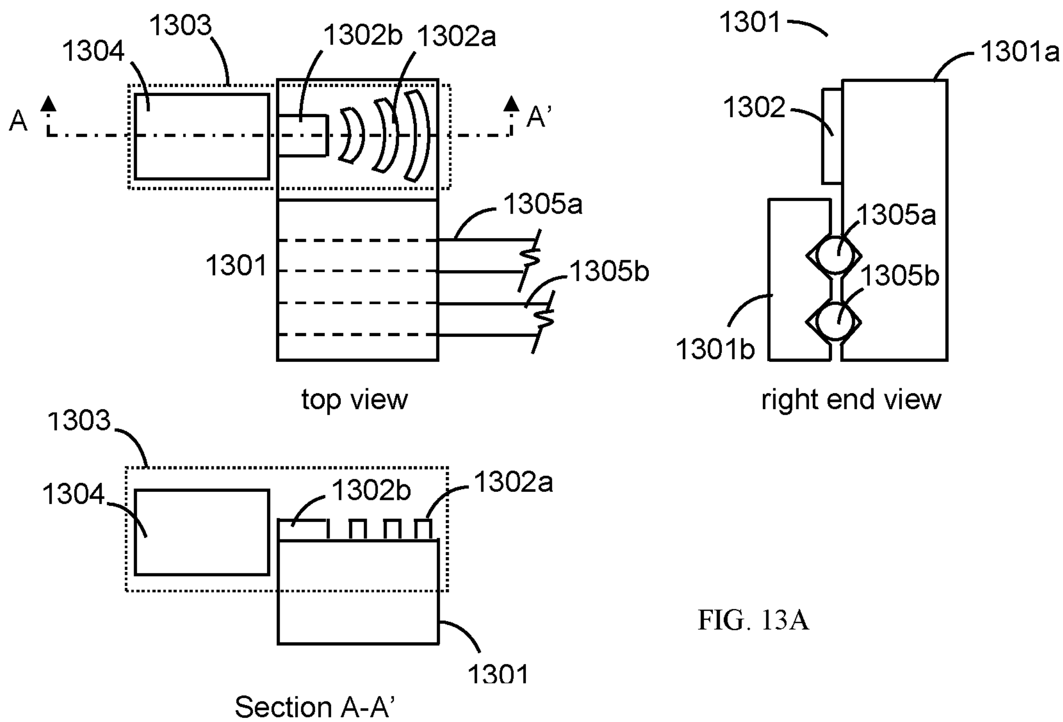
FIG. 13A shows top view, right end view, and Section A-A' drawings of an embodiment of an alignment structure that includes a grating in the first optical component.

FIG. 13 shows an embodiment for the first optical component 1302 of an example configuration for the alignment structure 1303. In particular, FIG. 13 shows an embodiment for a first optical component 1302 that includes a grating structure 1302*a* coupled to a waveguide 1302*b*. Waveguide 1302*b* may be a single or multimode fiber or other form of waveguide.

Grating structure 1302*a* is shown coupled to waveguide 1302*b* to form first optical component 1302 of the alignment structure 1303. First optical component 1302, comprised of sub-components, namely a grating structure 1302*a* and waveguide 1302*b* are shown in the top view, the right end view, and the Section A-A' view of FIG. 13A.

Alignment of the optical axes of the first optical components 1302*a*, 1302*b* with the interposer-based second optical component 1304 enables alignment of the optical axes of fiber optic cables 1305*a*, 1305*b* with the optical axes of waveguides or other optical devices on the interposer from which the second optical component 1304 is formed.

The grating structure and patterned waveguide may be formed, for example, using a deposited layer on the FAU 1301, a lithographic process to form a patterned mask layer on the deposited layer, and an etch process, for example, to remove the unmasked portions of the deposited layer to form the grating structure and a patterned planar waveguide coupled to the grating structure.

Figure 13B:
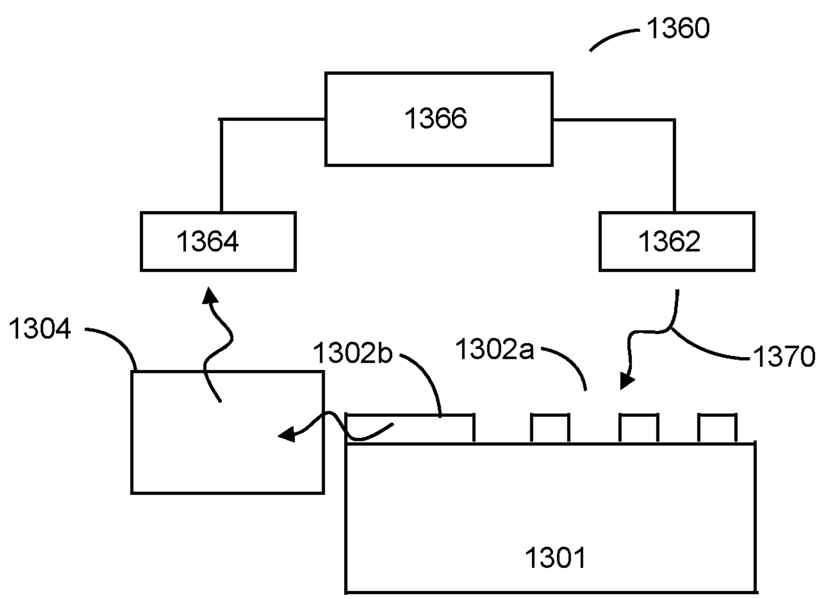
FIG. 13B shows a cross section of an embodiment that includes probe heads of an alignment apparatus in alignment with the first and second optical components of the alignment structure.

FIG. 13B shows a side view of another embodiment of a grating structure 1302*a* coupled to a patterned planar waveguide 1302*b* to form a first optical component in the FAU 1301. The base 1301 of the FAU 1301 is shown in FIG. 13B. No cap is required on the portion of the FAU 1301. FIG. 13B shows the alignment structure configured to an embodiment of alignment apparatus 1360 having an emitting device 1362 providing optical signal 1370 to the grating structure 1302*a*. Optical signal 1370 is emitted, in the embodiment, from an emitting device 1362 at near-normal incidence to the grating structure. When the optical axes of the waveguide 1302*b*, the grating structure 1302*a*, and the second optical component 1304 are brought into alignment, a corresponding characteristic of the transmitted optical signal is detected at the receiving device 1364 in the embodiment signaling the alignment. In the embodiment, the second optical component 1304 may be a reflector that directs the optical signal perpendicular to the axis of propagation of the waveguide 1302*b*. After the optical axes of the first and second optical components are brought into alignment, the FAU 1301 can be secured with epoxy of other form of adhesive or bonding technique.

Multimode fibers and waveguides can be used in embodiments of the alignment structure 1303 and the use of multimode fibers can provide additional information pertaining to the alignment of the first and second optical components that may not be available with single mode fibers or waveguides as further described herein.

Figure 14:
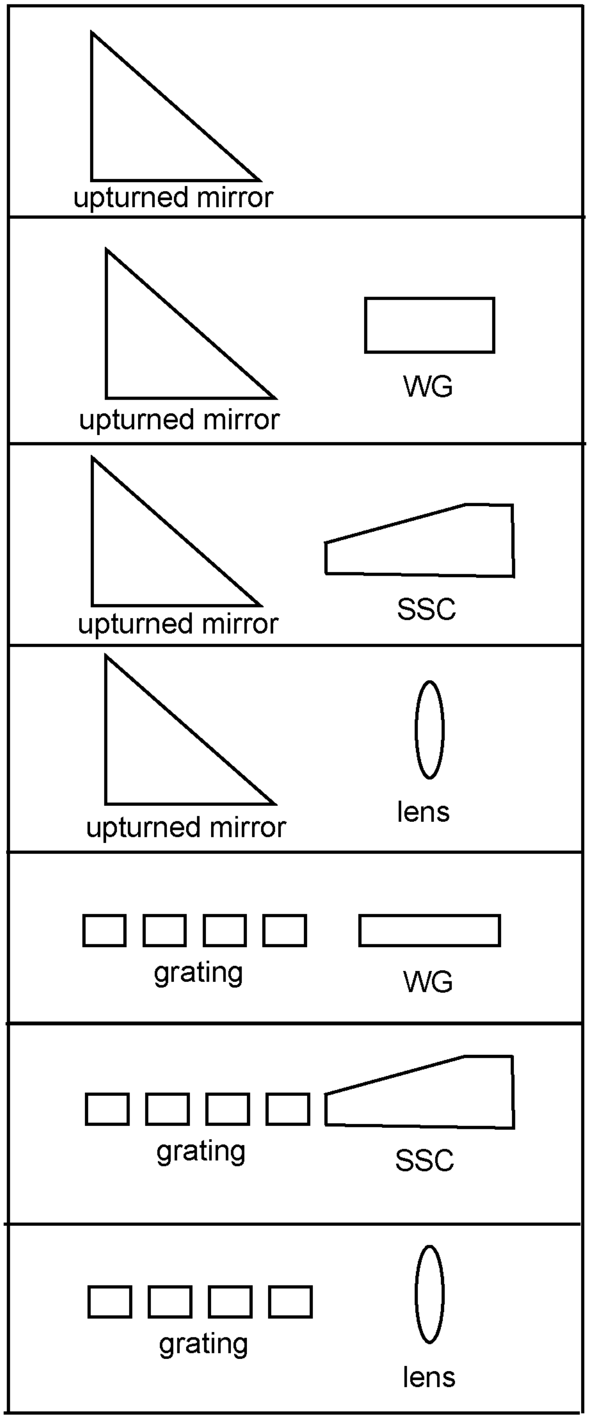
FIG. 14 shows some embodiments of second optical components of the alignment structure.

Referring to FIG. 14, some example configurations for embodiments of the second optical components 104, of alignment structure 103 are shown. In the embodiments, the "second optical components 104" refer to the optical components 104 of the alignment structure 103 that are provided on the PIC interposer 100. In addition to the embodiments of FIG. 1, the example configurations for the embodiments in FIG. 14 are applicable to the embodiments described in FIGS. 2-7.

In embodiments, the second optical components require optical components or combinations of optical components that provide access to the optical signal 170 normal to the surface. Upturned mirrors and grating structures provide such directional signals in preferred embodiments. Other optical components and configurations of optical components may also provide a signal or signals that can be detected by a detector 164 positioned over the PIC 110 or that can receive an optical signal from an emitting device 162 positioned over the wafer and that can redirect the signal to propagate all or in part, to be received by a first optical component 102 on the FAU 102. Other optical device structure examples listed in FIG. 14 include reflector structures, reflector structures coupled to single and multimode optical fibers, reflector structures coupled to single and multimode waveguides, reflector structures coupled to spot size converters, reflector structures coupled to lenses, grating structures coupled to waveguides, and grating structures coupled to spot size converters and lenses. Other optical devices and configurations of devices may also be used in configuring the second optical components 104 of the alignment structure 103.

Multimode fibers and waveguides may be used in embodiments of the second optical components 104 of the alignment structure 103 and the use of multimode fibers and waveguides can provide additional information pertaining to the alignment of the first and second optical components that may not be available with single mode fibers or waveguides.

Grating structures may also be used in the interposer-based portion 104 of the alignment structure 103 to direct signals normal or nearly normal to the lateral plane of the PIC 110. Grating structures may be used to receive signals from an emitting device placed in proximity to the surface of the grating or to reflect signals incident on the grating structures from an axis of propagation parallel to the lateral plane of the PIC 110.

Figure 15A:
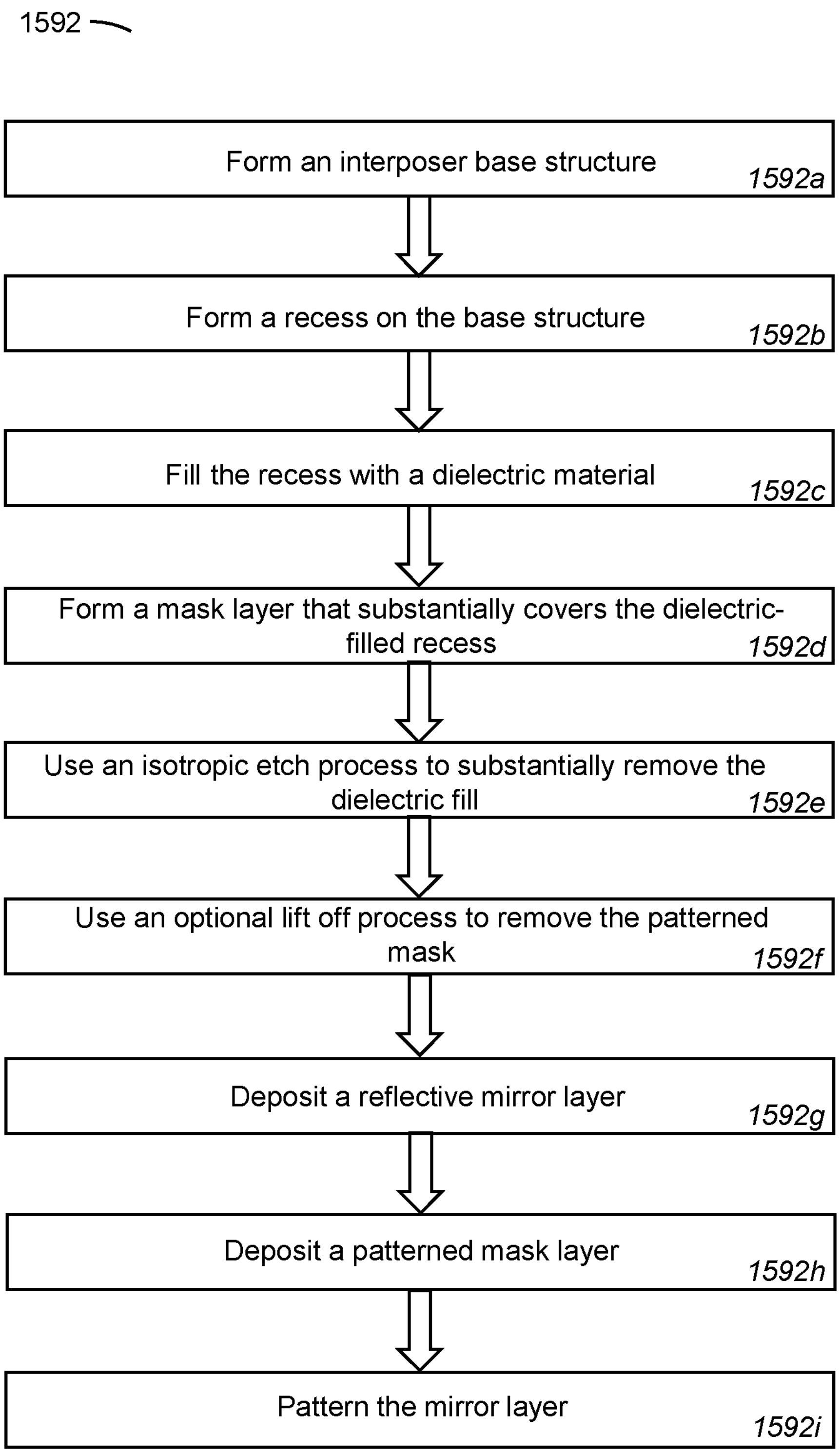
FIG. 15A shows a flowchart for a method of forming an example upturned mirror structure.
Figure 15B:
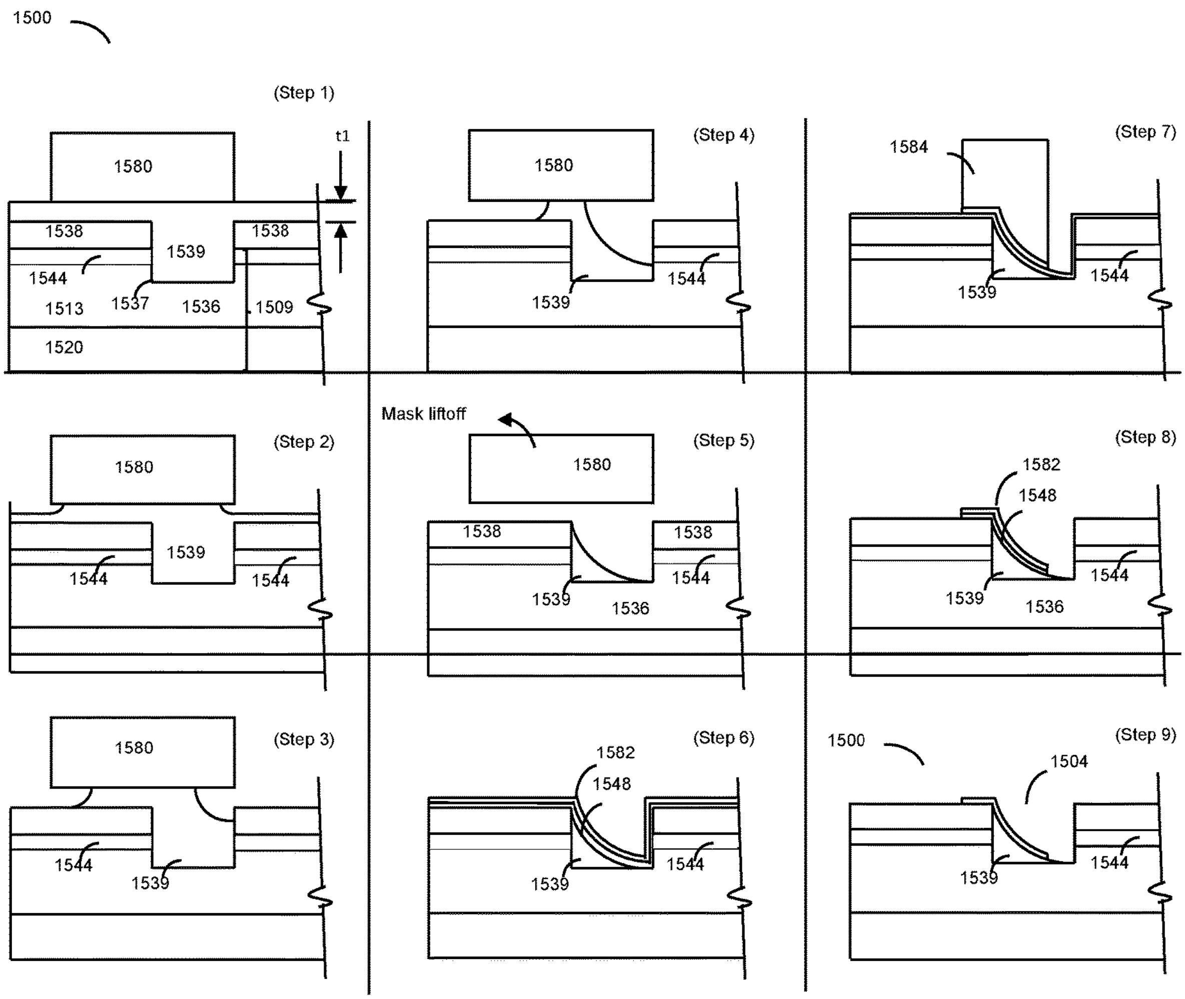
FIG. 15B shows example process steps used in the formation of a mirror structure on an interposer-based PIC.

Referring to FIG. 15A, a flowchart for a method of forming an embodiment of an upturned reflector is shown. FIG. 15B shows a sequence of drawings in which the steps of the fabrication process are further illustrated for an embodiment of a PIC die 1500 with an upturned reflector structure 1504. In embodiments, the reflector 1504 is used in conjunction with an interposer structure that includes the substrate 1520, electrical interconnect layer 1513, and planar waveguide layer 1506. Planar waveguide layer 1506 may include one or more or a core waveguide layer, an upper cladding layer, and a lower cladding layer, and one or more of one or more of a spacer layer, buffer layer, planarization layer, or other layers.

FIG. 15A shows process steps 1592*a* through 1592*i* that describe an embodiment for the formation of an upturned reflector structure in the interposer. In Step 1592*a*, an interposer base structure is formed that includes a substrate and an optional electrical interconnect layer. In Step 1592*b*, a recess is formed in the interposer that will accommodate the upturned reflector. The recess formed in the interposer to accommodate the upturned reflector should intersect the waveguide and be sufficiently deep to enable an upturned reflector formed in the recess to intersect the path of the optical signal propagating in the opened waveguide. In Step 1592*c*, the recess is filled with dielectric material such as silicon dioxide, silicon nitride, silicon oxynitride or another dielectric material. Polymer layers may also be used. The dielectric material should have favorable isotropic etching properties using either or both of a wet etch process and a dry etch process. In Step 1592*d*, a patterned mask layer is formed over a substantial portion of the recess. In Step 1592*e*, an isotropic etch process is used to remove a substantial portion of the dielectric fill material from below the mask layer and the recess. In Step 1592*f*, an optional lift off process is used to remove the mask layer. In some embodiments, the mask layer may be removed during the isotropic eth process. In other embodiments, the mask layer may not be removed during the isotropic etch process but may be removed during a subsequent lift off process. Following the isotropic etch process and removal of the mask layer, and prior to the deposition of a reflective mirror layer, a base layer is formed in the recess upon which a mirror is to be formed. In some embodiments, the reflective layer is formed directly on the dielectric. In other embodiments, an intermediate layer is formed on the base layer prior to the deposition of the reflective layer. In Step 1592*g*, the reflective layer is deposited onto the base layer. In Step 1592*h*, a patterned mask layer is formed. The patterned mask layer can be a photoresist mask layer or a hard mask layer or a combination of a photoresist mask layer and a hard mask layer. The hard mask layer could be a silicon dioxide layer, a silicon nitride layer, a silicon oxynitride layer, an aluminum oxide layer, or another hard mask layer. Preferably, the hard mask layer, if used, should have an etch selectivity relative to the reflective mirror layer such that the integrity of the reflective mirror layer is maintained throughout the duration of the reflective layer patterning step. In Step 1592*i*, the reflective mirror layer is patterned to form the upturned reflector structure. The reflective layer can be patterned using a wet etch chemistry or a dry etch process. For an aluminum-based reflective layer, for example, an oxide hard mask can be used. A chlorine-based process chemistry having a high selectivity to the aluminum layer relative to the oxide hard mask (etch rate of aluminum is greater than the etch rate of the silicon dioxide) can be used to pattern the reflector layers. Wet chemistries can also be used to etch the aluminum. Steps 1592*a* through 1592*i* are further illustrated in FIG. 15B.

Step 1 of FIG. 15B shows a cross-section schematic view of an initial film structure for forming an embodiment of a reflector structure 1504. The film structure in FIG. 15B shows a planar waveguide 1544 on intermetal dielectric layer 1536 of the electrical interconnect layer 1513 on substrate 1520. Planar waveguide layer 1544 is formed from all or a portion of the layer 1506. In the embodiment shown, layer 1538 is a dielectric layer such as silicon dioxide, silicon nitride, or silicon oxynitride. In other embodiments, other dielectrics can be used. In the initial structure shown in step 1 of FIG. 15B, a recess 1537 is shown to extend through the planarized dielectric layer 1538, through the planar waveguide 1544, and through a portion of the intermetal dielectric 1536 of the interconnect layer 1513. Recess 1537 is filled with dielectric material 1539 in the embodiment shown. In some embodiments dielectric layer 1539 is silicon dioxide. In other embodiments, the dielectric layer 1539 is silicon oxynitride. In these and other embodiments, materials are selected that have a high etching preference or etch selectivity for isotropic etching relative to the dielectric layer 1538 or to a top layer of a multilayer dielectric layer 1538. Mask 1580 is a patterned layer. In some embodiments, the mask layer is a patterned photoresist. Other mask materials are used in other embodiments. Planar waveguide structures 1544 can be in the range of a few microns to tens of microns in width. Embodiments showing the planarized dielectric layers formed over the planar waveguides 1544 are further described herein. The planar waveguides 1544 are also in the range of a few microns to tens of microns in width. Similarly, in embodiments, the recess 1537 within which the reflector is formed is typically wider than the width of the planar waveguide 1544.

Step 2 in FIG. 15B shows a schematic cross-section view of dielectric layer 1539 after a short exposure to a wet isotropic etch process that results in a partial removal of the layer. Illustrations for Steps 3 and 4 show the anticipated structure as the duration of the isotropic wet etch is increased and the layer 1539 is removed, until a small amount remains in the recess 1537 as shown in Step 5 of FIG. 15B. Step 5 shows a curved surface on the remainder of the layer 1539 after an etching process that provides a base for a reflective mirror layer used in the formation of an upturned reflector structure 1504. In the embodiment shown in Step 5, the remainder of mask layer 1580 is removed by a liftoff process as the undercutting isotropic etch of the layer 1539 eliminates any contact between the mask layer 1580 and the underlying layer 1539. Step 6 shows a schematic cross-section after formation of a reflective layer 1548 on the surface of the curved insulating layer 1539. Curved insulating layer 1539 forms a base for the reflector structure 1504 in the embodiment. In embodiments, the reflective mirror surface is typically a metal layer 1548 and may include a passivation layer 1582. In an embodiment, an aluminum layer is used to form the reflective surface layer 1548 of the upturned reflector structure 1504. Hard mask layer 1582 is formed on the reflective mirror layer 1548 as shown in Step 6, and in the embodiment shown, is patterned with a photoresist layer 1584 as shown in Step 7. Step 7 shows a patterned hard mask layer 1582 below the photoresist mask layer 1584. In embodiments, the patterning of the hard mask layer 1582 may be accomplished by depositing and patterning a layer of photoresist and then exposing the hard mask layer 1582 to a suitable wet chemical or dry etch process to remove the hard mask material in areas not covered by the photoresist mask 1584. After patterning of the hard mask 1582, the photoresist is shown removed in Step 7 of FIG. 15B, although in some embodiments, the photoresist layer 1584 can remain during the patterning etch of the reflective mirror layer 1548. Step 9 of FIG. 15B shows the reflector layer 1548 after removal of the hard mask layer 1582. The curved surface of the reflective layer 1548 of the reflector structure 1504 is shown in substantial alignment with the planar waveguide 1544 to receive an optical signal from, or reflect an optical signal to, the patterned waveguide 1544.

Figure 15C:
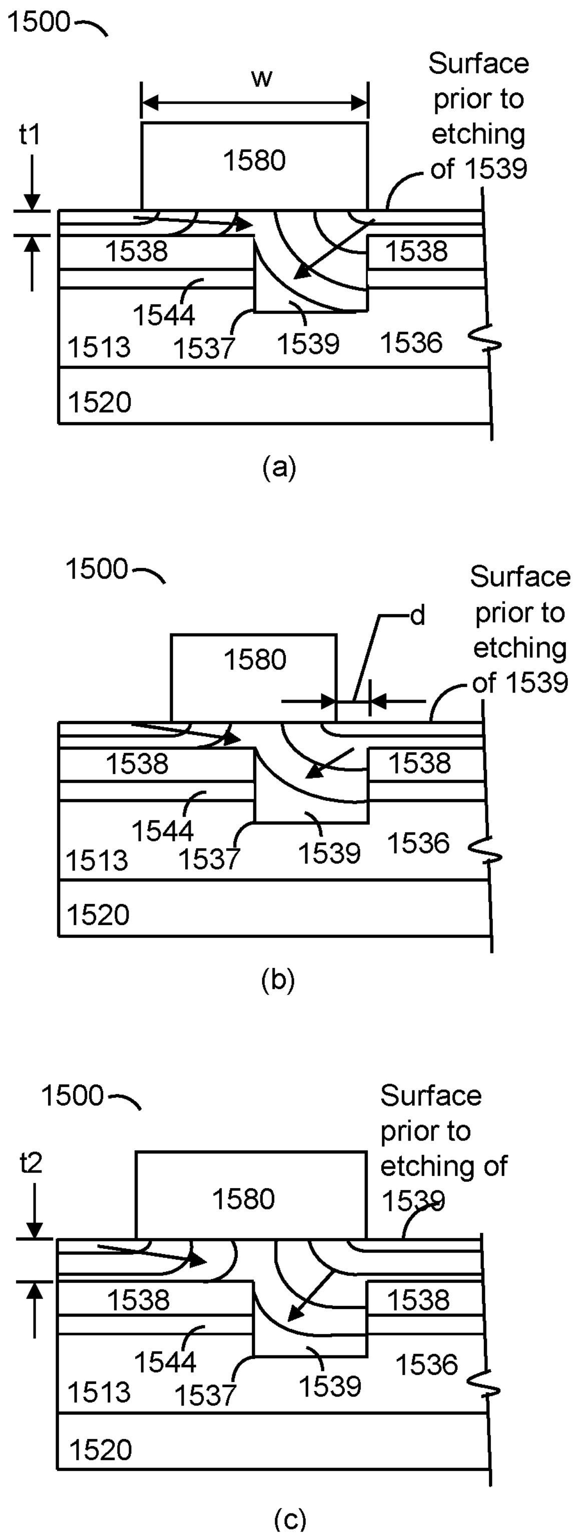
FIG. 15C shows some variations in the formation of the base structure of an upturned mirror.

Referring to FIG. 15C, schematic drawings of example film structures that may be used in the formation of upturned reflector structures 1504 on mirror-containing portions of embodiments of PIC die 1500. PIC die 1500 shows planar waveguide layer 1544 on electrical interconnect layer 1513, and the electrical interconnect layer 1513 on substrate 1520. Insulating layer 1538 is a dielectric material or composite layer of dielectric materials that includes one or more of a passivation layer, a planarization layer, a spacer layer, a buffer layer, and a cladding layer, among others. Recess 1537 is formed through the insulating layer 1538, and through the planar waveguide layer 1544. In some embodiments, the recess 1537 extends into the underlying intermetal dielectric layer 1536 of the electrical interconnect layer 1513 as shown, by example, in FIG. 15C (a). Recess 1537 is filled with a dielectric fill material 1539 such as silicon oxide or silicon oxynitride, for example. Dielectric material 1539 is in some embodiments, a doped dielectric material.

In the embodiment shown in FIG. 15C (a), example contour lines are shown that illustrate the progression of the shape of the dielectric material 539 upon exposure to an isotropic etch process with a high selectivity over the underlying layer 1538. The "Surface prior to etching of 1539" shows an embodiment of the surface of the layer 1539 prior to etching, and each contour line represents a increment in time of exposure of a wet etch process to isotropically and selectively remove the layer 1539 until a base for reflector 1504 is formed. An example base for the mirror layer is shown by the shaded portion of the 1539 layer in FIG. 15C (a). A high etch selectivity to the layer 1539 implies herein that the etch rate of the layer 1539 is substantially higher than that of the underlying layer 1538. As the etch front progresses, a cross sectional profile suitable for the base of the mirror layer is formed in the remainder of the layer 1539, as indicated by the shaded area 1539. The remaining thickness of layer 1539 after exposure to a suitable etch process provides the base of the reflective mirror structure as shown.

The resulting curvature of the mirror base 1539 is influenced by a number of factors that include the choice of material 1539 used to fill the recess 1537, and the etching properties of the material used in fill material 1539 as well as the etching properties of the underlying material 1538. Additionally, the resulting curvature is influenced by a number of structural dimensions such as the thickness "t1" between the top of underlying insulating layer 1538 and the bottom of patterned mask layer 1580 as shown in FIG. 15C (a), the width "w" of the mask 1580 shown in FIG. 15C (a), and the offset distance "d" between the mask 1580 and the recess 1537 shown in FIG. 15C (b). Other factors may also influence the resulting curvature of the insulating layer 1539 after exposure to the etch process. In FIG. 15C (b), for example, etch contour lines are shown that illustrate the anticipated progression of the etch front and the resulting curvature of the remainder of layer 1539 with an offset distance "d" between the left edge of the recess 1537 as shown in FIG. 15C (b) and the left edge of the mask 1580. The offset distance "d" allows more etchant into the recess resulting in a flatter contour for the mirror base layer 1539.

Similarly, referring to FIG. 15C (c), etch contour lines are shown that illustrate the anticipated progression of the etch front and the resulting curvature of the remainder of layer 539 with an increased thickness "t2" between the top of underlying insulating layer 538 and the bottom of patterned mask layer 580. In some embodiments, the increased initial thickness of the layer 1539 prior to etch results in a more vertical profile with greater curvature after etching in comparison to the thickness "t1" of the layer 1539 shown in FIG. 15C (b).

Embodiments in FIG. 15C illustrate a number of ways in which the resulting profile of the mirror surface can be varied. Variations in the curvature of the mirror will affect the direction of the reflected optical signal that propagates both from the planar waveguide layer 1544 to a receiving device of an optical probe head (164, for example) and from an emitting device of an optical probe head (162, for example) to the planar waveguide layer 1544.

Referring to FIG. 16, a cross-section schematic drawing is shown of an embodiment of a film structure of a PIC that includes a portion for the formation of a mirror base that has minimal or no curvature. Methods for forming linear profiles in dielectric layers can include the use of a pull-back technique in which a sloped photoresist or other mask layer recedes as a dry plasma etch progresses. FIG. 16A shows a PIC film structure after formation of a patterned gray scale mask layer 1680. FIG. 16 shows substrate 1620 with electrical interconnect layer 1613 having intermetal dielectric layer 1636. Recess 1637 is shown with dielectric 1639. Planar waveguide layer 1644 is shown with planarized dielectric layer 1638.

FIG. 16B shows a schematic cross-section drawing of a portion of PIC structure 1600 after a patterning process to form a mirror base structure using the gray scale mask 1680 of FIG. 16A. The receding mask layer 1680 results in a sloped profile in the dielectric layer 1639. Upon removal of the mask layer, the formation of the reflector layer can proceed as in Steps 6-9 as described for FIG. 15B.

FIG. 17 shows yet another method of forming a reflector structure in a PIC substrate such as an interposer substrate. Example steps for the formation of a reflector structure having three-dimensional curvature are described in conjunction with the schematic drawings in FIGS. 17A-17E.

Figure 17A:
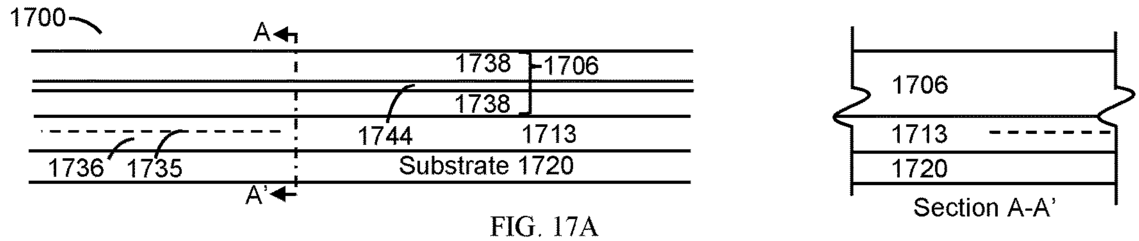
FIG. 17A shows an interposer structure having patterned planar waveguides and an optional electrical interconnect layer.

FIG. 17A shows an example interposer layer structure that can be used in some embodiments. Interposer 1700 comprises substrate 1720, electrical interconnect layer 1713, and planar waveguide layer 1706. The planar waveguide layer 1706 includes a core layer and may include one or more of one or more cladding layers, buffer layers, spacer layers, and planarization layers, among other layers. Waveguide 1744 is a patterned planar waveguide formed from all or a portion of the planar waveguide layer 1706 that includes a core layer of the planar waveguide and all or a portion of other layers of the planar waveguide layer 1706. In embodiments, the patterning of the planar waveguide layer 1706 can be performed using a lithographic patterning step and an etching process. In some embodiments, a hard mask such as an aluminum layer is used in the patterning of the planar waveguide layer 1706 to form the patterned planar waveguides 1744. The core layer of the planar waveguide layer 1706 is the layer through which optical signals substantially propagate. FIG. 17A shows dielectric layers 1738 which may be for example, one or more cladding layers, spacer layers, buffer layers, and planarization layers, among other layers. In some embodiments, layer 1738 is a dielectric layer of silicon dioxide. In other embodiments, silicon oxynitride may be used. In yet other embodiments, silicon nitride may be used. The interposer structure may also include, for example, one or more thermally conductive layers. The electrical interconnect layer 1713 may contain one or more layers of electrical interconnects 1735 and intermetal dielectric layers 1736.

Figure 17B:
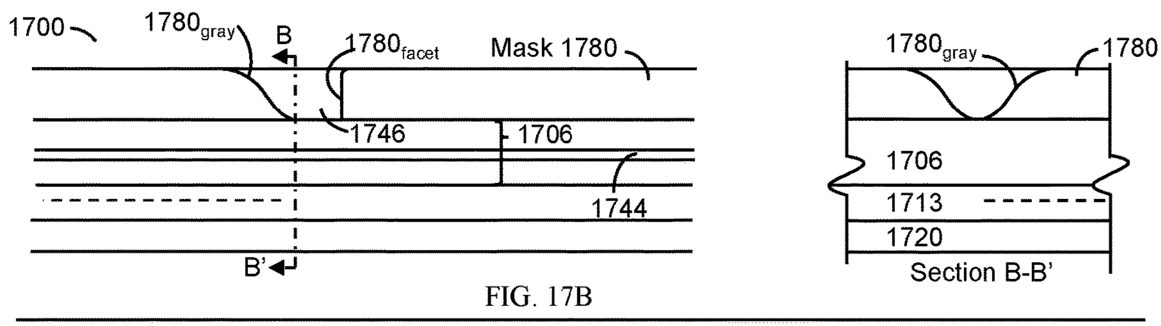
FIG. 17B shows an interposer as in FIG. 17A with the addition of a patterned gray scale mask layer.

FIG. 17B shows the interposer structure from FIG. 17A with the addition of a patterned photoresist mask layer 1780 having a first gray scale mask portion $\mathbf{1780}_{gray}$, and a second portion for forming a waveguide facet $\mathbf{1780}_{facet}$. In the embodiment shown, the sloped portion $\mathbf{1780}_{gray}$ of the photoresist mask layer 1780 enables the formation of a three-dimensional surface in the underlying planar waveguide layer 1706 after patterning with a suitable etching step. Fluorine-containing gas chemistries used in plasma-based etching equipment, for example, can be used in the formation of the cavity in dielectric materials such as silicon dioxide and silicon nitride. The sloped profile in the photoresist gray scale mask 1780, shown in the Section B-B' drawing of FIG. 17B is susceptible to pullback during an etch patterning process. The sloped profile is provided with the use, for example, of a gray scale reticle that varies the photolithographic light intensity to which the photoresist is exposed, in combination with the selective removal of the exposed photoresist in a suitable developer solution. Only the portions of the photoresist layer that are exposed to a sufficient lithographic radiation dosage are removed in the developer solution, leaving the sloped profile in the resist layer 1780 as shown in the example profile in FIG. 17B (and including the cross-section profile of layer 1780 shown in Section B-B' of FIG. 17B). An opening 1746 in the masked area facilitates the formation of an end facet 1745 in the embodiment.

Electrical interconnect layer 1713 that includes electrical interconnects 1735 and intermetal dielectric layers 1736 are also shown in FIG. 17B for the embodiment. Electrical interconnects 1735 in the electrical interconnect layer 1713 enable interconnection of electrical and optoelectrical devices on the substrate.

Figure 17C:
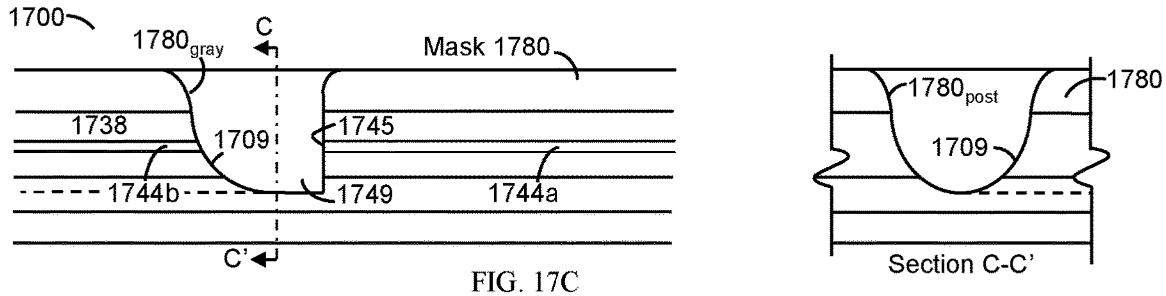
FIG. 17C shows an interposer as in FIG. 17B after the patterning of the planar waveguide layer.

FIG. 17C shows the interposer 1700 from FIG. 17B after the formation of a waveguide facet 1745 and reflector cavity 1749 having cavity surface 1709 wherein the cavity surface has three-dimensional curvature. The reflector cavity 1749 and waveguide facet 1745 are formed in the embodiment, in a portion of the planar waveguide layer 1706 and in the embodiment shown, a portion of the intermetal dielectric layer 1736 of the electrical interconnect layer 1713. In other embodiments, a portion of the electrical interconnect layer 1713 may not be patterned.

FIG. 17C shows a cross section schematic drawing through the reflector cavity and the patterned planar waveguide 1744 formed from the planar waveguide layer 1706. The post-patterning sloped portion $\mathbf{1780}_{post}$ of gray scale mask 1780 in FIG. 17C, also shown in Section C-C', is shown to have receded from the pre-patterned sloped portion 1780*a* from FIG. 17B. The recession of the sloped portion $\mathbf{1780}_{gray}$ of the gray scale mask 1780 from an example initial position illustrated by the sloped portion $\mathbf{1780}_{gray}$ shown in FIG. 17B prior to patterning, to the example position after patterning as illustrated by the sloped portion $\mathbf{1780}_{post}$, is a characteristic of the use of a sloped photoresist masking layer as may be provided with the use of a gray scale patterning technique.

In embodiments, first gray scale mask portion $\mathbf{1780}_{gray}$ is formed such that the cross-sectional profile of this mask portion prior to patterning of the planar waveguide layer 1706, and in combination with a patterning process for the planar waveguide layer 1706, produces a three-dimensional curved cavity surface 1709 upon which a reflector layer 1707 can be added that will enable the focusing of optical signals reflected from the reflector layer. Section C-C' further shows the gray scale mask portion $\mathbf{1780}_{gray}$ after patterning of the planar waveguide layer 1706 that includes the dielectric layer 1738 and a portion of the layer used to form the planar waveguide 1744. After patterning, the formation of the waveguide facet 1745 and reflector cavity 1749 results in the division of the waveguide 1744 into portions 1744*a*, 1744*b* as shown in FIG. 17C. Portion 1744*a* of the patterned planar waveguide 1744, in FIG. 17(*c*) includes the end facet 1745 formed in the cavity 1749.

Figure 17D:
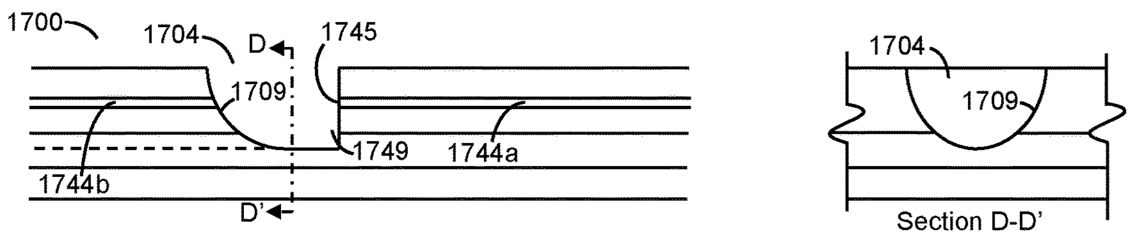
FIG. 17D shows an interposer as in FIG. 17C after removal of the patterned gray scale mask layer.

FIG. 17D shows the interposer structure 1700 from FIG. 17C after removal of the photoresist mask layer 1780 that includes any remainder of first gray scale mask portion $\mathbf{1780}_{gray}$ and any remainder of second portion $\mathbf{1780}_{facet}$. Curved three-dimensional cavity surface 1709 is shown in FIG. 17D (including Section D-D' of FIG. 17D). The curved three-dimensional cavity surface 1709 in cavity 1749 forms a base for the formation of a reflector in subsequent process steps as described herein. Waveguide facet 1745 of waveguide portion 1744*a* is shown closely coupled to the cavity surface 1709 in cavity 1749.

Figure 17E:
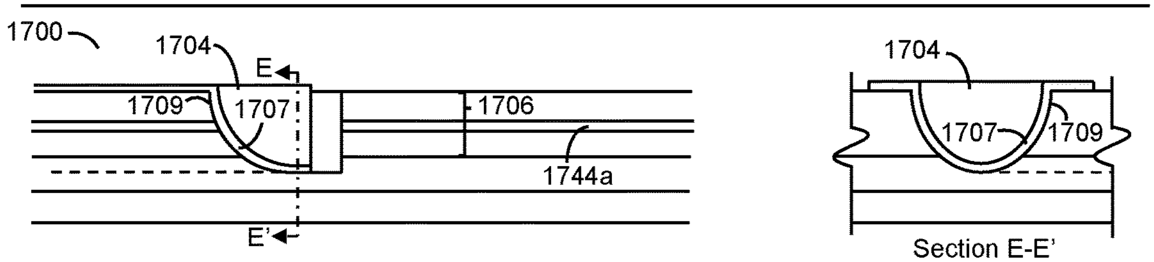
FIG. 17E shows an interposer as in FIG. 17D after formation of a reflector layer on a reflector cavity.

FIG. 17E shows the interposer structure 1700 from FIG. 17D after the formation of a reflector layer 1707 resulting in the formation of an embodiment of reflector 1704. In the embodiment shown, the reflective layer 1707 of reflector 1704 is receptive to optical signals emerging from the closely coupled end facet 1745 of the planar waveguide portion 1744*a* as shown in FIG. 17E. Section E-E' shows reflector layer 1707 on curved cavity surface 1709 of reflector 1704.

In some embodiments, reflector layer 1707 is a metal layer. In some embodiments, a layer of aluminum is used. In other embodiments, a layer of gold is used. In some embodiments, another metal or metal alloy may be used to form a reflective surface layer. Reflector layer 1707, in some embodiments, may be a single layer or more than a single layer. In some embodiments, the reflector layer includes a passivation layer such as a protective transparent dielectric material such as silicon dioxide or other oxide layer. In other embodiments, other passivation materials may be used. For embodiments in which a passivation layer is included, the passivation layer may be a single layer or more than a single layer. Exposure of a pure metal or metal alloy can lead to eventual tarnishing or oxidation from exposure to ambient conditions. Passivation of the exposed metal layer with a transparent dielectric material can prevent or reduce the potential for changes in the reflective properties of a metal layer that can result from exposure to ambient and other processing conditions.

In some embodiments, the reflector layer 1707 is a substantially uniform layer in thickness covering the cavity surface 1709. In other embodiments, the reflector layer may not be uniform in thickness and may contribute to the three-dimensional curvature of the reflector structure 1704 and to the focusing or narrowing of the outgoing optical signal reflected from reflector 1704.

In embodiments, the reflector layer 1707 is a patterned reflector layer as shown, for example, in FIG. 17E. In some embodiments, the patterning of the reflector layer 1707 can be performed using a deposition step to form the reflector layer or group of layers, followed by a lithographic patterning step to form a mask layer, and further followed by a wet or dry etching step to remove portions of the reflector requiring removal. Additional passivation layers may be added in some embodiments upon removal of the masking layer.

In other embodiments, a lift-off process may be used to form a patterned reflector layer 1707. In embodiments that use a lift-off process to form the reflector layer 1707, the reflector layer 1707 is provided by forming a patterned mask layer, such as a patterned photoresist layer in which the photoresist is removed from all or a portion of the cavity surface 1709. In these embodiments, the reflector layer 1707 is deposited onto the cavity surface 1709 and over the patterned photoresist layer. In a subsequent lift-off step, the photoresist is removed from the interposer along with the metal layer on the photoresist leaving the metal reflector layer 1707 that resides on the cavity surface 1709.

Referring to FIG. 18, a sequence of drawings is shown that illustrate an embodiment of an interposer-based alignment structure that includes a reflector structure and a patterned planar waveguide coupled to the reflector structure. The sequence of drawings also illustrates a method of formation for the interposer-based alignment structure in conjunction with the formation of all or a portion of a PIC on the interposer.

FIG. 18A shows an interposer structure comprised of a planar waveguide layer 1806 formed on a base structure, wherein the base structure includes an optional electrical interconnect layer 1813 on a substrate 1820. Electrical interconnect layer 1813 is formed in some embodiments on a semiconductor substrate 1820 such as silicon. Indium phosphide, gallium arsenide, or other semiconductor substrates may also be used. In yet other embodiments, a ceramic or insulating substrate is used. In yet other embodiments, a metal substrate is used. And in yet other embodiments, a combination of one or more semiconductor layers, insulating layers, and metal layers are used to form a substrate 1820 upon which the optional electrical interconnect layer 1813 and the planar waveguide layer 1806 are formed. In some embodiments, the electrical interconnect layer 1813 is not in direct contact with the substrate but rather an intervening layer is present. Similarly, the planar waveguide layer 1806, in some embodiments, is not in direct contact with the underlying electrical interconnect layer 1813 but rather an intervening layer or layers may be present. In some embodiments, a semiconductor layer or substrate is mounted on a metal layer or substrate to form a composite substrate. Optional electrical interconnect layer 1813 may not be present, for example, for interposer structures that do not require electrical connectivity between devices formed on the interposer.

FIG. 18B shows the formation of a patterned mask layer 1852-1 on the planar waveguide layer 1806. In embodiments, mask layer 1852-1 is a hard mask layer 1852-1 that includes patterning for the formation of optical waveguides that are formed in proximity to reflector site such as noted in FIG. 18(*b*). Patterns may also be included in the hard mask 1852-1 for the formation of all or a portion of one or more alignment aids that may be formed from the planar waveguide layer 1806 that may include fiducial marks and alignment pillars, among other alignment features. In the embodiment shown in FIG. 18B, mask layer portions are shown that include patterned planar waveguides and optical and optoelectrical components and circuitry $\mathbf{1840}_{pre}$.

Portions of the mask layer 1852-1 may be used in some embodiments to form all or a portion of optical devices 1840 for embodiments in which the optical devices 1840 are formed wholly or in part from the planar waveguide layer 1806. Optical devices 1840 may be waveguides, gratings, lens, or any device that can be formed from at least a portion of the planar waveguide layer. Alternatively, in other embodiments, optical devices 1840 are mounted devices, and not fabricated directly from the planar waveguide layer 1806 but added at a later step in the process of forming the PIC 1802. Optical device 1840 can be one or more of a portion of a device formed from the planar waveguide layer and one or more of a portion of a mounted device.

In some embodiments, the planar waveguide layer 1806 is formed of one or more layers of silicon dioxide, silicon nitride, and silicon oxynitride as described herein. To pattern the planar waveguides from such layers using a dry etch process, fluorinated etch chemistries in which one or more commonly utilized gases such as $CF_4$, $CHF_3$, $C_2F_8$, $SF_6$, among others, are used. In embodiments, aluminum or an alloy of aluminum is used to form a hard mask 1852-1. Aluminum hard masks are known to exhibit a high resistance to dry etching in fluorinated chemistries and thus the dimensions of the hard mask can be maintained during the etching of the planar waveguide layer 1806. In other embodiments, other hard masks are used that also exhibit high resistance to the etch chemistry such as Au, Ag. Ni, and Pt. In other embodiments, hard masks layers such as Ti, $TiO_x$, Ta, $TaO_x$, aluminum oxide, silicon nitride, silicon carbide, or a combination of one or more of these materials are used. In some embodiments, oxygen or other oxygen-containing gas is added to the etching chemistry to increase the resistance of the hard mask to the etch chemistry. In yet other embodiments, diluents are added to the fluorinated gas chemistry such as one or more of argon, helium, nitrogen, and oxygen, among others to increase the resistance of the hard mask to the fluorinated etch chemistry. In embodiments, the masking layer typically has a slow rate of removal in comparison to the rate of removal of the planar waveguide layer. Methods for etching of silicon dioxide, silicon nitride, and silicon oxynitride are well understood by those skilled in the art of semiconductor processing, as are methods of increasing the resistance of aluminum hard mask layers and other hard mask layers using fluorinated etch chemistries.

FIG. 18C shows the planar waveguides 1844 and circuit components 1840 formed from a patterning process used to remove the unmasked portions of the planar waveguide layer 1806. After patterning of the planar waveguide layer to form the planar waveguides 1844, the mask layer 1852-1 is shown removed from the patterned structures formed from the planar waveguide layer 1806 in FIG. 18D. Optionally, a portion of hard mask layer 1852-1 may not be removed to enable subsequent use of this mask layer 1852-1.

Removal of the mask layer 1852-1 (see FIG. 18D) from the planar waveguides 1844 and optical circuit components 1840 is achieved in some embodiments using a wet etch process that selectively removes the metal or other hard mask with little or no removal of the underlaying planar waveguide layer. Metal etchants, such as those used for the removal of an aluminum hard mask, for example, and that have little or no effect on waveguides fabricated from silicon nitride and silicon dioxide, for example, are well known in the art of semiconductor processing. In other embodiments, a dry etch process is used. A benefit of a wet etch process to remove the mask 1852-1 from the planar waveguides 1844 below includes the availability of highly preferential etchants for removal of masking layers 1852-1 with minimal removal of the underlying planar waveguides 1844. Conversely, in embodiments for which photoresist is used in the formation of a patterned mask layer 1852-1, oxygen-based plasma processing may be used, for example, to remove the mask layer 1852-1.

FIG. 18E shows dielectric layer 1838 formed on the embodiment of interposer structure 1800. The dielectric layer 1838 may be one or more layers of silicon dioxide, silicon nitride, or silicon oxynitride, for example, and may include one or more of a planar waveguide cladding layer, a buffer layer, a spacer layer, and a passivation layer, among others. In some embodiments, layer 1838 includes a planarization layer, and a planarization step may be used to planarize the dielectric layer 1838.

FIG. 18F shows embodiment of interposer structure 1800 after formation of second patterned mask layer 1852-2. Mask layer 1852-2 in some embodiments is a hard mask layer, and in the embodiment shown in FIG. 18(*f*), includes patterning for the formation of a reflector cavity in the underlying dielectric layer 1838. The location of the reflector site, and hence the pattern used in the embodiment shown in FIG. 18(*f*) is noted on the drawing.

FIG. 18G shows embodiment of interposer structure 1800 after formation of a reflector cavity 1849 at the location of the reflector site as noted in FIG. 18(*f*). Methods of formation of reflectors base structures and the subsequent formation of reflectors on the base structures are described in detail herein.

FIG. 18H shows embodiment of interposer structure 1800 after formation of a third patterned mask 1852-3 layer. In the embodiment shown, the mask layer 1852-3 is a hard mask layer that is also used in the formation of the reflective layer of the reflector structure (layer 1707, for example). In other embodiments, the hard mask layer 1852-3 and the reflector structure may not be formed from the same layer, or may be made in part from the same layers and in part from different layers. Patterned mask layer 1852-3 includes patterning for the formation of one or more sites on the PIC for the mounting of a fiber attach unit (FAU).

FIG. 18I shows embodiment of interposer structure 1800 after a patterning process to form one or more FAU mounting sites 1850. In the embodiment shown, the patterning process is used to etch through the patterned planar waveguides 1844 that may be coupled to fibers mounted in the FAU and to the portion of planar waveguide layer 1804*b* used in the formation of the alignment structure 1803. In this embodiment, the patterning process is also used in the formation of the end facets 1845 in the patterned planar waveguides 1844 that may be coupled to fibers mounted in the FAU mounted in the FAU mounting site 1850.

FIG. 18J shows embodiment of interposer structure 1800 after removal of all or a portion of the patterned mask layers used in the formation of FAU site(s) 1850. Patterned reflector structure 1804*a* is shown in the figure with patterned planar waveguide 1804*b* that form an embodiment of alignment structure 1803 comprised of a reflector 1804*a* and a patterned planar waveguide 1804*b*.

FIG. 18K shows embodiment of interposer structure 1800 with a mounted FAU 1801 on FAU mounting site 1850. The FAU 1801 includes optical fibers 1805*a*, 1805*b* and fiber or waveguide 1802 of the alignment structure 1803. Alignment structure 1803 shown in the embodiment of FIG. 18K includes the reflector 1804*a* and the patterned planar waveguide 1804*b* on the interposer 1800 and the waveguide 1802 mounted in the FAU 1801.

Figure 19:
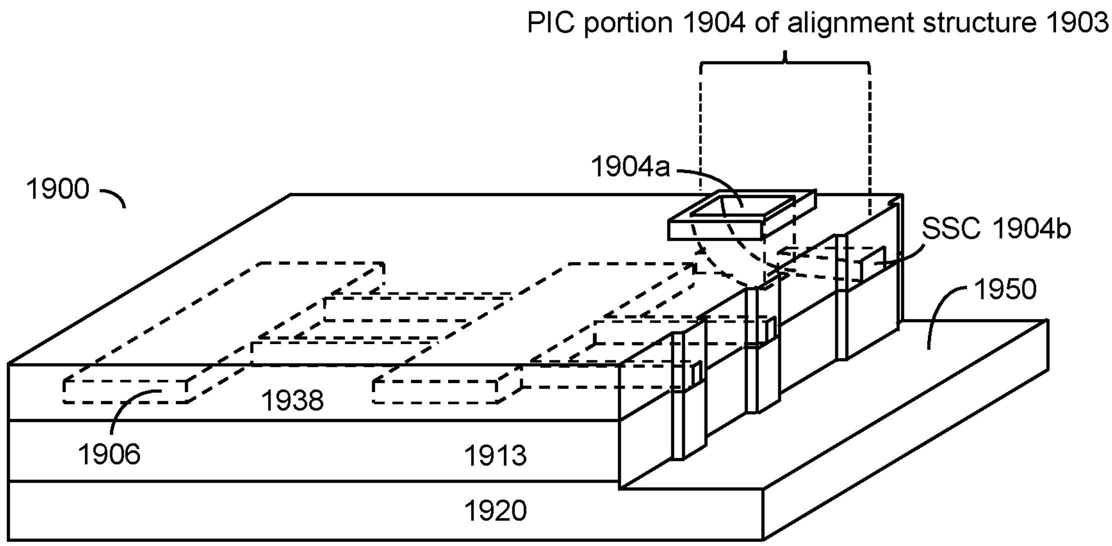
FIG. 19 shows an embodiment of an alignment structure that includes a reflector structure and a spot size converter.

FIG. 19 shows an embodiment 1900 similar to the embodiment 1800 shown in FIG. 18(*j*) with a spot size converter 1904*b* formed in place of the patterned planar waveguide 1804*b*. The PIC portion 1904 of alignment structure 1903 is formed in the embodiment from the combination of the reflector to form the alignment structure portion 1904*a* of the alignment structure 1903 in combination with the spot size converter to form the alignment structure portion 1904*b*. Interposer structure 1900 is shown with dielectric layer 1938 formed over patterned planar waveguide layer 1906. Electrical interconnect layer 1913 and substrate 1920 are also shown as is the FAU landing site 1950.

Figure 20:
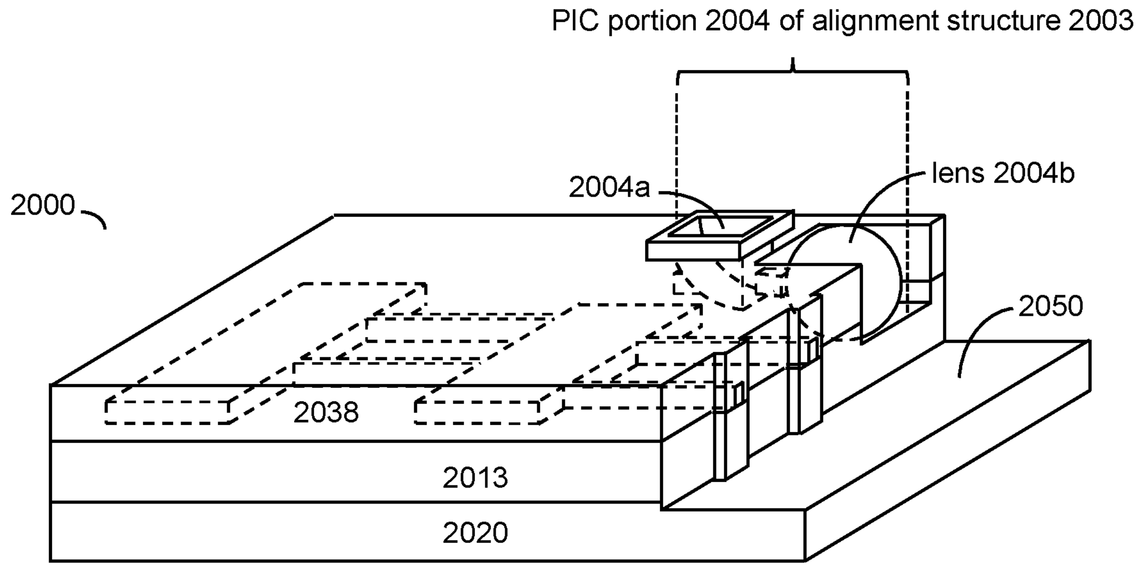
FIG. 20 shows an embodiment of an alignment structure that includes a reflector structure and a lens.

FIG. 20 shows an embodiment 2000 similar to the embodiments 1800 and 1900 with a lens 2004*b* formed in place of the patterned planar waveguide 1804*b* and spot size converter 1904*b*, respectively. The PIC portion 2004 of alignment structure 2003 is formed in the embodiment from the combination of the reflector to form alignment structure portion 2004*a* of the alignment structure 2003 in combination with the lens to form alignment structure portion 2004*b*. Interposer structure 2000 is shown with dielectric layer 2038 formed over patterned planar waveguide layer 2006. Electrical interconnect layer 2013 and substrate 2020 are also shown as is the FAU landing site 2050.

Figure 21:
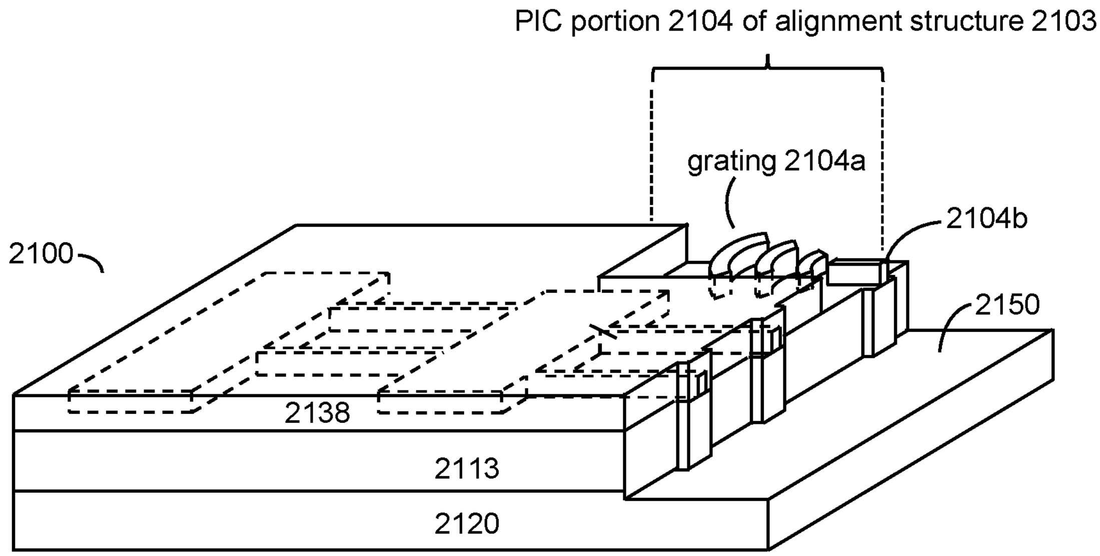
FIG. 21 shows an embodiment of an alignment structure that includes a grating and a patterned planar waveguide.

FIG. 21 shows an embodiment 2100 similar to the embodiment 1800 with a grating 2104*a* formed in place of the reflector 1804*a*. The PIC portion 2104 of alignment structure 2103 is formed in the embodiment from the combination of the grating to form alignment structure portion 2104*a* and the patterned planar waveguide portion to form alignment structure portion 2104*b*. Interposer structure 2100 is shown with dielectric layer 2138 formed over patterned planar waveguide layer 2006. Electrical interconnect layer 2113 and substrate 2120 are also shown as is the FAU landing site 2150.

The alignment structure (for example 104 and other embodiments) facilitates the alignment of the one or more fiber optic cables mounted in the fiber optic cable mounting block. Once aligned, the fiber mounting block may be held in place in some embodiments with an adhesive or an epoxy.

The sequence of drawings in FIGS. 18A-18K illustrate the formation of elements of the alignment structures that include the formation of patterned planar waveguides in conjunction with a reflector structure formed on an interposer substrate. FIGS. 19-21 further illustrate the integration of spot size converters, lens, and gratings into embodiments of alignment structures.

The sequence of drawings in FIGS. 18A-18H also illustrate the formation of a mounting site 1850 for the alignment and attachment of a fiber optic cable mounting block 1801 used to facilitate the alignment and mounting of the fiber optic cables and in particular, the alignment of the cores 1805 for example, of fiber optic cables with end facets 1845 of a portion of patterned planar waveguides 1844 formed from the planar waveguide layer 1806 of the interposer 1800.

Figure 22:
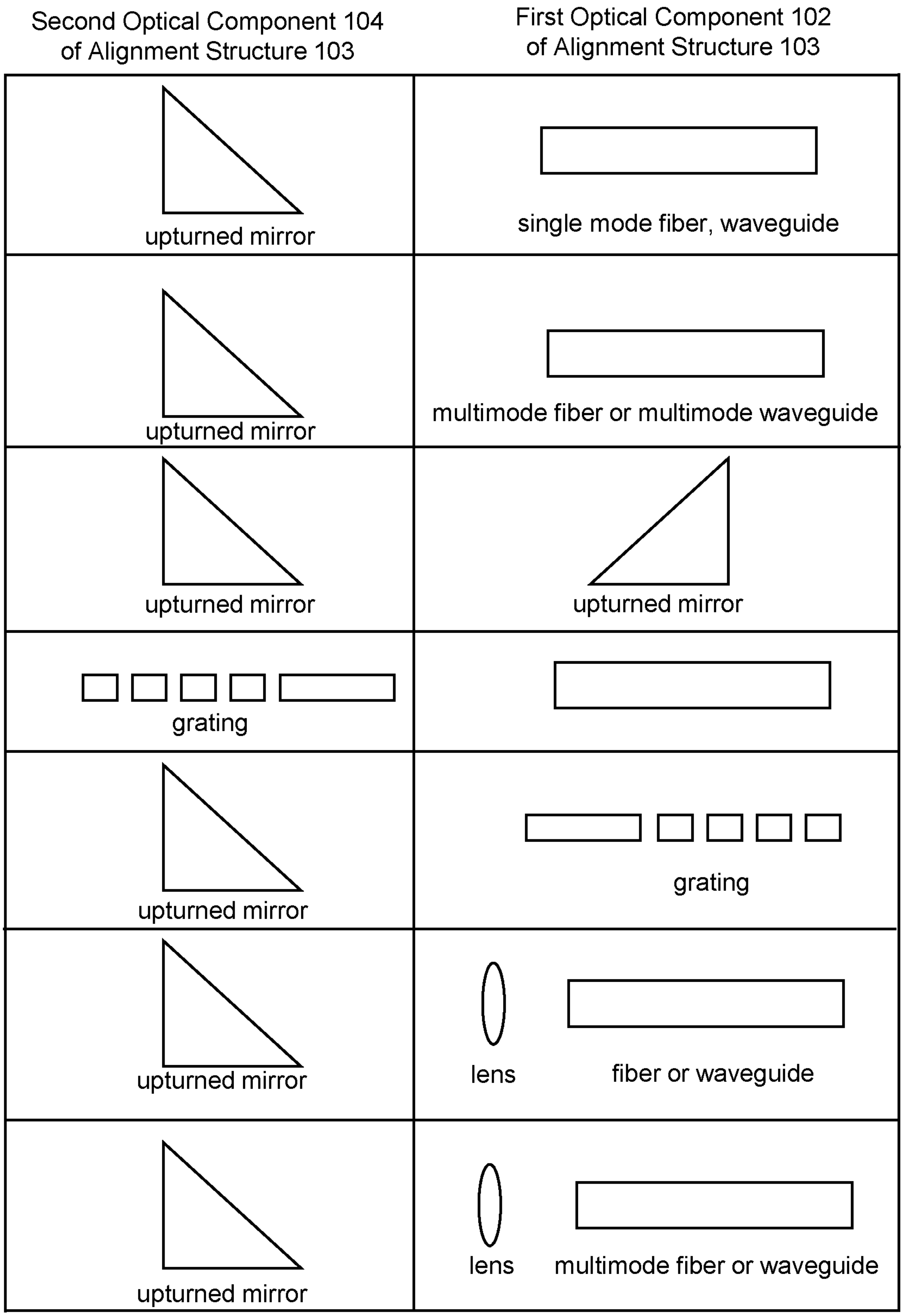
FIG. 22 shows some example embodiments of alignment structures having various first and second optical components.
Figure 22:
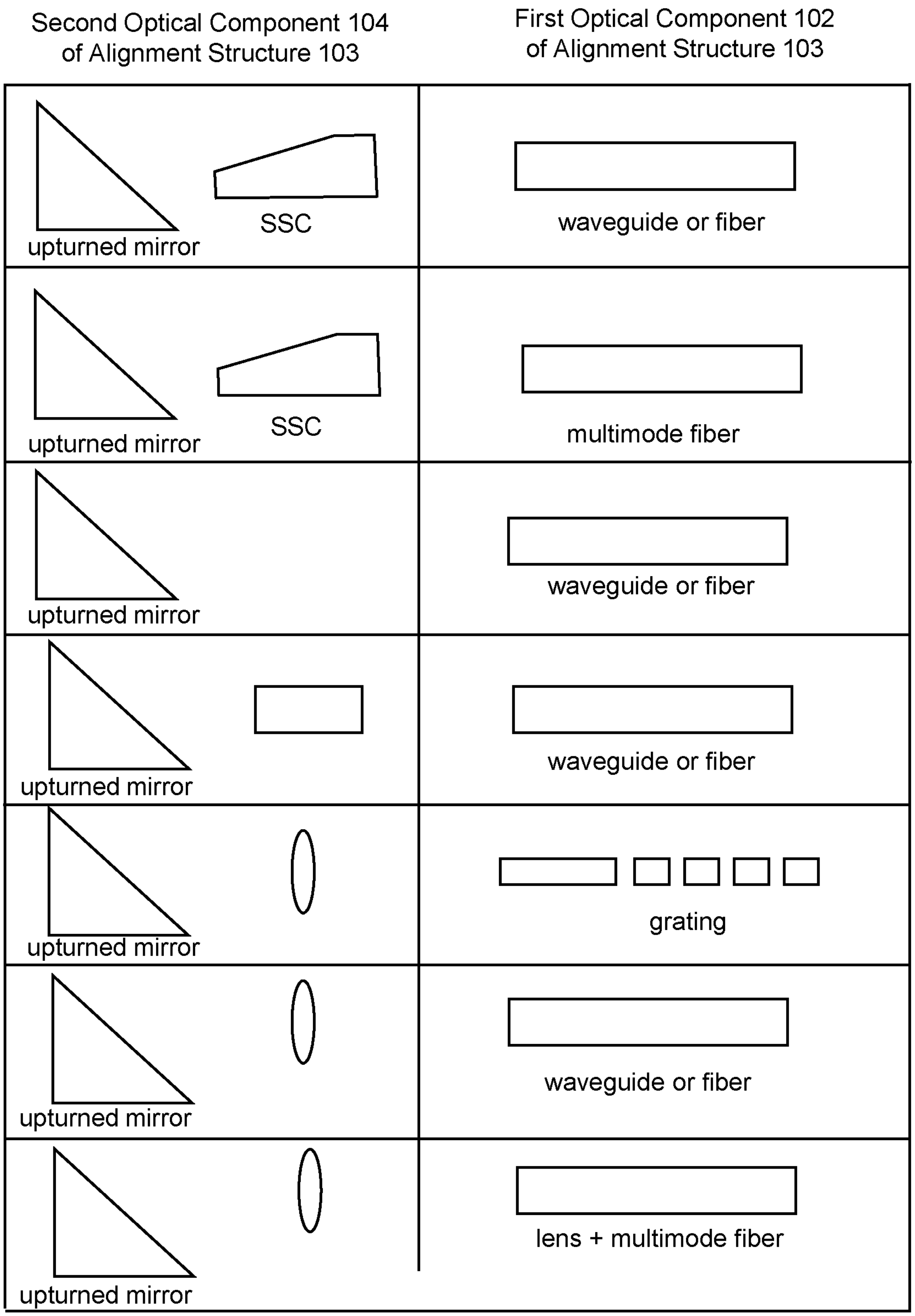
Figure 22:
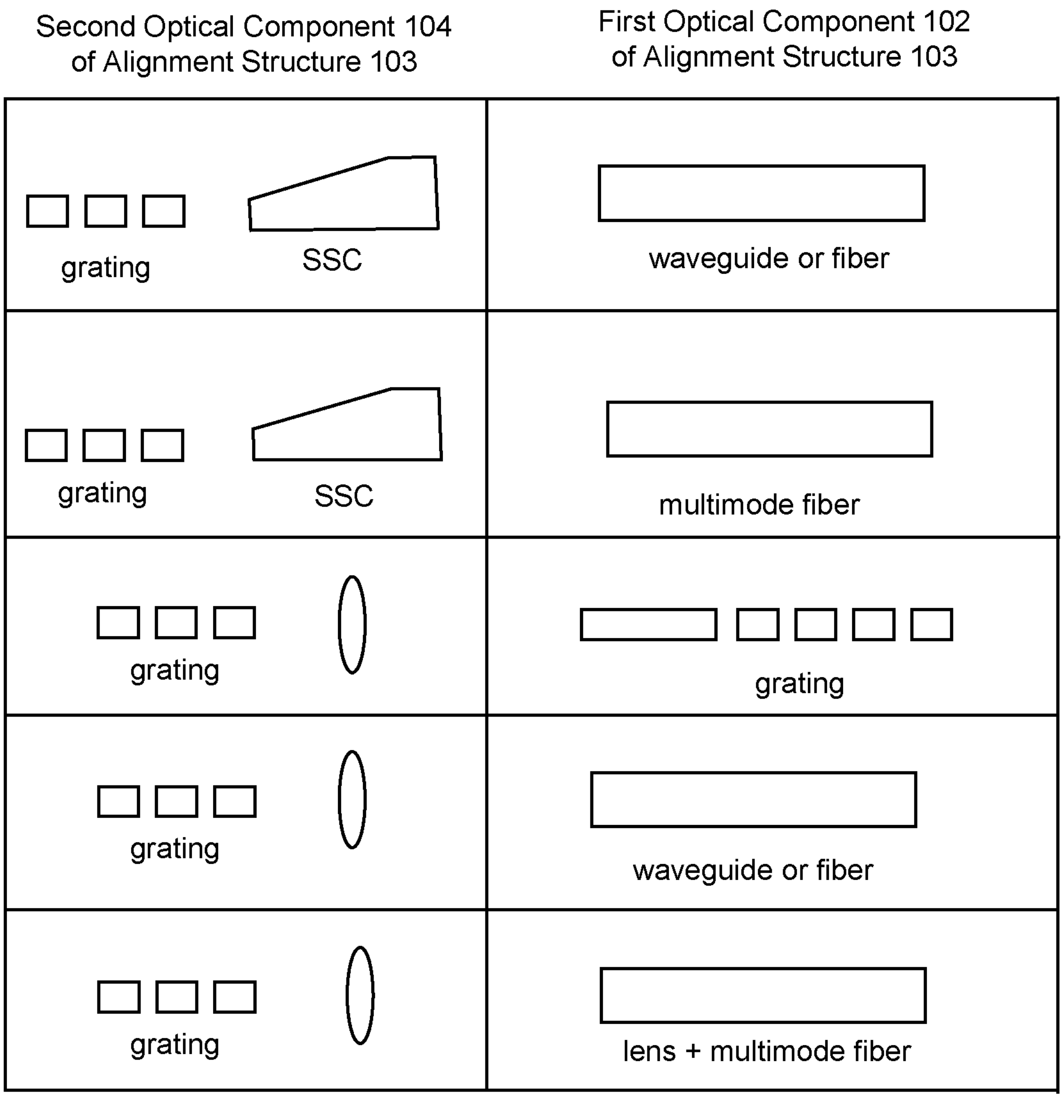

Referring to FIG. 22, some example configurations for embodiments of the first and second optical components 102, 104, respectively, of alignment structure 103 are shown. In the embodiments, the "second optical components" refer to the optical components 104 of the alignment structure 103 that are provided on the PIC interposer 100 and the "first optical components" refer to the optical components 102 that are provided on the FAU 101. In addition to the embodiments of FIG. 1, the example embodiments for the example embodiments in FIG. 22 can be applied to other embodiments as described in FIGS. 2-7.

In embodiments, the second optical components require optical components or combinations of optical components that provide access to the optical signal 170 normal to the surface. Upturned reflectors and grating structures provide such upwardly directed signals. Other optical components and configurations of optical components may also provide a signal or signals that can be detected by a detector 164 positioned over the PIC 110 or that can receive an optical signal from an emitting device 162 positioned over PIC 110 and that can redirect the signal to propagate all or in part, to be received by a first optical component 102 on the FAU 102. Some examples of other optical devices and combinations of devices listed in FIG. 22 include single and multimode optical fibers, single and multimode waveguides, lenses, gratings, and spot size converters as listed in the table in FIG. 22.

Multimode fibers may be used in embodiments of the alignment structure and the use of multimode fibers can provide additional information pertaining to the alignment of the first and second optical components that may not be available with single mode fibers or waveguides.

Figure 23:
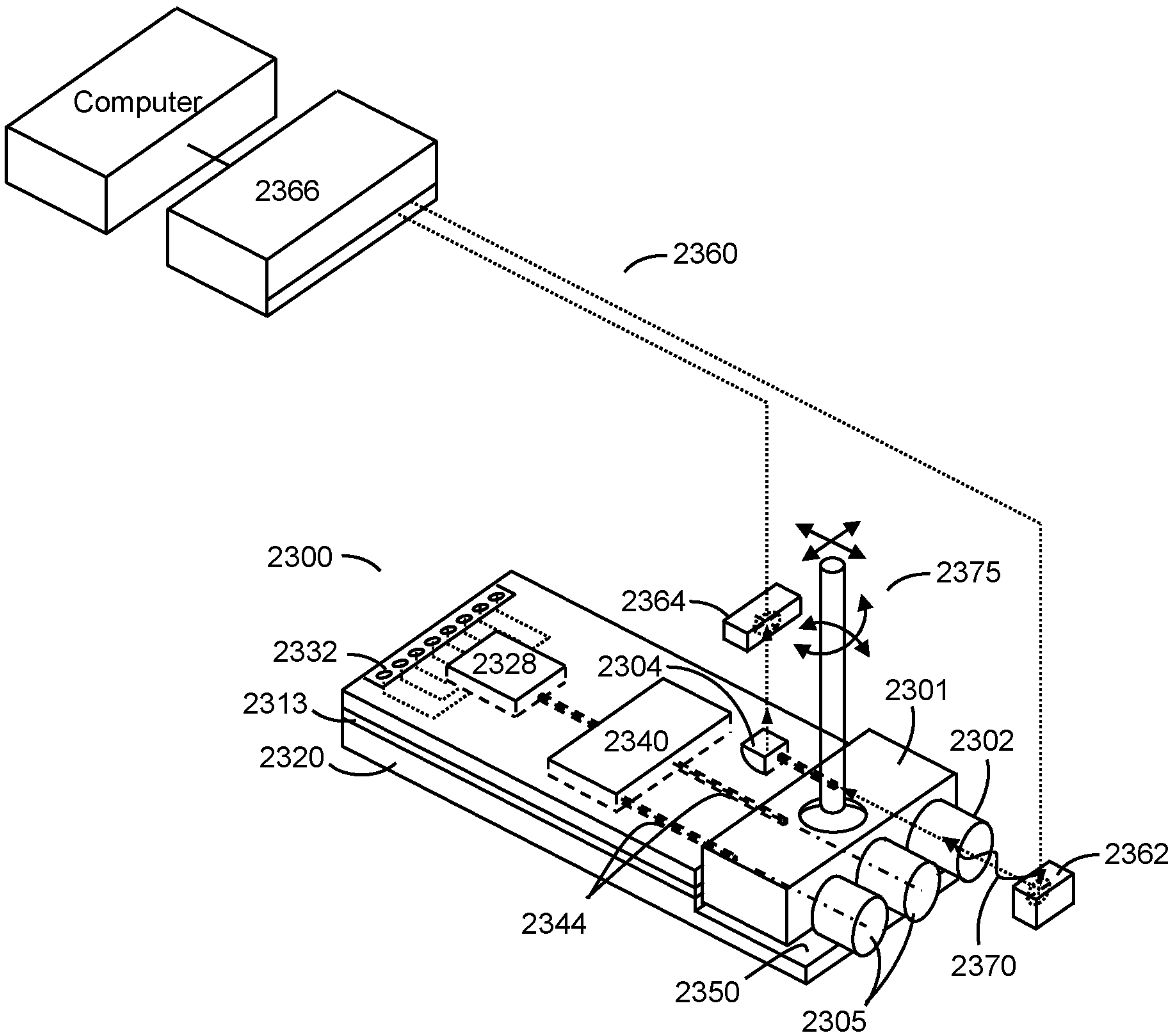
FIG. 23 shows an embodiment of an alignment structure on a PIC coupled to an alignment apparatus.

Referring to FIG. 23, a perspective drawing of an interposer-based PIC is shown with an FAU 2301 coupled to FAU mounting site 2350 on the interposer 2300. The interposer structure 2300 includes substrate 2320 and electrical interconnect layer 2313. Optoelectrical devices 2328 and optical devices 2340 are shown formed on the interposer 2300. In the embodiment shown, planar waveguides 2344 provide optical interconnections between optical device 2340 and the optical fibers 2305 in the FAU 2301. Electrical interface 2332 provides accessible electrical connections for the optoelectrical device 2328 in the embodiment.

The FAU 2301 and interposer 2300 shown in FIG. 23 include an alignment structure comprised of a first alignment component 2302 on the FAU 2301 and a second alignment component 2304 on the interposer 2300. FIG. 23 shows first alignment component 2302 coupled to an emitting device 2362 and second alignment component 2304, a reflector in combination with a patterned planar waveguide in the embodiment shown, coupled to a receiving device 2364. Emitting device 2362 and receiving device 2364 are coupled to optoelectrical measurement apparatus 2366 that may include an integrated computing capability or may have a computer separate from the measurement apparatus as shown in the embodiment. A computer may provide data logging and computational capabilities, among other capabilities to facilitate alignment processes using the alignment apparatus 2360 and may be coupled to the alignment apparatus 2375 for automated alignment processing.

Mechanical alignment apparatus 2375 provides lateral and rotational movement of the FAU 2301 until alignment of the alignment components 2302, 2304 and alignment of the optical fibers 2305 mounted in the FAU 2301 with planar waveguides 2344 on the interposer 2300.

Referring to FIG. 24A and FIG. 24B, an embodiment of an alignment structure 2403*a* is shown. In the embodiment shown, the alignment apparatus 2475 is mechanically coupled to the cap 2401*b* of the FAU 2401. The PIC interposer 2400 is mounted on package substrate 2480 or other substrate suitable for testing, aligning, and mounting of the FAU 2401 onto the PIC interposer 2400. Alignment structure 2403*a* includes first optical component 2402*a* and second optical component 2404*a*. Second optical component 2404*a* in the embodiment shown includes an upturned mirror and a waveguide.

In FIGS. 24A(a) and 24A(b), the optical axis 2412 of the first optical component 2402*a* is shown misaligned with the optical axis 2414 of the second optical component 2404*a*, a condition that might exist for example upon initial placement of the FAU 2401 onto the PIC interposer 2400. In the embodiment shown, after initial positioning of the FAU 2401 onto the PIC interposer 2400, emitting device 2462 of the external testing apparatus 2460 provides optical signal 2470 to the first optical component 2402*a* of the alignment structure 2403*a*. At least a portion of the optical signal 2470 is reflected by the upturned mirror in second alignment component 2404*a* and detected by detecting device 2464 of the external testing apparatus 2460. External testing apparatus 2460 includes electrical or optoelectrical testing device 2466 coupled to the one or more emitting devices 2462 and the one or more detecting devices 2464.

Example alignment apparatus 2475 is a mechanical device that can provide movement to the FAU 2401 in multiple directions and rotations. Alignment between the first optical components 2402*a*, 2402*b* and the second optical components 2404*a*, 2404*b*, respectively, of the alignment structures 2403*a*, 2403*b*, and the alignment between the fiber optic cables 2405*a*. 2405*b*, and the optical components (such as for example, 744*a*, 744*b*) in the PIC to which the fiber optic cables are aligned, can require movement in the vertical direction (z direction as indicated in FIG. 24A), and the lateral directions (x and y directions as indicated in FIG. 24A), and can require rotational movement around a y-z axis, around an x-y axis, and around an x-z axis, as indicated by the reference coordinates provided in FIG. 24A. The y-z axis is an axis, as used herein, that is orthogonal to the y-z plane as indicated. The x-y axis is an axis, as used herein, that is orthogonal to the x-y reference plane as indicated. The x-z axis is an axis, as used herein, that is orthogonal to the x-z reference plane as indicated.

In preferred embodiments, the first and second optical components of the alignment structures described herein are aligned in conjunction with an alignment apparatus such as alignment apparatus 2475. Alignment apparatus 2475 provides the lateral, vertical, and rotational motion to the FAU 2401 while maintaining a fixed position for the packaging or alignment substrate 2480. In other embodiments, the alignment substrate 2480 can also be moved to accommodate all or a portion of the movement required to achieve alignment between the one or more first and second optical components of the alignment structures in the FAU.

In FIGS. 24B(a) and 24B(b), the optical axis 2412 of the first optical component 2402*a* is shown in alignment with the optical axis 2414 of the second optical component 2404*a*, a condition that might exist for example after an alignment process using alignment apparatus 2475 in conjunction with the external testing apparatus 2460 to align the first optical components 2402*a*,2402*b* and the second optical components 2404*a*, 2404*b* of the alignment structure 2403 after the placement of the FAU 2401 onto the PIC interposer 2400. In the embodiment shown, after initial positioning of the FAU 2401 onto the PIC interposer 2400, emitting device 2462 of the external testing apparatus 2460 provides optical signal 2470 to the first optical component 2402*a* of the alignment structure 2403*a* and at least a portion of the optical signal 2470 is reflected by one of the upturned mirrors 2404*a*,2404*b* and detected by one or more detecting devices 2464 of the external testing apparatus 2460. Measurements of at least one characteristic of the optical signal 2470, such as intensity or power, for example, are monitored by the external testing apparatus 2460 and instructions for movement are provided to the alignment apparatus 2475 based on the measurements of the at least one characteristic of the optical signal 2470. Measurements of the at least one characteristic of the optical signal 2470, and for the embodiment shown in FIGS. 24A and 24B, for both alignment structures 2403*a*, 2403*b* until the measured characteristics reach a target value and alignment is achieved. In FIG. 24B, the optical axis 2412 of the first optical component 2402*a* is shown in alignment with the optical axis 2414 of the second optical component 2404*a*.

Emitter device 2462 of external testing apparatus 2460 can be a single device emitter, such as an LED, or an array of single device emitters. In an embodiment with an array, the array can provide intensity data, for example, or intensity and position data, as for example in a configuration in which each single device is aligned with a modal position of a multimode fiber.

In an embodiment, multiple emitter devices 2462 can provide optical signals that can be coupled to the first optical components 2402*a*, 2402*b* and to the second optical components 2404*a*, 2404*b*, and multiple optical signals that have propagated through the alignment structures 2403*a*, 2403*b* can be detected with multiple detectors 2464 coupled to the first optical components 2402*a*,2402*b* and the second optical components 2404*a*, 2404*b*.

Figure 25:
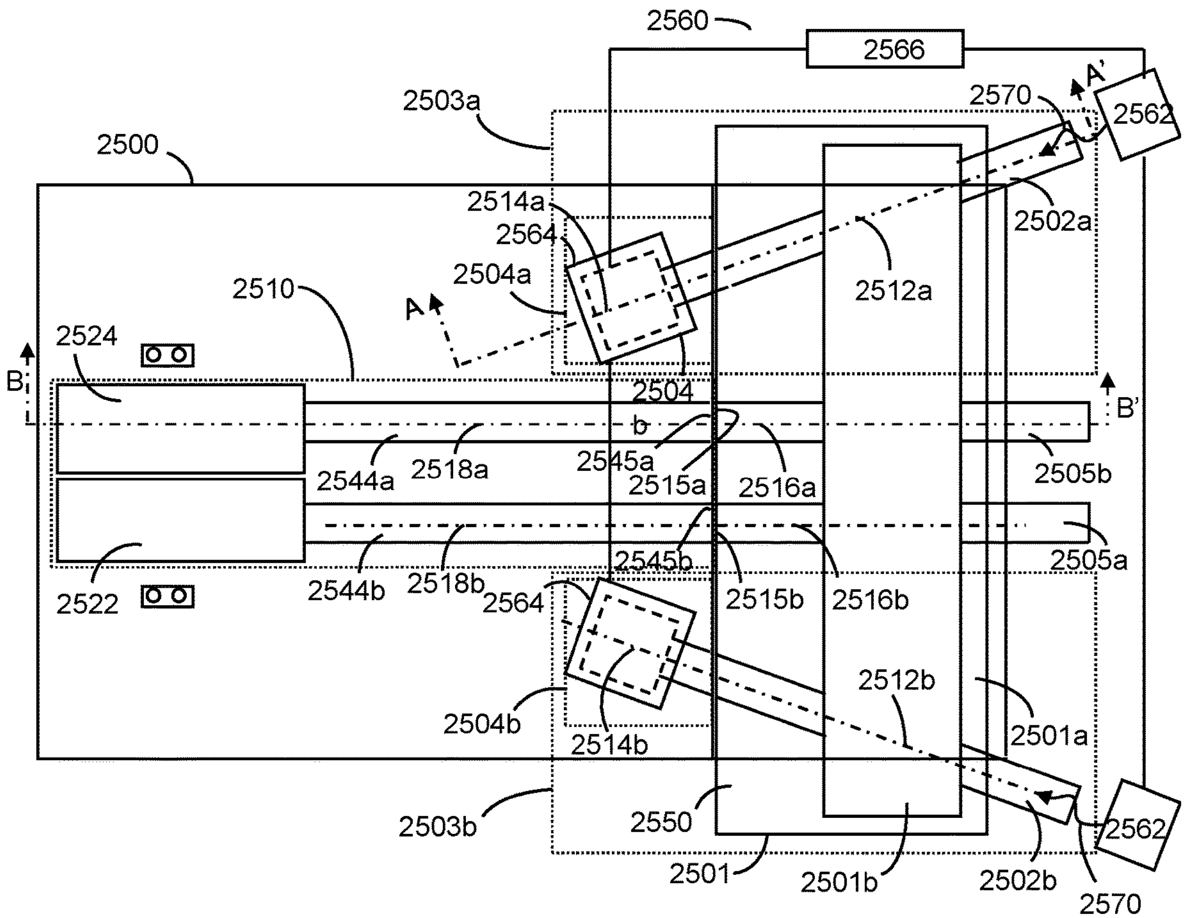
FIG. 25 shows an embodiment of an alignment structure in which the optical axes of the optical components of the alignment structure are not in parallel to the alignment axes of the optical fibers of the PIC.

Referring to FIG. 25, an interposer-based PIC 2500 is shown with two alignment structures 2503*a*,2503*b* that each include a first optical component 2502 and a second optical component comprised of an upturned mirror and a waveguide. In contrast to the embodiment shown in FIG. 5, the embodiment shown in FIG. 25 illustrates the use of an alignment structure 2503 with an optical axis that is not parallel to the optical axis of the fiber optic cables 2505*a*, 2505*b* in the FAU 2501. The use of multiple alignment structures 2503*a*,2503*b* enables additional alignment information such as rotational alignment information pertaining to the alignment between the optical components on the FAU 2501 and the optical components on the PIC interposer 2500. In the embodiment shown in FIG. 25, first optical components 2502*a*. 2502*b* of the alignment structures 2503*a*,2503*b* are waveguides formed in fiber attach unit (FAU) 2501 with the optical axes 2512*a*,2512*b* formed at an angle to the optical axes 2516*a*, 2516*b* of the fibers 2505*a*, 2505*b*. In the embodiment shown in FIG. 25, the optical axes 2512*a*,2512*b* of the first optical components 2502*a*, 2502*b*, respectively, are also non-parallel.

The base portion 501*a* is shown on FAU landing site 2550 on the interposer 2500. An adhesive material may be placed between the landing site 2550 and the FAU base portion 2501*a* in this and other embodiments described herein.

The terminal portions of optical fiber cables 2505*a*, 2505*b* are attached to the FAU 2501 and allow for the simultaneous mounting of these one or more fiber cable terminations and the simultaneous alignment of the end facets 2515*a*, 2515*b* of the fiber cables 2505*a*, 2505*b*, respectively, to the one or more corresponding end facets 2545*a*, 2545*b*, respectively, of the optical devices 2544*a*, 2544*b*, respectively, on the PIC interposer 2500. Optical devices 2544*a*,2544*b*, in the embodiment shown are planar waveguides formed on the interposer 2500. PIC interposer 2500, as described herein, may be a substrate, interposer, or submount, or other structure upon which a PIC can be formed. PIC interposer 2500 includes a photonic integrated circuit comprised of one or more optical or optoelectrical components such as lasers 2522 and photodetectors 2524, waveguides, and arrayed waveguides, among others as described herein.

In the schematic drawings in the top-down view of FIG. 25, the optical axes 2512*a*,2512*b* of the waveguide 2502 of the alignment structures 2503*a*,2503*b* are shown in substantial alignment with the optical axis 2514*a*,2514*b*, respectively, of the second optical components 2504*a*,2504*b* of the alignment structures 2503*a*,2503*b*. The second optical components of the alignment structures 2503*a*, 2503*b* in the embodiment shown are a combination of an upturned mirror and an optical waveguide. Example optical signals 2570 are shown emitted from emitting devices 2562 of the external testing apparatus 2560, and reflected from upturned mirrors of second optical component 2504*a* to a detecting device 2564 in this embodiment. The alignment of the first and second optical components 2502*a*, 2504*a* and 2502*b*,2504*b* of the alignment structures 2503*a*,2503*b* correspondingly results in the alignment between the optical axes 2516*a*, 2516*b* of the fiber optic cables 2505*a*,2505*b* provided on the FAU 2501 and the optical axes 2518*a*,2518*b* of optical components 2544*a*, 2544*b* on the PIC interposer 2500, as shown in the top-down view of FIG. 25.

In FIG. 25, the terminal ends of two optical fibers 2505*a*, 2505*b* are shown. In other embodiments, more than two optical fibers may be attached to the FAU 2501. In yet other embodiments, one optical fiber may be attached to the FAU 2501. In some embodiments, the fiber optic cables 2505*a*, 2505*b* can be single mode optical fibers, and in yet other embodiments, the fiber optic cables can be multi-mode fibers. In some embodiments, the first optical components 2502 of the alignment structures 2503*a*,2503*b* in the FAU 2501 can be multimode waveguides or multimode optical fibers. The first optical components 2502*a*,2502*b*, in embodiments that have more than one alignment structure can be the same first optical components 2502*a*,2502*b* for each alignment structure or the first optical components can be different devices or device types. In an embodiment, for example, a single mode waveguide may be used for a first optical component 2502*a* and a multimode waveguide may be used for another first optical component 2502*b* of the alignment structure. Many other combinations of first optical components 2502*a*,2502*b* may be used in embodiments in which multiple alignment structures 2503*a*,2503*b* are formed.

Alignment of the optical axes 2512*a*,2512*b* of the first optical components 2502*a*,2502*b*, respectively, and the optical axes 2514*a*,2514*b* of the second optical components 2504*a*,2504*b*, and the corresponding alignment of the optical axes 2516*a*, 2516*b* of the fiber optic cables 2505*a*,2505*b*, respectively, and the one or more optical components 2544*a*, 2544*b* of the PIC 2510, respectively, results in the alignment of the end facets 2515*a*,2515*b* of the fiber optic cables 2505*a*,2505*b* with the end facets 2545*a*,2545*b* of optical devices 2544*a*,2544*b*, respectively, on the PIC interposer 2500 as shown in FIG. 25. The end facets 2515*a*,2515*b* of the fiber optic cables 2505*a*,2505*b*, respectively, are shown to be in substantial alignment with the end facets 2545*a*, 2545*b* of optical components 2544*a*,2544*b*, respectively, to allow for the coupling and transfer of optical signals to and from the connected fiber optic cables 2505*a*,2505*b*, so that optical signals propagating through the fiber optic cables 2505*a*, for example, can be delivered to optical or optoelectrical devices such as optoelectrical receiving device 2524 of PIC 2510, and optical signals from optical or optoelectrical devices such as sending device 2522 on the PIC on interposer 2500 can be delivered to attached fiber optic cables 2505*b*. Other optical and optoelectrical devices, such as arrayed waveguides and other forms of non-sending and non-receiving devices may also be coupled to the attached fiber optic cables 2505*a*,2505*b* in the FAU 101. The effectiveness of the coupling and transfer of the optical signals between the attached fiber optic cables 2505*a*,2505*b* and the optical components 2544*a*, 2544*b* of the interposer-based PIC benefits from the quality of the alignment between the one or more of the optical axes 2516*a*,2516*b* and the end facets 2515*a*,2515*b* of the fiber optic cables 2505*a*,2505*b* on the FAU 2501, and the one or more of the optical axes 2518*a*,2518*b* and the end facets 2545*a*,2545*b* of the optical components 2544*a*,2544*b* of the PIC 2510 on the PIC interposer 2500. In some embodiments, the optical components 2544*a*, 2544*b* can be similar optical components coupled to the optical fibers in the FAU 101 to facilitate incoming and outgoing optical signals. In other embodiments, the optical components 2544*a*, 2544*b* can be different optical components coupled to the optical fibers, for example, to facilitate the requirements for incoming and outgoing optical signals.

Effective alignment of the fiber optic cables 2505*a*,2505*b* on the FAU 2501 with optical components 2544*a*, 2544*b* of the PIC 2510, is simplified with the use of the alignment structures 2503*a*,2503*b*, in that the alignment of the first optical components 2502 and second optical components 2504*a*,2504*b* can be performed without the need to power or otherwise access the devices contained within the PIC 2510.

The emitting and receiving devices 2562,2564, respectively, of the external testing apparatus 2560, are shown coupled to the alignment structures 2503*a*,2503*b*.

In other embodiments, the optical axes 2512*a*, 2512*b* of first alignment component 2502*a*, 2502*b*, respectively and the optical axes 2514*a*,2514*b* of second optical component 2504*a*, 2504*b*, respectively can be formed at other angles and configurations than those shown in FIG. 25. In an embodiment, for example, a first alignment structure 2503*a* may be formed at one angle and a second alignment structure 2503*b* may be formed at another angle. In yet another embodiment, the angular positions of the optical axes of one or more alignment structures may be positioned at an angle upwardly or downwardly relative to the plane formed by the optical axes of the fiber optic cables 2505*a*,2505*b*. In yet other embodiments, the optical axes of the alignment structures can be outwardly directed rather than the inwardly oriented optical axes shown in FIG. 25. The positioning of optical axes 2512*a*,2512*b* of the one or more alignment structures 2503*a*,2503*b*, can, in summary, be positioned either parallel to the optical axes 2516*a*, 2516*b* of the attached fibers 2505*a*,2505*b* or can be positioned non-parallel to the optical axes 2516*a*, 2516*b* of the attached fibers 2505*a*,2505*b*. In embodiments in which the optical axes 2512*a*, 2512*b* are formed and positioned non-parallel to the optical axes 2516*a*, 2516*b* of the optical fibers 2505*a*, 2505*b* mounted in the FAU 2501, the optical axes 2512*a*, 2512*b* of the one or more alignment structures 2503*a*,2503*b* can be oriented one or more of upwardly, downwardly, outwardly, and inwardly to that of the optical axes 2516*a*, 2516*b* of the optical fibers 2505*a*,2505*b*.

The foregoing disclosure of embodiments of the alignment structure has been presented for purposes of illustration and description. It is not intended to be exhaustive or to limit the invention to the precise forms disclosed. Many of the drawings and the features provided in the figures are not drawn to scale but rather are drawn with the intention of improving and clarifying the descriptions and discourse provided herein. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for optically aligning an optical fiber to an optical or optoelectronic element formed on a substrate, the method comprising providing a mounting component, wherein the mounting component comprises the optical fiber and a first optical component, wherein the first optical component is disposed at a first distance and a first orientation to the optical fiber, forming a second optical component on the substrate with the substrate comprising the optical or optoelectronic element, wherein the second optical component is formed on the substrate at a second distance and a second orientation to the optical or optoelectronic element, wherein the second distance and the second orientation are related to the first distance and the first orientation in such a way to enable an optical alignment of the optical fiber to the optical or optoelectronic element by optically aligning the first optical component to the second optical component, coupling the mounting component to the substrate, optically aligning the first optical component to the second optical component using an optical signal transmitting between the first and second optical components.

2. A method as in claim 1, wherein the first optical component is configured to direct optical signals between a first direction perpendicular to a lateral surface of the substrate and a second direction parallel to the lateral surface.

3. A method as in claim 1, wherein at least one of the first optical component or the second optical component comprises an upturn mirror, or a grating element, wherein the upturn mirror or the grating element is configured to direct optical signals between a first direction perpendicular to a lateral surface of the substrate and a second direction parallel to the lateral surface.

4. A method as in claim 1, wherein a separation between the first and second optical components is larger than that between the optical or optoelectronic element and the optical fiber.

5. A method as in claim 1, wherein optically aligning the first optical component to the second optical component comprises determining at least a characteristic of the optical signal sent between the first and second optical components to be greater than a threshold value.

6. A method for optically aligning an optical fiber to an optical or optoelectronic element formed on a substrate, the method comprising providing a mounting component, wherein the mounting component comprises the optical fiber and a first optical component, wherein the first optical component is disposed at a first distance to the optical fiber, forming the optical or optoelectronic element on the substrate, forming a second optical component on the substrate, wherein the second optical component is configured to direct optical signals between a first direction not parallel to a lateral surface of the substrate and a second direction parallel to the lateral surface, wherein the second optical component is formed at a second distance to the optical or optoelectronic element, with the second distance equaled to the first distance, wherein the equality between the first and second distances is configured so that an action of optically aligning the first optical component to the second optical component results in an optical alignment of the optical fiber to the optical or optoelectronic element, coupling the mounting component to the substrate, optically aligning the first optical component to the second optical component using an optical signal transmitting between the first and second optical components.

7. A method as in claim 6, wherein the first optical component is configured to transmit the optical signals to or from the second optical component in the second direction, wherein optically aligning the first optical component to the second optical component comprises transmitting the optical signals, by a tester, to the first optical component to the second optical component to be received by the tester in the first direction or to the second optical component to the first optical component to be received by the tester in the second direction.

8. A method as in claim 6, wherein the second optical component comprises an upturn mirror or a grating element configured to transmit the optical signals between the first direction and the second direction.

9. A method as in claim 6, wherein the first optical component comprises a second optical fiber disposed in the mounting component, wherein optically aligning the first optical component to the second optical component comprises transmitting the optical signals, by a tester, to the second optical fiber to the second optical component to be received by the tester in the first direction or to the second optical component to the second optical fiber to be received by the tester in the second direction.

10. A method as in claim 6, wherein the first optical component comprises a second optical fiber shorter than the optical fiber, wherein optically aligning the first optical component to the second optical component comprises transmitting the optical signals, by a tester, to the second optical fiber to the second optical component to be received by the tester in the first direction or to the second optical component to the second optical fiber to be received by the tester in the second direction.

11. A method as in claim 6, wherein the first optical component comprises a multimode or multicore optical fiber, wherein optically aligning the first optical component to the second optical component comprises sending or receiving multimode or multicore optical signals between the multimode or multicore optical fiber and the second optical component for a rotational alignment in the optical alignment between the first and second optical components.

12. A method as in claim 6, wherein the second optical component comprises an upturn mirror or a grating element configured to transmit the optical signal between a third direction perpendicular to the lateral surface and the second direction parallel to the lateral surface, wherein optically aligning the first optical component to the second optical component comprises transmitting the optical signals, by a tester, to the first optical component to the upturn mirror or the grating element to be received by the tester in the third direction or to the upturn mirror or the grating element to the first optical component to be received by the tester in the second direction.

13. A method as in claim 6, wherein the second optical component comprises multiple optical elements positioned at two distal ends of the mounting component, wherein optically aligning the first optical component to the second optical component comprises rotationally aligning the mounting component to the substrate using the multiple optical elements.

14. A method as in claim 6, wherein the second optical component comprises multiple optical elements positioned at two distal ends of the mounting component, wherein the multiple second optical elements are disposed at different heights of the mounting component, wherein optically aligning the first optical component to the second optical component comprises rotationally aligning the mounting component to the substrate using the multiple optical elements.

15. A method as in claim 6, further comprising securing a bottom portion of the mounting component to the substrate, adjusting a top portion of the mounting component to optically align the first optical component with the second optical component.

16. A method as in claim 6, wherein the optical or optoelectronic element comprises an optoelectronic device, a waveguide, a lens, or a spot size converter.

17. A method as in claim 6, further comprising forming further one or more optical or optoelectronic elements on the substrate and providing the mounting component further comprising one or more optical fibers, with the one or more optical or optoelectronic elements and the one or more optical fibers disposed at corresponded separation distances from the optical or optoelectronic element and the optical fiber, respectively, so that the one or more optical or optoelectronic elements and the one or more optical fibers are optically aligned to each other when the optical or optoelectronic element and the optical fiber are optically aligned.

18. A method as in claim 6, further comprising forming an electrical interconnect layer on the substrate before forming the optical or optoelectronic element, wherein the electrical interconnect layer comprises at least an electrical interconnection line, with the electrical interconnection layer disposed under the optical or optoelectronic element.

19. An optical device comprising an optical or optoelectronic element formed on a substrate, a first optical component formed on the substrate at a first distance to the optical or optoelectronic element, wherein the first optical component is configured to send or to receive an optical signal in a first direction not parallel to a lateral surface of the substrate, a mounting component comprising a second optical component and an optical fiber, wherein the second optical component is disposed at a second distance to the optical fiber, wherein the second distance is equaled to the first distance, wherein the mounting component is configured to be attached to the substrate, with the second optical component optically aligned to the first optical component, wherein the equality between the first and second distances is characterized as to enable an optical alignment of the optical fiber to the optical or optoelectronic element through the optical alignment of the second optical component to the first optical component.

20. A method as in claim 1, wherein optically aligning the first optical component to the second optical component comprises using a tester for transmitting the optical signals to the second optical fiber to the second optical component to be received in the first direction or to the second optical component to the second optical fiber to be received in the second direction.

* * * * *